United States Patent
Nimura et al.

(10) Patent No.: US 7,318,951 B2
(45) Date of Patent: Jan. 15, 2008

(54) RETARDATION FILM, PRODUCING PROCESS THEREOF AND LIQUID CRYSTAL DISPLAY UTILIZING THE SAME

(75) Inventors: Shigeaki Nimura, Minami-ashigara (JP); Mitsuyoshi Ichihashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 154 days.

(21) Appl. No.: 11/080,405

(22) Filed: Mar. 16, 2005

(65) Prior Publication Data

US 2005/0208231 A1    Sep. 22, 2005

(30) Foreign Application Priority Data

Mar. 17, 2004  (JP) ............................. 2004-075710
Jan. 28, 2005  (JP) ............................. 2005-021286

(51) Int. Cl.
*C09K 19/52* (2006.01)
*G02F 1/1335* (2006.01)

(52) U.S. Cl. .................. 428/1.1; 252/299.01; 349/117; 349/121

(58) Field of Classification Search ................ 428/1.1, 428/1.2, 1.3; 252/299.01; 349/117, 121
See application file for complete search history.

(56) References Cited

U.S. PATENT DOCUMENTS 5,853,801 A * 12/1998 Suga et al. ................. 427/164
6,346,974 B1 * 2/2002 Itou et al. ................... 349/79
7,019,130 B2 * 3/2006 Ito ............................... 536/69
2004/0001175 A1 * 1/2004 Ito ............................. 349/117

FOREIGN PATENT DOCUMENTS

JP          8-94835          4/1996

* cited by examiner

*Primary Examiner*—Shean C Wu
(74) *Attorney, Agent, or Firm*—Buchanan Ingersoll & Rooney PC

(57) ABSTRACT

A novel retardation film is disclosed. The film comprises a transparent substrate and an optically anisotropic layer formed thereon by fixing a liquid crystalline compound in an aligned state, wherein the retardation film, when positioned between two polarizers in a crossed Nicol arrangement, has a frontal luminance within a range of 0.700 to 0.000 cd/m². A novel liquid crystal display is also disclosed. The display comprises a first polarizing film, the retardation film positioned in contact with a surface of the first polarizing film, a first substrate, a liquid crystal layer formed of a liquid crystal material, and a second substrate positioned in this order, in which liquid crystal molecules of the liquid crystal material are aligned in a black state parallel to surfaces of a pair of the substrates. In the display, a slow axis of the retardation film is parallel to a transmission axis of the first polarizing film and also to a slow axis of the liquid crystal molecules of the liquid crystal layer in a black state.

18 Claims, 3 Drawing Sheets

RETARDATION FILM, PRODUCING PROCESS THEREOF AND LIQUID CRYSTAL DISPLAY UTILIZING THE SAME

CROSS-REFERENCE TO RELATED APPLICATIONS

This application claims benefit of priority under 35 USC 119 to Japanese Patent Application No. 2004-075710 filed Mar. 17, 2004, and Japanese Patent Application No. 2005-021286 filed Jan. 28, 2005.

TECHNICAL FIELD

The present invention relates to a technical field of a liquid crystal display, and more particularly to a liquid crystal display employing an in-plane switching (IPS) mode which provides a display by applying an electric field in a lateral direction to liquid crystal molecules aligned in a horizontal direction. The present invention also relates to a retardation film capable of improving a frontal contrast ratio in a liquid crystal display, in particular a liquid crystal display employing IPS mode, and a producing process thereof.

RELATED ART

In the field of a liquid crystal display, there is widely employed so-called TN mode, in which a liquid crystal layer of a nematic liquid crystal in a twisted structure is sandwiched between mutually orthogonal two polarizing plates and an electric field is applied in a direction perpendicular to the substrate. In such system, since the liquid crystal molecules stand up with respect to the substrate in a black image display state, a birefringence is generated by the liquid crystal molecules to cause a light leakage when observed from an oblique direction. Against such problem, there is employed a method of employing a film with liquid crystalline molecules in a hybrid alignment to optically compensate the liquid crystal cell, thereby preventing such light leakage. It is however still very difficult to optically compensate the liquid crystal cell completely even with such liquid crystalline molecules, and an inversion of gradation is difficult to suppress in a downward direction to the displayed image.

In order to avoid such drawbacks, there are proposed and commercialized liquid crystal displays of so-called in-plane switching (IPS) mode in which a lateral electric field is applied to the liquid crystal, and a vertical alignment (VA) mode in which a liquid crystal with a negative dielectric anisotropy is aligned vertically and the alignment is divided by a projection or a slit electrode formed in the panel. Recently, such panels are being developed not only for a monitor but also for a television receiver, with a remarkable improvement in the luminance of the image. For this reason, a slight light leakage by an oblique incident light in a diagonal position at a black state, that has not been regarded as a drawback, is now considered as a factor causing a deterioration in the display quality.

As a method for improving the displayed color or the viewing angle of the black state, it is investigated, also in the IPS mode, to position an optical compensation material having birefringent characteristics between the liquid crystal layer and the polarizing plate. For example, it is disclosed that a coloring of the displayed image observed in a white state or in a halftone state from an oblique direction can be reduced by positioning, between substrates and polarizing plates, birefringent medias, having a mutually-perpendicular optical axis, capable of compensating an increase/decrease in the retardation generated in the liquid crystal layer when liquid-crystal molecules in the layer are tilted (cf. JPA No. hei 9-80424). There are also proposed utilization of an optical compensation film formed by a styrene based polymer or a discotic liquid crystalline compound having a negative specific birefringence (cf. JPA Nos. hei 10-54982, hei 11-202323 and hei 9-292522), combining, as an optical compensation film, a film having a positive birefringence and an optical axis within the plane of the film, and a film having a positive birefringence and an optical axis perpendicular to the plane of the film (cf. JPA No. hei 11-133408), utilization of a biaxial optical compensation sheet having a retardation of a half wavelength (JPA No. hei 11-305217), and utilization of a film having a negative retardation as a protective film of a polarizing plate and provided with an optical compensation layer having a positive retardation thereon (cf. JPA No. hei 10-307291).

SUMMARY OF THE INVENTION

However, in an optical compensation of a liquid crystal cell employing IPS mode with an optical compensation sheet formed by an stretched birefringent polymer film, it is necessary to use plural films, which increase the thickness of the optical compensatory sheet and are unfavorable for forming a thin display. On the other hand, when an optically anisotropic layer is formed of discotic liquid crystal molecule or the like, an alignment defect is often generated in aligning the optical axis of the discotic liquid crystal molecules horizontally to the substrate surface. And when such optically anisotropic layers are used for a liquid crystal display, some drawbacks such as light leakage in a black state and low contrast are generated.

An object of the present invention is to provide a retardation film capable of improving a frontal contrast in a liquid crystal display, particularly a liquid crystal display employing IPS mode. Another object of the present invention is to provide a liquid crystal display of IPS mode, with a lowered black luminance and an improved frontal contrast ratio. Still another object of the present invention is to provide a method of aligning discotic liquid crystal molecules having a negative birefringent anisotropy horizontally to a substrate in a state with extremely little alignment defect thereby producing a retardation film in a stable manner.

In one aspect, the present invention provides a retardation film comprising a transparent substrate and an optically anisotropic layer formed thereon by fixing a liquid crystalline compound in an aligned state, wherein the retardation film, when positioned between two polarizers in a crossed Nicol arrangement, has a frontal luminance within a range of 0.700 to 0.000 cd/m$^2$.

It is preferred that the frontal luminance is within a range of 0.400 to 0.000 cd/m$^2$; and more preferred that a frontal luminance is within a range of 0.150 to 0.000 cd/m$^2$.

As embodiments of the present invention, the retardation film wherein an in-plane retardation is within a range of 50 to 200 nm; the retardation film wherein the liquid crystalline compound is a discotic liquid crystalline compound having a polymerizable group; the retardation film wherein, in the optically anisotropic layer, the molecules of the discotic liquid crystalline compound are fixed in an aligned state with a mean tilt angle between the disc-faces of the molecules and the surface of the substrate falling within the range from 70 to 90°; and the retardation film wherein the optically anisotropic layer comprises at least one compound having at least one fluorine atom capable of decreasing a tilt angle of a director of molecules of liquid crystalline compound at an air-interface side of the optically anisotropic layer; are provided.

In another aspect, the present invention provides a liquid crystal display comprising a first polarizing film, a retardation film of the present invention positioned in contact with a surface of the first polarizing film, a first substrate, a liquid crystal layer formed of a liquid crystal material, and a second substrate positioned in this order, in which liquid crystal molecules of the liquid crystal material are aligned in a black state parallel to surfaces of a pair of the substrates, wherein a slow axis of the retardation film is parallel to a transmission axis of the first polarizing film and also to a slow axis of the liquid crystal molecules of the liquid crystal layer in a black state.

As embodiment of the present invention; the liquid crystal display further comprising a second polarizing film at an outside of the second substrate; the liquid crystal display comprising a pair of protective films positioned sandwiching the second polarizing film, wherein, among the paired protective films, a protective film closer to the liquid crystal layer has a retardation Rth in a direction of thickness within a range from 20 to -20 nm; the liquid crystal display comprising a pair of protective films positioned sandwiching the second polarizing film, wherein, among the paired protective films, a protective film closer to the liquid crystal layer is a cellulose acylate film or a norbornene-based film; the liquid crystal display comprising a pair of protective films positioned sandwiching the second polarizing film, wherein, among the paired protective films, a protective film closer to the liquid crystal layer is a cellulose acylate film; are provided.

The cellulose acylate film may be prepared by a solvent-casting process. And the cellulose acylate film comprises at least one compound capable of reducing optical anisotropy of the cellulose acylate film and/or at least one compound capable of reducing a wavelength dispersion of the cellulose acylate film.

In another aspect, the present invention provides a process for producing a retardation film comprising an optically anisotropic layer formed of a composition comprising a discotic liquid crystalline compound having a polymerizable group, comprising aligning the molecules of the discotic liquid crystalline compound having a polymerizable group in a manner that an optical axis thereof is parallel to a layer surface, and polymerizing the molecules at a temperature of 40 to 80° C. to fix the aligned state thereby forming an optically anisotropic layer.

As embodiments of the present invention, the process wherein, in the optically anisotropic layer, the molecules of the discotic liquid crystalline compound are fixed in an aligned state with a mean tilt angle between the disc-faces of the molecules and the surface of the substrate falling within the range from 70 to 90°; and the process wherein the molecules of the discotic liquid crystalline compound are aligned on an aliment layer essentially formed of a polyvinyl alcohol base polymer; are provided.

In the specification, the term of "A is parallel to B" or the term of "A is orthogonal to B" means that the angle between A and B falls within a range of an exact angle ±10°. The angle desirably falls within a range of an exact angle ±5°, and more desirably within a range of an exact angle ±2°. The term of "substantial verticality" means that an angle falls within a range of an exact angle ±20°. The angle desirably falls within a range of an exact angle ±15°, and more desirably within a range of an exact angle ±10°. The term of "slow axis" means a direction giving a maximum refractive index. As long as written specifically, refractive indexes are measured at 550 nm.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

According to the present invention, there can be provided a retardation film capable of improving the frontal contrast of a liquid crystal display, particularly a liquid crystal display of IPS mode. Also the invention allows to provide a liquid crystal display employing IPS mode with a low black luminance and an improved frontal contrast ratio. Furthermore, the present invention provides a method allowing to align discotic liquid crystal molecules having a negative birefringent anisotropy horizontally to a substrate in a state with extremely little alignment defect thereby producing a retardation film in a stable manner.

Figure 1:
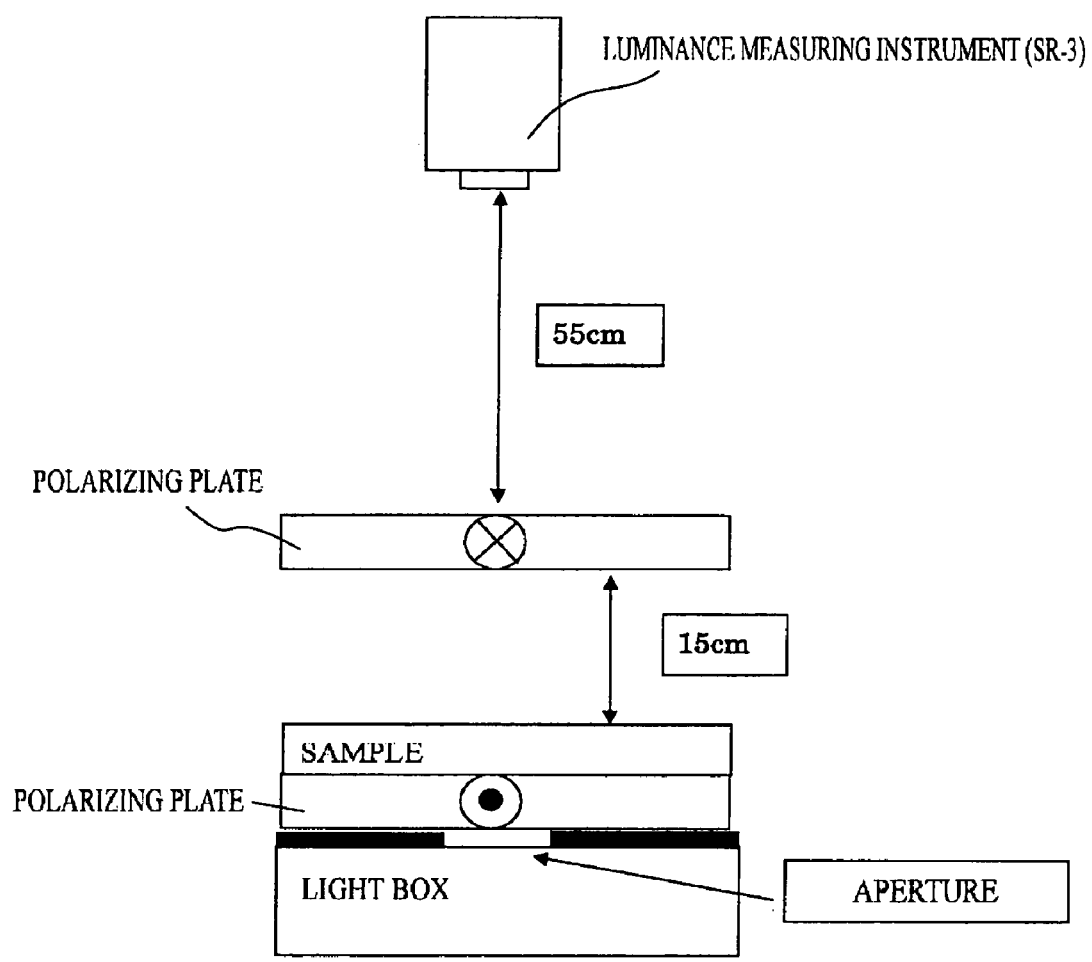
FIG. 1 is a schematic view of an for measuring a front luminance of a retardation film.

In the drawings, symbols have following meanings:
1 liquid crystal device pixel area
2 pixel electrode
3 display electrode
4 rubbing direction
5a, 5b director of liquid crystal compound in a black state
6a, 6b director of liquid crystal compound in a white state
7a, 7b protective film for first polarizing film
8 first polarizing film
9 polarized transmission axis of first polarizing film
10 retardation film
11 first retardation area (transparent substrate)
12 second retardation area (optically anisotropic layer)
13 slow axis of second retardation area
14 first substrate
15 rubbing direction of first substrate
16 liquid crystal layer
17 slow axis direction of liquid crystal molecules
18 second substrate
19 rubbing direction of second substrate
20a, 20b protective film for second polarizing film
21 second polarizing film
22 polarized transmission axis of second polarizing film

DETAILED DESCRIPTION OF THE INVENTION

Hereafter, the present invention will be explained in detail. In the specification, ranges indicated with "to" mean ranges including the numerical values before and after "to" as the minimum and maximum values.

[Retardation Film]

A retardation film of the present invention comprises a transparent substrate and an optically anisotropic layer thereon comprising liquid crystalline molecules fixed in an aligned state, and having, when positioned between two polarizing plates of a crossed Nicol arrangement, a frontal luminance of 0.700 to 0.000 cd/m². Under the aforementioned condition, the frontal luminance is preferably within a range of 0.400 to 0.000 cd/m² and more preferably 0.150 to 0.000 cd/m².

[Measurement of Frontal Luminance]

The frontal luminance can be measured with a luminance measuring instrument. The frontal luminance can be obtained by placing a sample of the retardation film between two polarizers in a crossed Nicol arrangement as shown in FIG. 1, then rotating the sample so as to minimize the transmitted light, and measuring the luminance with the luminance measuring instrument in a position where the transmitted light becomes minimum. The measurement is conducted in a dark room. In FIG. 1, the sample is contacted with a polarizing plate at the light source side, and a polarizing plate nearer to the luminance measuring instrument is positioned at a distance of 15 cm from the sample. Also the luminance measuring instrument is positioned at a distance of 70 cm from the sample. The measurement is executed with a viewing field of 1°. The light source can be constituted, for example, of Fuji Light Box 5000 Inverter (manufactured by Fuji Photo Film Co.), and, the luminance measuring instrument can be constituted of SR-3 (manufactured by Topcon Ltd.).

The measurement is conducted under conditions of a frontal luminance of 920 cd/m² through a single polarizing plate only without the sample, and a frontal luminance of 0.085 cd/m² through two polarizers only in a crossed Nicol arrangement.

[Optical Characteristics of Retardation Film]

The retardation film of the invention preferably an in-plane retardation Re of 50 to 200 nm, more preferably 80 to 170 nm and further preferably 90 to 140 nm. Also a retardation Rth in a direction of thickness is not particularly limited to any range, but, in general, is preferably 50 to 200 nm and more preferably 70 to 150 nm. In the present description, the frontal retardation Re is defined by a following equation 1, and the retardation Rth in the direction of thickness is defined by a following equation 2:

$$Re = (nx - ny) \times d \quad \text{Equation 1:}$$

$$Rth = \{(nx + ny)/2 - nz\} \times d \quad \text{Equation 2:}$$

wherein nx and ny (nx≧ny) are in-plane refractive indexes, nz is a refractive index in the direction of thickness, and d is a film thickness.

In the following, examples of materials to be employed in the preparation of the retardation film of the invention and a producing method will be explained in detail. The retardation film of the invention comprises a transparent substrate, and an optically anisotropic layer thereon comprising a liquid crystalline molecules fixed in an aligned state. The retardation film of the invention may also comprise another layer, for example an alignment layer between the transparent substrate and the optically anisotropic layer. Also the transparent substrate may have an optical anisotropy of a certain level.

[Optically Anisotropic Layer]

The aforementioned optically anisotropic layer comprises liquid crystalline molecules fixed in an aligned state. In the present invention, the liquid crystalline compound is preferably selected discotic liquid crystalline compounds having a disk-shaped molecular structure. It is more preferable that, in the optically anisotropic layer, the discotic liquid crystalline molecules are aligned with a molecular optical axis parallel to the surface of the substrate (layer surface) and is fixed in such state. More specifically, the discotic liquid crystalline molecules are preferably aligned with a mean tilt angle of the molecular optical axis within a range of 0 to 20° with respect to the surface of the substrate. The mean tilt angle less than this range may cause an asymmetrical distribution of light leakage. The retardation film of the invention can be employed in an IPS-mode liquid crystal display, and, in such case, a slow axis of the optically anisotropic layer is preferably provided parallel to a transmission axis of a polarizing film positioned closer to the retardation film of the invention and to a slow axis of the liquid crystal molecules in the liquid crystal layer in a black state.

The optically anisotropic layer preferably has an Re value of 50 to 200 nm, more preferably 80 to 160 nm. The Re value can be regulated to a desired range by a thickness of the optically anisotropic layer, namely by a coating amount in case it is formed by coating.

Discotic liquid-crystal compounds, which can be used in the present invention, are described in various literatures such as Mol. Crysr. Liq. Cryst., vol. 71, page 111 (1981), C. Destrade et al.; Quarterly Chemistry Survey, No. 22, The Chemistry of Liquid Crystals, Chapter 5, Chapter 10, Section 2 (1994), ed. by Japan Chem. Soc.; Angew. Chem. Soc. Chem. Comm., page 1794 (1985), B. Kohne et al.; J. Am. Chem. Soc., vol. 116, page 2,655 (1994), J. Zhang et al. The polymerization of discotic liquid-crystal molecules is described in JPA No. hei 8-27284.

It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during the polymerization reaction. Accordingly, the discotic liquid-crystal molecule desirably comprises a linking group between the disk-shaped core and the polymerizable group. That is, the discotic liquid-crystal molecule is desirably the compound denoted by a formula below.

$$D(\text{-L-P})_n$$

In the formula, D represents a discotic core, L represents a divalent linking group, p represents a polymerizable group and n is an integer from 4 to 12. Specific examples of the discotic core (D), the linking group (L) and the polymerizable group (P) are (D1) to (D15), (L1) to (L25) and (P1) to (P18), described in JPA No. 2001-4837, respectively, and the descriptions about those in JPA No. 2001-4837 are used in the present invention.

When the optically anisotropic layer is formed of a composition comprising at least one discotic compound, it is preferable that the discotic molecules are aligned so that the optical axes of the molecules are parallel to the layer surface. In order to align the discotic molecules in such an alignment state, it is required that discotic liquid-crystal molecules are aligned with a mean angle between the layer surface and the disc-face (a mean tilt angle) of 70 to 90°. These discotic liquid-crystal molecules may be aligned obliquely or aligned such that a tilt angle of the molecules varies along with a distance from the substrate or, in other words, hybrid-aligned. For any oblique-alignment or ay hybrid-alignment, the mean tilt angle is desirably from 70 to 90°, more desirably from 75 to 90° and much more desirably from 80 to 90°.

The optical anisotropic layer may be prepared by applying a coating liquid comprising a liquid-crystal compound, preferably discotic liquid-crystal compound and, if necessary, polymerization initiator, an additive for alignment at an air-interface or the like, to a surface of an alignment layer formed on a substrate.

Solvents are used for preparing the coating liquid, and the solvent is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating solutions.

The coating liquid can be applied by known techniques (e.g., extrusion coating, direct gravure coating, reverse gravure coating and die coating).

The liquid-crystal molecules may be fixed in the alignment state. The discotic liquid-crystal molecules are desirably fixed by polymerization reaction of the polymerizable group (P). Polymerization reactions include thermal polymerization reactions employing a thermal polymerization initiator and photo-polymerization reactions employing a photo-polymerization initiator. A photo-polymerization reaction is preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating liquid. Irradiation for polymerization of discotic liquid-crystal molecules is desirably conducted with ultraviolet radiation. The irradiation energy is desirably from 20 mJ/cm$^2$ to 50 J/cm$^2$, preferably from 100 to 800 mJ/cm$^2$. Irradiation may be conducted under heated conditions to promote the photo-polymerization reaction.

The optically anisotropic layer desirably has a thickness from 0.1 to 10 μm, more desirably from 0.5 to 5 μm and much more desirably from 1 to 5 μm.

[Polymerization Condition]

When the optically anisotropic layer is formed of a composition comprising a liquid-crystal compound having a polymerizable group or a composition comprising a liquid-crystal compound and a polymerizable compound, after the liquid-crystal molecules are aligned in a preferred alignment state, the polymerization of polymerizable molecules may be carried out in order to fix them in the alignment state. The polymerization may be initialized by UV radiation or the like as described above. When discotic molecules having a polymerizable group are aligned so that the optical axes of them are parallel to the layer surface, and fixed in the alignment state to form an optically anisotropic layer, it is preferable that the polymerization of the discotic molecules are carried out at a relatively low temperature. More specifically, the polymerization is preferably carried out at a temperature from 40 to 80° C., more preferably at a temperature from 40 to 70° C., and much more preferably at a temperature from 40 to 65° C. When the polymerization is carried out at a temperature falling within the above preferred range, the liquid-crystal molecules with a high order parameter are fixed, and, thus, an optically anisotropic layer having a thin thickness can be obtained. Therefore, the extinction degree of the optically anisotropic layer may be lowered, and a liquid crystal display employing the optically anisotropic layer may give a lower brightness in a black state.

[Alignment Layer]

For aligning discotic liquid-crystal molecules so that the optical axes of them are parallel to a layer surface, alignment layers are preferably used. Among them, the alignment layer with a low surface energy are effective. In particular, the functional groups of the polymer in the alignment layer reduce the surface energy of the alignment layer, to align liquid-crystal molecules vertically. Fluorine atom or hydrocarbon groups having 10 or more carbon atoms are effective as the functional group capable of reducing the surface energy of the alignment layer. A fluorine atom or a hydrocarbon group is preferably introduced into side chain rather than into main chain, for existing them at the surface of the alignment layer. The amount of fluorine atoms included in a fluoride-polymer is desirably from 0.05 to 80 wt %, more desirably from 0.1 to 70 wt %, much more desirably from 0.5 to 65 wt % and further much more desirably from 1 to 60 wt %. The hydrocarbon group is selected from aliphatic groups, aromatic group and any combinations thereof. The aliphatic group may have a cyclic, branched chain or linear chain structure. The aliphatic group is desirably selected from alkyl groups (including cycloalkyl groups) or alkenyl groups (including cycloalkenyl groups). The hydrocarbon group may have a low-hydrophilic substituent such as a halogen atom. The carbon atom number of the hydrocarbon group is desirably from 10 to 100, more desirably from 10 to 60, and much more desirably from 10 to 40. The main chain of the polymer desirably has a polyimide or polyvinyl alcohol structure.

Generally, polyimides are produced by condensation reaction of tetra-carboxylic acids and diamines. Copolymer-like polyimides which are produced by condensation reactions of plural tetra-carboxylic acids and plural diamines may be used. Fluorine atoms or hydrocarbon groups may exist in repeating units derived from tetra-carboxylic acids and/or in repeating units derived from diamines. When hydrocarbon groups are introduced into polyimide, it is preferred that steroid structure is formed in main chain or side chain of the polyimide. The steroid structure existing in side chain corresponds to the hydrocarbon group having 10 or more carbon atoms and contributes to aligning liquid-crystal molecules vertically. In the specification, the term of "steroid structure" is used any cyclopentanone phenanthrene ring structures or any ring structures which can be obtained by replacement of a part of single bonds thereof with double bonds within a replacement range such that the rings are cycloaliphatic or, in other words, the rings don't form aromatic rings.

The liquid-crystal compounds may be aligned vertically by mixing an organic acid with polymers such as polyvinyl alcohol, modified polyvinyl alcohol or polyimide. Examples of the organic acid to be mixed include carboxylic acids, sulfonic acids and amino acids. Among vertical-alignment agents, described below, the agent exhibiting acidity may be used. The amount of the organic acid is desirably from 0.1 to 20 wt %, and more desirably from 0.5 to 10 wt % with respect to the weight of polymer.

The saponification degree of the polyvinyl alcohol is desirably from 70 to 100%, and more desirably from 80 to 100%. The polymerization degree of the polyvinyl alcohol is desirably from 100 to 5000.

For aligning discotic liquid-crystal molecules, an alignment layer formed of a polymer of which side chains have a hydrophobic group as a function group is desirably used. The types of the function group may be decided depending on various factors such as types of the liquid-crystal compounds or desired alignment state. For example, the modification group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in JPA No. 2000-155216 and those described in the columns [0018] to [0022] in JPA No. 2002-62426.

When a polymer having a main chain bonding to side chains containing a crosslinkable functional group, or a polymer having side chain being capable of aligning liquid-crystal molecules and containing a crosslinkable functional group is used for forming an alignment layer, and a composition comprising a multi-functional monomer is used for preparing a retardation layer, it is possible to copolymerize the polymer in the alignment layer and the multi-functional monomer in the retardation layer formed on the alignment layer. In such case, not only between the multi-functional monomers but also between the polymers in the alignment layer and between the multi-functional monomers and the polymers in the alignment layer, the covalent bondings are formed and the bonding strengths between the alignment layer and the retardation layer are improved. The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent. Examples of the crosslinkable agent include aldehydes, N-methylol compounds, dioxane derivatives, compounds to act when being activated their carboxyl groups, active vinyl compounds, active halogen compounds, isoxazoles and dialdehyde starches. A single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirably set from 0.1 to 20 wt %, and more desirably 0.5 to 15 wt %, with respect to the weight of the polymer. The residual amount of the unreacted crosslinkable-agent in the alignment layer is desirably not greater than 1.0 wt %, and more desirably not greater than 0.5 wt %. When the residual amount falls within the range, the alignment layer has a sufficient durability, and even if the alignment layer is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the corsslinkable agent, to a surface of a transparent substrate, drying under heating (crosslinking), and performing a rubbing treatment. The crosslinking reaction may be carried out at any time after applying the coating liquid. When a water-soluble polymer such as polyvinyl alcohol is used for preparation of an alignment layer, the coating liquid is desirably prepared using a mixed solvent of an organic solvent such as methanol, exhibiting a deforming function, and water. The weight ratio of water to methanol is desirably from 0/100 to 99/1, and more desirably from 0/100 to 91/9. Using such a mixed solvent can prevent bubbles from generating, and can remarkably reduce defects in the surface of the alignment layer and the retardation layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set within a range from 4.5 to 5.5, and more desirably 5.

The alignment layer may be formed on a transparent substrate. The alignment layer can be obtained by applying a rubbing treatment to the surface of the polymer layer after crosslinking the polymer layer.

[Rubbing Treatment]

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a cotton, a rayon fiber, a nylon fiber, polyester fiber or the like in a direction. Any treatments using light or vapor deposition for giving a capability of controlling alignments other than rubbing treatment can be used, and the treatment is not to be limited to a specific kind treatment as long as it can give a capability of controlling alignment of liquid-crystal. Usually, the rubbing treatment may be carried out by rubbing a polymer layer with a fabric in which fibers having a uniform length and line thickness are implanted averagely at several times. According to the present invention, the rubbing treatment for preparing the alignment layer may be carried out under a condition so that the minimum extinction degree of the retardation film is obtained. Usually, the controlling alignment ability of the alignment layer may depend on how long of the radius of the rubbing roll, how high of the revolution speed of the rubbing roll, how deep the rubbing fabric is forced into the polymer layer, how large of the contact area between the rubbing fabric and the polymer layer, how high of the feeding the substrate having the polymer layer thereon or the like. Such parameters may be optimized for lowering the extinction degree.

[Measurement of Extinction Degree]

An extinction degree of a retardation film is a transmittance measured when the retardation film is positioned between two polarizers of a crossed Nicol arrangement so as to minimize the transmittance. The transmittance is measured at a wavelength of 550 nm, and a transmittance of the polarizers at a parallel Nicol arrangement is taken as 100%.

For uniformly aligning discotic liquid crystalline molecules, it is preferable to control a direction of alignment by an alignment layer subjected to a rubbing treatment. It is also possible to align a liquid crystalline molecules with an alignment layer, then fixing the liquid crystalline molecules in such aligned state to form an optically anisotropic layer and to transfer such optically anisotropic layer only onto a polymer film (or transparent substrate). Thus, even in case of utilizing an alignment layer in the preparation of the optically anisotropic layer, such alignment layer does not necessarily become a component of the retardation film of the invention.

[Air Interface Alignment Agent]

Since a liquid crystalline compound generally has a property of being aligned in a tilted state at an interface with the air, it is necessary, in order to obtain a state in which the optical axis is uniformly aligned parallel to the substrate, to control the alignment of the optical axis of the liquid crystalline compound parallel to the substrate at the air interface side. For this purpose, it is preferable to prepare an optically anisotropic layer by including, in a coating liquid of the liquid crystal, a compound which can be localized at the side of the interface with the air and exerts an effect of aligning the liquid crystalline molecules with the optical axis thereof parallel to the substrate surface, by a volumic excluding effect and an electrostatic effect. An effect of aligning the liquid crystalline compound with the optical axis thereof parallel to the substrate surface corresponds, in a discotic liquid crystalline compound, to decrease a tilt angle of a director thereof, namely an angle formed by the director and a surface of the coated liquid crystal at the side of the air.

As a compound for decreasing the tilt angle of the director of the discotic liquid crystal molecules, there is advantageously employed a polymer including a rigid structural unit with a volumic excluding effect such as a maleimide group represented by a following formula (1). Also the inclusion of such compound improves a coating property, thus suppressing unevenness or coating liquid repellency:

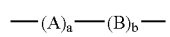                                 Formula (1)

In the formula (1), A represents a repeating unit represented by a following formula (2); B represents a repeating unit derived from an ethylenic unsaturated monomer; a and b represent weight percentages indicating a copolymerization ratio in which a indicates a value of 1 to 100 wt % and b indicates a value of 0 to 99 wt %:

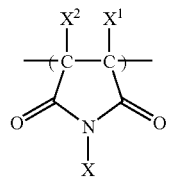                                 formula (2)

In the formula (2), X, $X^1$ and $X^2$ each independently represents a hydrogen atom or a substituent.

The formula (2) will be described in detail below. In the formula (2), examples of the substituent represented by X, $X^1$ or $X^2$ include those shown below:

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, 2,6-diethylphenyl, 3,5-ditrifluoromethylphenyl, naphthyl or biphenyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-10}$ and much more desirably $C_{1-6}$ alkoxy group) such as methoxy, ethoxy or butoxy; an alkoxycarbonyl group (desirably $C_{2-20}$, more desirably $C_{2-10}$ and much more desirably $C_{2-6}$ alkoxy carbonyl group) such as methoxycarbonyl or ethoxycarbonyl; an acyloxy group (desirably $C_{2-20}$, more desirably $C_{2-10}$ and much more desirably $C_{2-6}$ acyloxy group) such as acetoxy or benzoyloxy; an acylamino group (desirably $C_{2-20}$, more desirably $C_{2-10}$ and much more desirably $C_{2-6}$ acylamino group) such as acetylamino or benzoylamino; an alkoxycarbonylamino group (desirably $C_{2-20}$, more desirably $C_{2-10}$ and much more desirably $C_{2-6}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-10}$ and much more desirably $C_{1-6}$ sulfonylamino group) such as methylsulfonylamino group or benzenesulfonylamino group; a sulfamoyl group (desirably $C_{0-20}$, more desirably $C_{0-10}$ and much more desirably $C_{0-6}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-10}$ and much more desirably $C_{1-6}$ carbamoyl group) such as unsubstituted carbamoyl, methylcarbamoyl, diethylcarbamoyl or phenylcarbamoyl; an alkylthio group (desirably $C_{1-20}$, more desirably $C_{1-10}$ and much more desirably $C_{1-6}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-10}$ and much more desirably $C_{1-6}$ sulfonyl group) such as mesyl or tosyl; a sulfinyl group (desirably $C_{1-20}$, more desirably $C_{1-10}$ and much more desirably $C_{1-6}$ sulfinyl group) such as methane sulfinyl or benzenesulfinyl; an ureido group (desirably $C_{1-20}$, more desirably $C_{1-10}$ and much more desirably $C_{1-6}$ ureido group ) such as unsubstituted ureido, methylureido or phenylureido; a phosphoric amide (desirably $C_{1-20}$, more desirably $C_{1-10}$ and much more desirably $C_{1-6}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted by at least one substitutent selected from these. When two substituents are selected, they may be same or different each other. Two or more may, if possible, bond each other to form a ring.

X is preferably a hydrogen atom, or a substituted or non-substituted alkyl (including cycloalkyl) or aryl group, particularly preferably a substituted or non-substituted alkyl (including cycloalkyl) or aryl group, and most preferably an aryl group. $X^1$ and $X^2$ each independently is a hydrogen atom, a halogen atom or a substituted or non-substituted alkyl group, particularly preferably a hydrogen atom or a substituted or non-substituted alkyl group and most preferably a hydrogen atom.

In the formula (1), B is a repeating unit (hereinafter also represented as "repeating unit B") derived from at least an ethylenic unsaturated monomer (hereinafter also represented as "monomer B"), and is preferably a repeating unit derived from a monomer selected from a following monomer group, or a repeating unit derived from a copolymer of two or more monomers selected independently and arbitrarily from the following monomer group. The usable monomer is not particularly restricted, and any monomer capable of an ordinary radical polymerization reaction can be employed advantageously.

(Monomer Group)
  (1) Alkenes:
    ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;
  (2) Dienes:
    1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1-p-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;
  (3) α,β-Unsaturated Carboxylic Acid Derivatives:
    (3a) Alkyl acrylates:
      methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethylenegly-col acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;
    (3b) Alkyl methacrylates:
      methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethylenegly-col methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimetoxysilylpropyl methacrylate, allyl methacrylate, 2-isosyanate ethyl methacrylate or the like;
    (3c) Diesters of unsaturated polycarboxylic acids:
      dimethyl maleate, dibutyl maleate, dimethyl itaconate, dibutyl itaconate, dibutyl crotonate, dihexyl crotonate, diethyl fumarate, dimethyl fumarate or the like;
    (3d) Amides of α,β-unsaturated carboxylic acids:
      N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;
  (4) Unsaturated nitriles:
    acrylonitrile, methacrylonitrile or the like;
  (5) Styrene or derivatives thereof:
    styrene, vinyltoluene, ethylstyrene, p-tert-butylstyrene, p-vinyl methyl benzoate, α-methyl styrene, p-chloromethyl styrene, vinyl naphthalene, p-methoxy styrene, p-hydroxy methyl styrene, p-acetoxy styrene or the like;
  (6) Vinyl esters:
    vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;
  (7) Vinyl ethers:
    methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and
  (8) Other monomers
    N-vinyl pyrrolidone, methyl vinyl ketone, phenyl vinyl ketone, methoxy ethyl vinyl ketone, 2-vinyl oxazoline, 2-isoprppenyl oxazoline or the like.

In the formula (1), B preferably comprises at least one repeating unit represented by a formula (3).

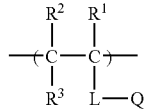

Formula (3)

In the formula (3), $R^1$, $R^2$ and $R^3$ respectively represent a hydrogen atom, an alkyl group, a halogen atom or -L-Q. L is a linking group. Q represents an alkyl group or a polar group capable of hydrogen-bonding.

It is preferred that $R^1$, $R^2$ and $R^3$ respectively represent a hydrogen atom, an alkyl group, a halogen atom (such as fluorine, chlorine, bromine or iodine) or a group represented by -L-Q described later; more preferred that $R^1$, $R^2$ and $R^3$ respectively represent a hydrogen atom, a $C_{1-6}$ alkyl group, chlorine or a group represented by -L-Q described later; much more preferred that $R^1$, $R^2$ and $R^3$ respectively represent a hydrogen atom or a $C_{1-4}$ alkyl group; further much more preferred that $R^1$, $R^2$ and $R^3$ respectively represent a hydrogen atom or a $C_{1-2}$ alkyl group; and most preferred that $R^2$ and $R^3$ are hydrogen and $R^1$ is hydrogen or methyl. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulfonyl group and a carboxyl group.

It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

L is preferably selected from Linkage Group shown below or a divalent group consisting of two or more selected from Linkage Group I shown below:

(Linkage Group)

a single bond, —O—, —CO—, —$NR^4$— ($R^4$ is a hydrogen atom, an alkyl group, an aryl group or an aralkyl group), —S—, —$SO_2$—, —P(=O)($OR^5$)— ($R^5$ is an alkyl group, an aryl group or aralkyl group), an alkylene group and arylene group.

L desirably contains a single bond, —O—, —CO—, —$NR^4$—, —S—, —$SO_2$—, an alkylene group or arylene group; more desirably contains a single bond, —CO—, —O—, —$NR^4$—, an alkylene group or an arylene group; and much more desirably represents a single bond.

When L contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetra-butylene and hexamethylene.

When L contains an arylene group, the carbon atom number of the arylene group is desirably from 6 to 24, more desirably from 6 to 18 and much more desirably from 6 to 12. Preferred examples of the arylene group include phenylene and naphthalene.

When L contains a divalent linking group consisting of a combination of an alkylene group and an arylene group, or in other words an aralkyl group, the carbon atom number in the aralkyl group is desirably from 7 to 34, more desirably from 7 to 26 and much more desirably from 7 to 16. Preferred examples of the aralkyl group include phenylene methylene, phenylene ethylene and methylene phenylene.

L may have any substituent. Examples of the substituent are same as those exemplified for the substituent of $R^1$, $R^2$ or $R^3$.

Examples of L include, however not to be limited to, those shown below.

L-1: ----- single bond

L-2: —COO—$(CH_2)_2$—

L-3: —COO—$(CH_2)_3$—

L-4: —COO—$(CH_2)_5$—

L-5: —COO—$(CH_2)_8$—

L-6: —COO—$(CH_2)_{11}$—

L-7: —COO—$(CH_2)_3$—CHCH_2— with CH_2 substituent

L-8: —CONH—$(CH_2)_3$—

L-9: —CONH—$(CH_2)_5$—

L-10: —CON($CH_3$)—$(CH_2)_5$—

L-11: —CONH—$(CH_2)_{11}$—

L-12: —⟨phenylene⟩—

L-13: —COO—⟨phenylene⟩—

L-14: —COO—⟨phenylene (meta)⟩—

L-15: —CONH—⟨phenylene (meta)⟩—

L-16: —COOCH$_2$CH$_2$OCH$_2$—

L-17: —COO—$(CH_2CH_2O)_2$—$CH_2$—

L-18: —CONH—⟨phenylene⟩—OCH$_2$—

L-19: —CONH—⟨phenylene⟩—SO$_2$NHCH$_2$CH$_2$—

L-20: —⟨phenylene⟩—CH$_2$—

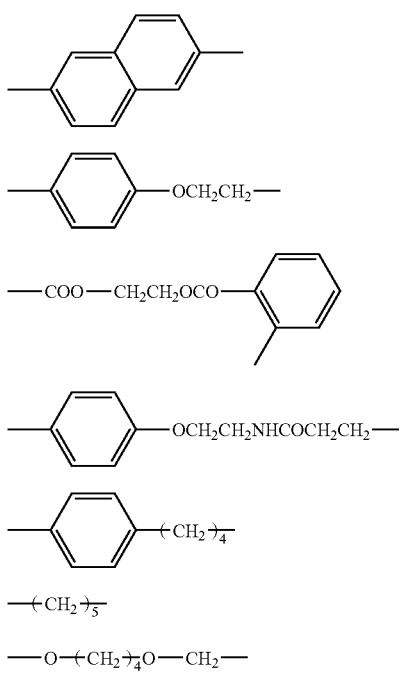

Q preferably represents a polar group capable of hydrogen-bonding such as a hydroxy group, a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammmonium carboxylate, tetrabutylammonium carboxylate, trimethylbenzylammonium carboxylate or dimethylphanylanmmonium carboxylate) or pyridinium carboxylate; a carboxylic amide group (for example, non-substituted or N-mono-lower-alkyl-substituted groups such as —$CONH_2$ and —$CONHCH_3$); a sulfo group or a sulfate (examples of a counter cation are same as those exemplified for the carboxylate above); a sulfonamide (for example, non-substituted or N-mono-lower-alkyl-substituted groups such as —$SO_2NH_2$ and —$SO_2NHCH_3$); a phosphor group or a phosphorate (examples of a counter cation are same as those exemplified for the carboxylate above); a phosphonamide group (for example, non-substituted or N-mono-lower-alkyl-substituted groups such as —$OP(=O)(NH_2)_2$ and —$OP(=O)(NHCH_3)_2$); an ureido group (—$NHCONH_2$); or a non-substituted or N-mono-substituted amino group such as —$NH_2$ and —$NHCH_3$. It is noted that the lower alkyl means a methyl group or an ethyl group. It is more preferable that Q represents a hydroxy group, a carboxyl group, a sulfo group or a phosphor group; and it is much more preferable that Q represents a hydroxy group or a carboxyl group.

The alkyl group represented by Q is preferably selected from $C_{1-20}$ (more preferably $C_{1-12}$ and much more preferably $C_{1-18}$) alkyl groups such as methyl, ethyl, iso-propyl, butyl, tert-butyl, n-octyl, n-decyl, n-hexadecyl, cyclopropyl, cyclopentyl and cyclohexyl.

The polymer may respectively comprise one repeating unit A and B described above, or plural repeating units A and B. B preferably comprises two or more (more preferably three or more) types of repeating units having both a hydroxy group and a carboxyl group.

In the formula, "a" is from 1 to 100 wt % and "b" is 0 to 99 wt %. It is preferable that "a" is from 10 to 100 wt % and "b" is 0 to 90 wt %; and it is more preferable that "a" is from 30 to 100 wt % and "b" is 0 to 70 wt %. The preferred range of the weight percent may easily vary with a molecular weight of a monomer to be used, and thus, the preferred range of a molar number of a function group per unit weight may more properly define a preferred range of an amount of the repeating. Using the molar number, the preferred amount of a polar group capable of hydrogen-bonding contained in the polymer is from 0.1 mmol/g to 10 mmol/g and the more preferred amount is from 0.2 mmol/g to 8 mmol/g.

Examples of the method for producing the polymer represented by the formula (1) include, however not to be limited to, a radical-polymerization or a cation-polymerization employing a vinyl group and an anion-polymerization, and among them, a radical-polymerization is preferred since it is common.

Known radical thermal or radical photo polymerization initiators may be used in the process for producing the polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination.

Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 to 30 minutes. Inert gas purge is desirably performed before or while carrying out the solution polymerization to avoid deactivation of the generated radicals. Nitrogen gas is usually used as an inert gas.

Radical polymerization with at least one chain transfer agent is useful for producing polymers of the present invention having a proper molecular weight Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as α-methyl styrene or α-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

The weight-average molecular weight (Mw) of the polymer represented by the formula (1) to be used in the present invention is desirably not greater than 1,000,000, more desirably not greater than 500,000 and much more desirably not greater than 100,000. The Mw can be measured as a polyethylene oxide (PEO) equivalent molecular weight with gel permeation chromatography (GPC).

Examples of the polymer represented by the formula (1) which can be used desirably in the present invention include, however not to be limited to, those shown below. Numerical values in formulae shown below mean wt % of each monomer, and Mw in formulae shown below mean PEO-equivalent weight-average molecular weight measured by GPC. In the formulae, "a", "b", "c", "d" and the like mean weight ratios.

P-1

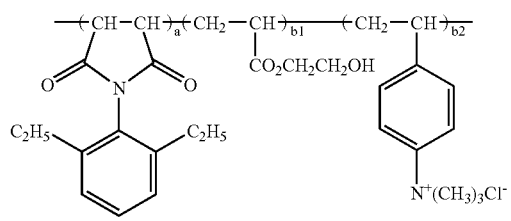

a/b1/b2 = 33/28/39
Mw = 9000

-continued

P-2

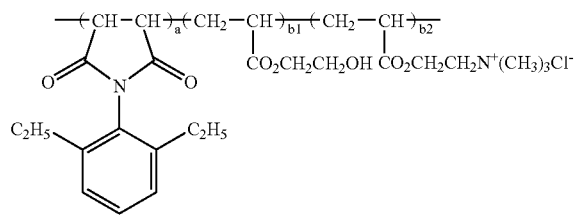

a/b1/b2 = 33/28/39
Mw = 8000

P-3

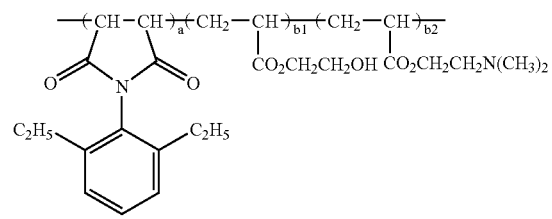

a/b1/b2 = 33/28/39
Mw = 10000

P-4

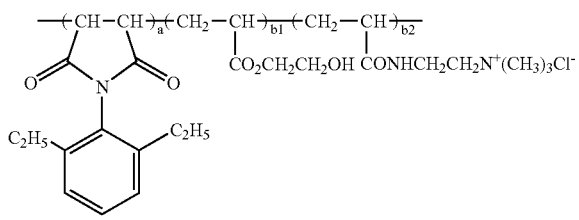

a/b1/b2 = 33/28/39
Mw = 8000

P-5

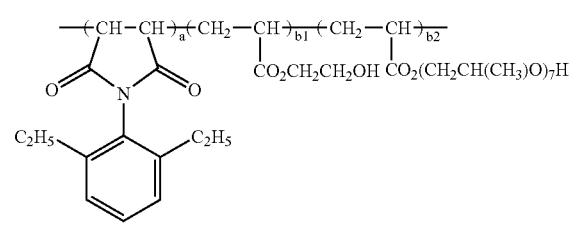

a/b1/b2 = 33/28/39
Mw = 12000

P-6

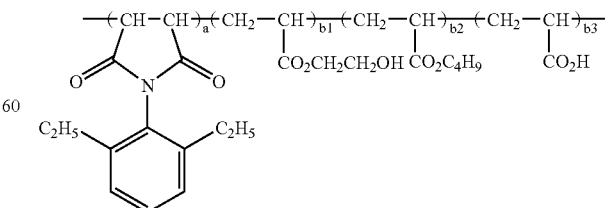

a/b1/b2/b3 = 33/28/33/6
Mw = 9000

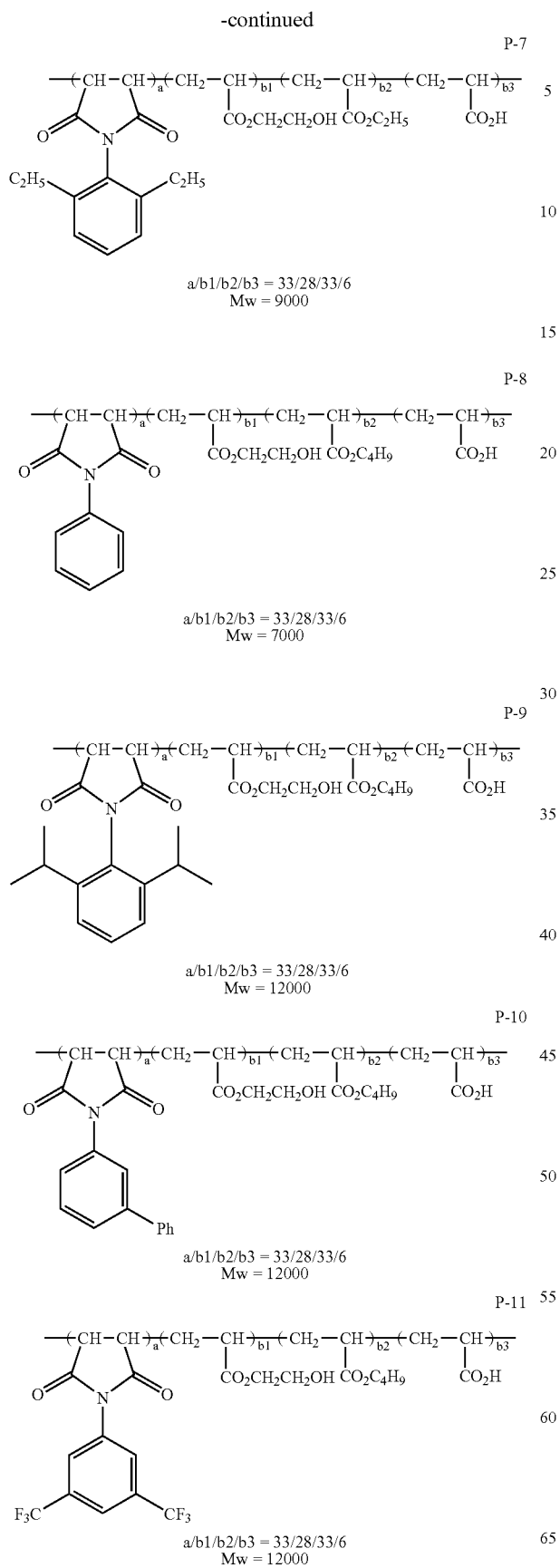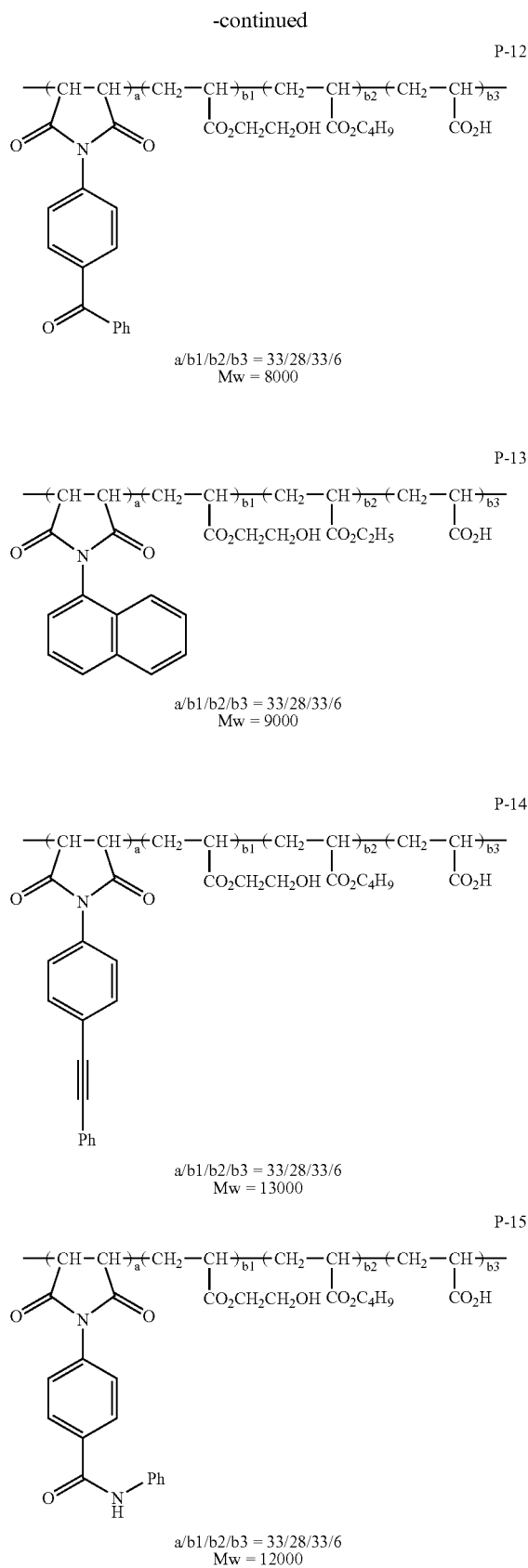

P-16

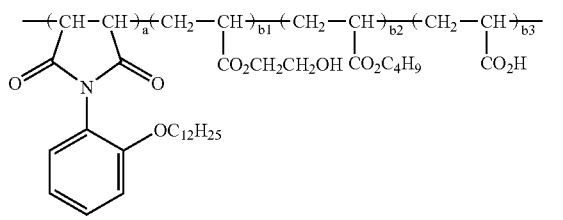

a/b1/b2/b3 = 33/28/33/6
Mw = 11000

P-17

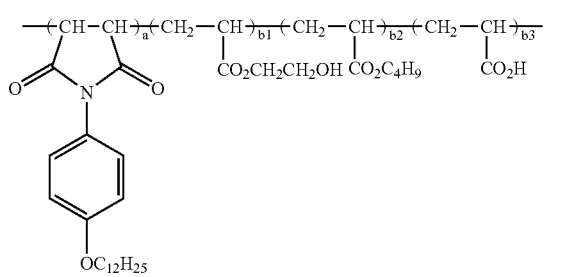

a/b1/b2/b3 = 33/28/33/6
Mw = 8000

P-18

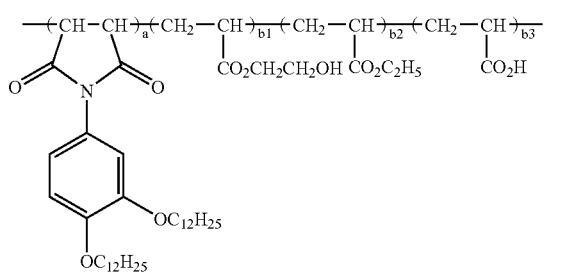

a/b1/b2/b3 = 33/28/33/6
Mw = 9000

P-19

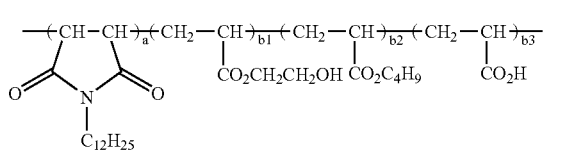

a/b1/b2/b3 = 33/28/33/6
Mw = 13000

P-20

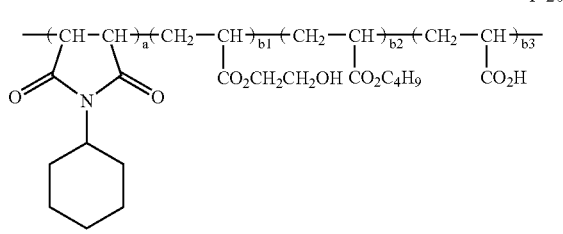

a/b1/b2/b3 = 33/28/33/6
Mw = 12000

P-21

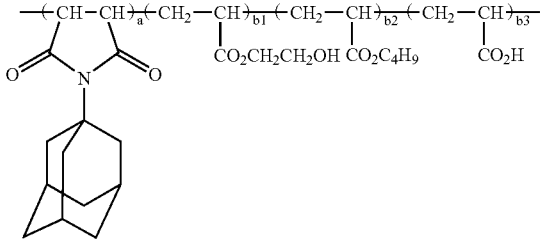

a/b1/b2/b3 = 33/28/33/6
Mw = 11000

The air interface alignment agent can be selected from the compounds other than the exemplified compounds. Examples of such a compound include the compounds described in JPA No. 2002-20363 or JPA No. 2002-129162. Those described in the columns [0072] to [0075] of Japanese Patent Application No. 2002-212100, in the columns [0037] to [0039] of Japanese Patent Application No. 2002-262239, in the columns [0071] to [0078] of Japanese Patent Application No. 2003-91752, in the columns [0052] to [0054], [0065] to [0066] and [0092] of Japanese Patent Application No. 2003-119959, in the columns [0028] to [0030] of Japanese Patent Application No. 2003-330303 and in the columns [0061] to [0066] of Japanese Patent Application No. 2004-3802.

As an air interface alignment agent, polymers having a fluoro aliphatic group can be used. Examples of such fluoro polymer include, however not to be limited to, those shown below. In the formulae, "a", "b", "c", "d" and the like mean weight ratios. Numerical values in formulae shown below mean wt % of each monomer, and Mw in formulae shown below mean PEO-equivalent weight-average molecular weight measured by GPC.

P-31

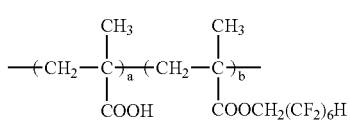

a/b = 20/80
Mw = 23000

P-32

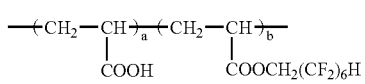

a/b = 15/85
Mw = 33000

P-33

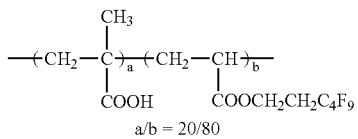

a/b = 20/80
Mw = 38000

P-34

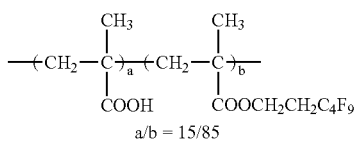

a/b = 15/85
Mw = 51000

P-35
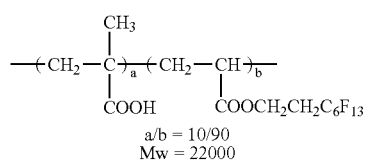
a/b = 10/90
Mw = 22000
P-36
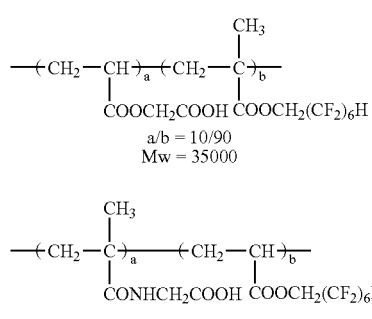
a/b = 10/90
Mw = 35000
P-37
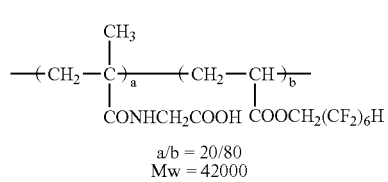
a/b = 20/80
Mw = 42000
P-38
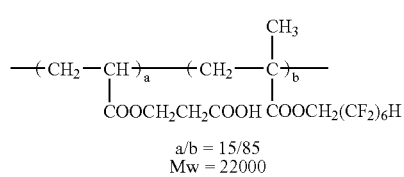
a/b = 15/85
Mw = 22000
P-39
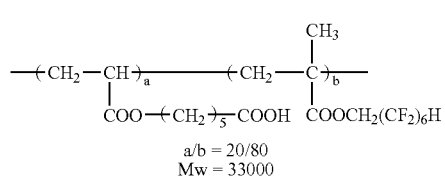
a/b = 20/80
Mw = 33000
P-40
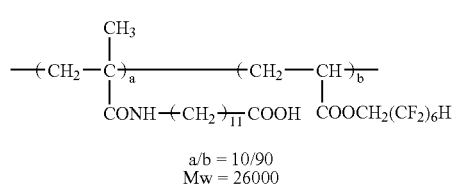
a/b = 10/90
Mw = 26000
P-41
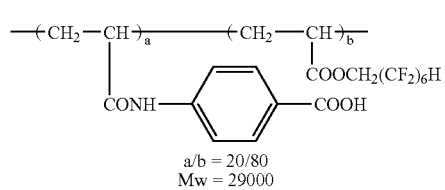
a/b = 20/80
Mw = 29000
P-42
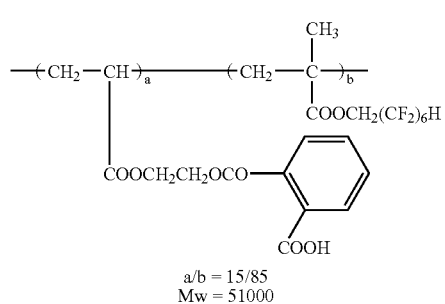
a/b = 15/85
Mw = 51000
P-43
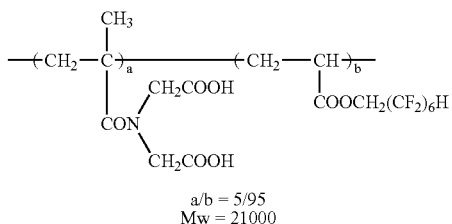
a/b = 5/95
Mw = 21000
P-44
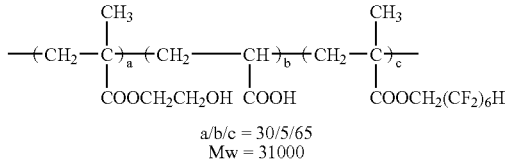
a/b/c = 30/5/65
Mw = 31000
P-45
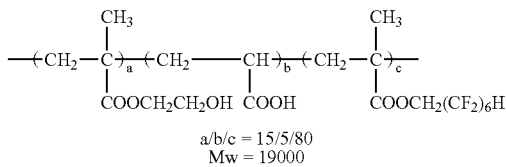
a/b/c = 15/5/80
Mw = 19000
P-46
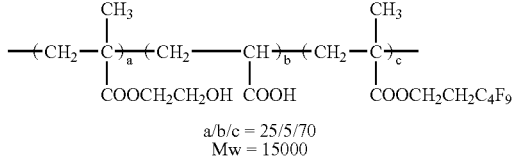
a/b/c = 25/5/70
Mw = 15000
P-47
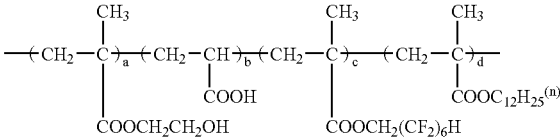
a/b/c/d = 25/5/50/20
Mw = 42000
P-48
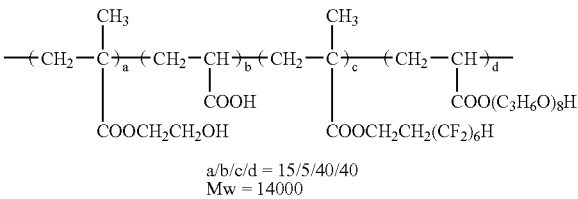
a/b/c/d = 15/5/40/40
Mw = 14000
P-49
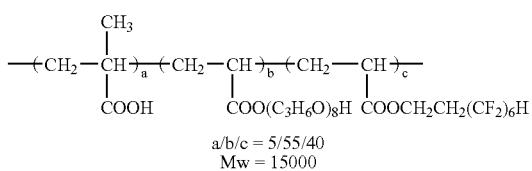
a/b/c = 5/55/40
Mw = 15000

-continued

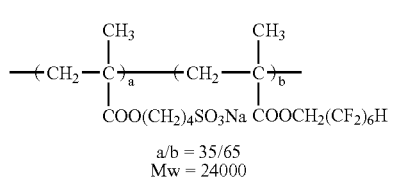
P-50 a/b = 35/65
Mw = 24000

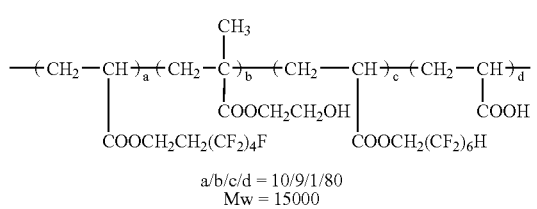
P-51 a/b/c/d = 10/9/1/80
Mw = 15000

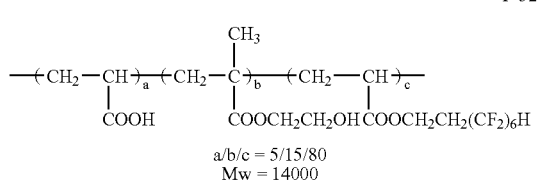
P-52 a/b/c = 5/15/80
Mw = 14000

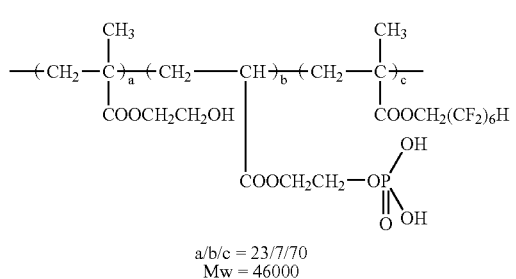
P-53 a/b/c = 23/7/70
Mw = 46000

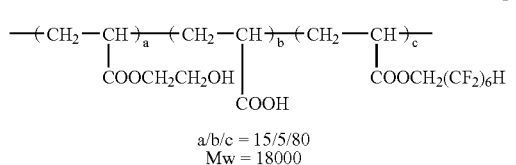
P-54 a/b/c = 15/5/80
Mw = 18000

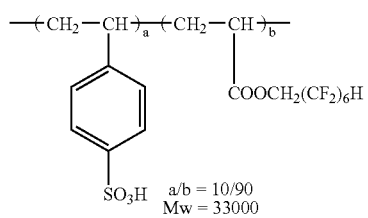
P-55 a/b = 10/90
Mw = 33000

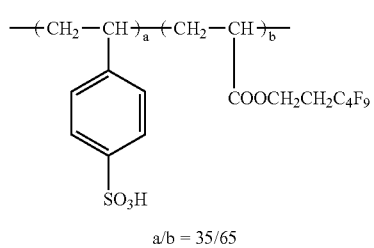
P-56 a/b = 35/65
Mw = 25000

The amount of the alignment-controlling agent at an air-interface in a coating liquid is desirably from 0.05 to 5 wt %. When the fluorine-base compound is used as an alignment-controlling agent at an air-interface, the amount of the compound in a coating liquid is desirably from not greater than 1 wt %.

[Other Additives in an Optically Anisotropic Layer]

The coating layer may comprise other additives such as plasticizers, surfactants or polymerizable monomers, with the liquid-crystal compound. Such additives may contribute to improvement in uniformity of a coating layer, strength of a coating layer, alignment ability of liquid-crystal molecules or the like. Such additives are desirably selected from materials which can be mixed with the liquid-crystal compound compatibly and don't inhibit the alignment of the liquid-crystal compound.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of [0018] to [0020] in JPA No. 2002-296423. In usual, the amount of the polymerizable monomer is desirably from 1 to 50 wt %, and more desirably from 5 to 30 wt %, with respect to the total weight of a single or plural liquid crystal compounds.

The surfactant may be selected from any known surfactants, and is desirably selected from fluoride-surfactants. More specifically, the compounds, described in the columns of [0028] to [0056] in JPA No. 2001-330725, and the compounds, described in the columns of [0069] to [0126] in JPA No. 2003-295212, are preferred.

Single or plural polymers may be used with the liquid crystal. The polymer is desirably selected from polymers which can increase a viscosity of a coating liquid. Examples of the polymer include cellulose esters. Preferred examples of cellulose ester include those described in the column [0178] in JPA No. 2000-155216. Avoiding inhibiting the alignment of the liquid-crystal compound, the amount of the polymer is desirably from 0.1 to 10 wt %, and more desirably from 0.1 to 8 wt %, with respect to the weight of the liquid-crystal compound.

The temperature at which the liquid-crystal compound transfers from a discotic nematic liquid-crystal state to a solid state is desirably from 70 to 300° C., and more desirably from 70 to 170° C.

[Onium salt: Vertical Alignment Agent at an Alignment Layer Interface]

The optically anisotropic layer may comprise at least one onium salt. And/or an alignment layer for preparing the optically anisotropic layer may comprise at least one onium salt. The onium salt can function as a vertical alignment agent at an alignment layer interface. Examples of such onium salt include ammonium salts, sulfonium salts and phosphonium salts. Among them, quaternary onium salts are especially preferred and quaternary ammonium salts are most preferred. Specific examples of the onium salts include the compounds described in the columns [0091] to [0117] of Japanese patent application No. 2004-003802.

It is noted that the optically anisotropic layer may have a multilayer structure. For example, the optically anisotropic layer may comprise two or more layers formed of a composition comprising discotic liquid-crystal or a layer formed of a composition comprising discotic liquid-crystal and another layer. As the latter embodiment, laminated bodies comprising the discotic liquid-crystal layer and a stretched polystyrene film or an optically isotropic film such as cyclo-olefin based film are preferred.

[Substrate]

The retardation film of the present invention comprises a substrate supporting the optically anisotropic layer. The substrate is preferably transparent, and, in particular, preferably has a light transmission of not less than 80%. The substrate is preferably selected from polymer films having a small wavelength-dependence, and, in particular, preferably has a Re400/Re700 ratio of less than 1.2.

The substrate is also preferably selected from films formed of optically isotropic polymers, and, in particular, preferably has an in-plane retardation (Re) of not greater than 20 nm and more preferably not greater than 10 nm. Examples of materials for the substrate, however not limited to them, include cellulose esters, polycarbonates, polysulfones, polyethersulfones, polyacrylates and polymethacrylates. Among these, cellulose esters are preferred, acetyl celluloses are more preferred and triacetyl celluloses are much more preferred. The thickness of the substrate is desirably from 20 to 500 micrometers, and more desirably from 50 to 200 micrometers.

In order to improve adhesion between the substrate and a layer formed thereon (for example, an adhesion layer, a vertical alignment layer or a retardation layer), the polymer film may be subjected to surface treatment. Examples of surface treatments include corona discharge treatment, glow discharge treatment, flame treatment, acid treatment, alkali treatment and UV irradiation treatment. An adhesion layer (an undercoating layer) may be formed on the substrate.

One embodiment of the retardation film of the present invention comprising a transparent substrate having an in-plane retardation Re of 20 nm or less (preferably 10 nm or less and more preferably 5 nm or less) and a retardation Rth in the direction of thickness is 20 to 120 nm (preferably 40 to 100 nm), and the aforementioned optically anisotropic layer with an in-plane Re of 50 to 200 nm. The present embodiment is preferably used in a liquid crystal display employing IPS mode. In the present embodiment, the optical characteristics of the transparent substrate also contribute the optical compensation of the liquid crystal cell employing IPS mode.

Also a retardation area having the aforementioned optical characteristics may be provided, separately from the transparent substrate, on the optically anisotropic layer. For example, there can be laminated, on the optically anisotropic layer, a retardation layer constituted of a birefringent polymer film having the aforementioned optical characteristics, or a retardation film having an optically anisotropic layer, which has the aforementioned optical characteristics and is formed by coating or transferring a low-molecular or high-molecular liquid crystalline composition on a transparent substrate.

The retardation layer formed of a birefringent polymer film having the aforementioned optical characteristics can be easily formed by biaxially stretching a polymer film. Also there can be advantageously employed a cellulose acetate which develops such optical characteristics only by casting without a stretching step. Such cellulose acetate can be those described in JPA No. 2002-90541. For the polymer film, a synthetic polymer (such as polycarbonate, polysulfone, polyethersulfone, polyacrylate, polymethacrylate, norbornene resin or cellulose acetate) is generally employed.

Examples of the retardation film, formed by coating or transferring a low-molecular or high-molecular liquid crystalline compound on a transparent substrate, include a retardation film formed by coating a rod-shaped cholesteric liquid crystalline composition on a transparent substrate, aligning rod-shaped cholesteric liquid crystalline molecules comprising a chiral structural unit with a spiral axis thereof substantially perpendicularly to a substrate and fixing them in such state, a retardation film formed by coating a discotic liquid crystal composition on a transparent substrate and aligning discotic liquid crystal molecules with a negative specific birefringence horizontally (with a director perpendicular to the substrate), and casting polyimide polymer on a transparent substrate and fixing on the substrate.

[Transparent Protective Film]

The retardation film of the invention is preferably provided, on a side of the optically anisotropic layer, with a transparent polymer film as a transparent protective film. A transparency of the protective film means an optical transmittance of 80% or higher. The transparent protective film is generally formed by a cellulose ester film, preferably a triacetyl cellulose film. The cellulose ester film is preferably formed by a solvent cast method. The transparent protective film preferably has a thickness of 20 to 500 µm, more preferably 50 to 200 µm.

[Polarizing Plate]

The retardation film of the invention may be applied to a liquid crystal display after being adhered to a linear polarizing film thereby forming a polarizing plate. A polarizing film usually has protective films on both sides thereof, and one of such protective films may be replaced by the substrate of the retardation film of the invention, thereby contributing to obtaining a thinner structure of the liquid crystal display. In the following, such polarizing film and a protective film for the polarizing film will be explained.

[Polarizing Film]

The polarizing film includes an iodine-based polarizing film, a dye-based polarizing film utilizing a dichroic dye, and a polyene-based polarizing film. The iodine-based polarizing film and the dye-based polarizing film are generally prepared with a polyvinyl alcohol-based film. A transmission axis of the polarizing film corresponds to a direction perpendicular to a film extending direction. In case of employing a discotic liquid crystalline compound in the optically anisotropic layer, the transmission axis of the polarizing film is so positioned as to be substantially parallel to a surface of the discotic liquid crystalline molecules in the alignment film. Also in case of employing a rod-shaped liquid crystalline compound, the transmission axis of the polarizing film is so positioned as to be substantially parallel to a longer axis (slow axis) of the rod-shaped liquid crystalline compound. The polarizing film is preferably adhered to the substrate of the retardation film of the invention, but it may be adhered to the optically anisotropic layer if desirable.

[Protective Film for Polarizing Film]

Also a surface of the polarizing film, opposite to a side thereof adhered to the retardation film of the invention, is preferably protected by a transparent protective film. The protective film preferably is free from an absorption in the visible light region, has an optical transmittance of 80% or higher and has a low retardation by birefringence. More specifically, an in-plane retardation Re is preferably 20 nm or less, more preferably 10 nm or less and most preferably 5 nm or less. Also a retardation Rth in the direction of thickness is preferably 20 to 20 nm, more preferably 10 to 10 nm and most preferably 5 to 5 nm. These allows to significantly improve the viewing angle dependence of color. Any film having such properties can be advantageously employed, but a cellulose acylate film or a norbornene type film is preferable in consideration of the durability of the polarizing film. For reducing Rth in a cellulose acylate film, it is effective to blend a liquid crystalline compound in the film.

In the following, there will be given a detailed explanation on a cellulose acylate film of a small retardation, preferably employed as a protective film for the polarizing film, particularly a protective film for the polarizing film positioned closer to the liquid crystal cell.

[Protective Film with Small Retardation]

[Raw Material Cotton for Cellulose Acylate]

A raw material cellulose for the cellulose acylate to be employed in the invention include for example a cotton linter and a wood pulp (such as leaf pulp or needle pulp), and a cellulose acylate obtained from any raw material cellulose may be employed and may be employed as a mixture if desirable. Such raw material cellulose is described in detail, for example in *Plastic Zairyo Koza* (17) Senisokeijyushi (cellulose resin) (Marusawa and Uda, published by Nikkan Kogyo Shimbun, 1970) and Japan Institute of Invention and Innovation, Technical Publication 2001-1745 (p. 7-8), and is not particularly restricted for the cellulose acylate film.

[Substitution Degree of Cellulose Acylate]

The cellulose acylate is formed by an acylation of hydroxyl groups of cellulose, and a substituent can be any acyl group from an acetyl group with 2 carbon atoms to an acyl group with 22 carbon atoms. In the cellulose acylate of the invention, a substitution degree on the hydroxyl groups of cellulose is not particularly restricted, and can be obtained by measured by a bonding level of acetic acid and/or a fatty acid with 3 to 22 carbon atoms substituting the hydroxyl groups of cellulose. Such measurement can be conducted according to ASTM, D-817-91.

In the aforementioned cellulose acylate, an acyl substitution degree in the hydroxyl groups of cellulose is not particularly restricted, but is preferably 2.50 to 3.00, more preferably 2.75 to 3.00 and further preferably 2.85 to 3.00.

Among acetic acid and/or a fatty acid of 3 to 22 carbon atoms for substituting the hydroxyl groups of cellulose, the acyl group with 2 to 22 carbon atoms may be an aliphatic group or an allyl group and may be a single group or a mixture of two or more kinds. It can, for example, be an alkylcarbonyl ester, an alkenyl carbonyl ester, an aromatic carbonyl ester or an aromatic alkylcarbonyl ester of cellulose, each of which may further have a substituent. Preferred examples of such acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl, among which preferred is acetyl, propionyl, butanoyl, dodecanoyl, octadecanoyl, t-butanoyl, oleoyl, benzoyl, naphthylcarbonyl or cinnamoyl and more preferred is actyl, propionyl or butanoyl.

As a result of an intensive investigation by the present inventors, it is identified, when the acyl substituents on the hydroxyl groups of the cellulose are substantially constituted of at least two of acetyl, propionyl and butanoyl groups, that the optical anisotropy of the cellulose acylate film can be lowered in case of a total substitution degree of 2.50 to 3.00. The acyl substitution degree is more preferably 2.60 to 3.00 and further preferably 2.65 to 3.00.

[Polymerization Degree of Cellulose Acylate]

The cellulose acylate advantageously employed in the present invention preferably has a polymerization degree, in a viscosity-average polymerization degree, of 180 to 700, in case of cellulose acetate, more preferably 180 to 550, further preferably 180 to 400 and particularly preferably 180 to 350. An excessively high polymerization degree increases a viscosity of a dope solution of the cellulose acylate, thereby rendering film preparation by a casting method difficult, while an excessively low polymerization degree deteriorates the strength of the prepared film. An average polymerization degree can be measured by a limit viscosity method of Uda et al. (Kazuo Uda and Hideo Saito, Bulletin of The Society of Fiber Science and Technology, Japan, vol. 18, No. 1, p.105-120(1962)). It is also described in detail in JPA No. 9-95538.

Also a molecular weight distribution of the cellulose acylate advantageously employed in the present invention is evaluated by a gel permeation chromatography, is preferable narrow, with a small dispersion index Mw/Mn (Mw: mass-average molecular weight, Mn: number-average molecular weight). A specific range of Mw/Mn is preferably 1.0 to 3.0, more preferably 1.0 to 2.0 and most preferably 1.0 to 1.6.

An elimination of low-molecular components is effective as the viscosity becomes lower than an ordinary cellulose acylate though an average molecular weight (polymerization degree) is increased. A cellulose acylate with reduced low-molecular components can be obtained by eliminating low-molecular components from a cellulose acylate synthesized by an ordinary method. The elimination of the low-molecular components can be achieved by rinsing the cellulose acylate with an appropriate organic solvent. In case of preparing a cellulose acylate with reduced low-molecular components, an amount of a sulfate catalyst in the acylation reaction is preferably regulated within a range of 0.5 to 25 parts by weight, with respect to 100 parts by weight of cellulose. A sulfate catalyst of an amount within the aforementioned range allows to synthesize a cellulose acylate which is adequate in the molecular weight distribution (with uniform molecular weight distribution). In the preparation of the cellulose acylate, the cellulose acylate preferably has a water content of 2 wt % or less, more preferably 1 wt % or less and particularly preferably 0.7 wt % or less. The cellulose acylate is known to generally contain water, in an amount of 2.5 to 5 wt %. In order to attain the aforementioned water content of the cellulose acylate in the invention, a drying is required and a method thereof is not particularly restricted as long as a desired water content is attained. For the cellulose acylate of the invention, a raw material cotton and a synthesizing method are described in detail in Japan Institute of Invention and Innovation, Technical Publication (Technical Publication No. 2001-1745, p. 7-12, Mar. 15, 2001, published by Japan Institute of Invention and Innovation).

The cellulose acylate mentioned above may be employed singly or in a mixture of two or more kinds, as long as the substituent, the substitution degree, the polymerization degree and the molecular weight distribution are within the aforementioned ranges.

[Additive to Cellulose Acylate]

A solution of the cellulose acylate may be added with various additives (such as a compound for reducing optical anisotropy, a wavelength dispersion regulating agent, an anti-ultraviolet agent, a plasticizer, a anti-deterioration agent, fine particles or an optical property regulating agent) according to various purposes in the preparation steps, and such additives will be explained in the following. Also such addition may be executed in any of steps of preparing a dope, or may be executed by adding a step of adding such additives in a final regulation step in the dope preparing process.

It is preferred to add at least a compound capable of reducing an optical anisotropy of the cellulose acylate film, particularly a retardation Rth in the direction of film thickness represented by a following relation (i), within ranges of following relations (ii) and (iii):

$$R_{th}=((n_x+n_y)/2-n_z) \times d \qquad \text{(i)}$$

$$(R_{th}(A)-R_{th}(0))/A \leq -1.0 \qquad \text{(ii)}$$

$$0.01 \leq A \leq 30 \qquad \text{(iii)}$$

The relations (ii) and (iii) are preferably:

$$(R_{th}(A)-R_{th}(0))/A \leq -2.0 \qquad \text{(ii)}$$

$$0.05 \leq A \leq 25 \qquad \text{(iii)}$$

and further preferably:

$$(R_{th}(A)-R_{th}(0))/A \leq -3.0 \qquad \text{(ii)}$$

$$0.1 \leq A \leq 20. \qquad \text{(iii)}$$

[Structural Feature of Compound for Reducing Optical Anisotropy of Cellulose Acylate Film]

In the following, there will be explained a compound for reducing the optical anisotropy of the cellulose acylate film. The present inventors, as a result of intensive investigations, employ a compound capable of suppressing an alignment of cellulose acylate in the film along the in-plane direction and the direction of film thickness, thereby sufficiently reducing the optical anisotropy to obtain an Re value of 0 and an Rth value close to 0. For this purpose, the optical anisotropy reducing compound is preferably sufficiently soluble mutually with cellulose acylate and does not have a rod-shaped structure or a planar structure in the molecule itself. More specifically, in case the compound has plural planar functional groups such as aromatic groups, there is preferred a non-planar structure which does not have such functional groups on a same plane.

(Log P Value)

In the preparation of the cellulose acylate film, among the aforementioned compound for suppressing an alignment of cellulose acylate in the film along the in-plane direction and the direction of film thickness thereby sufficiently reducing the optical anisotropy, there is preferred a compound having an octanol-water distribution coefficient (log P value) within a range from 0 to 7. A compound having a log P value exceeding 7 is poor in the mutual solubility with cellulose acylate, thus tending to cause a white turbidity or a powdery formation in the film. Also a compound having a log P value less than 0 has a high hydrophilicity and may deteriorate the water resistance of the cellulose acylate film. The log P value is more preferably within a range of 1 to 6, and particularly preferably 1.5 to 5.

The octanol-water distribution coefficient (log P value) can be measured by a flask permeation method described in Japan Industrial Standards (JIS) Z7260-107 (2000). Also the octanol-water distribution coefficient (log P value) may be estimated, instead of an actual measurement, by a calculational chemical method or an empirical method. Such calculation can be executed preferably by Crippen's fragmentation method (J. Chem. Inf. Comput. Sci., 27, 21(1987)), Viswanadhan's fragmentation method (J. Chem. Inf. Comput. Sci., 29, 163(1989)), or Broto's fragmentation method (Eur. J. Med. Chem.-Chim. Theor., 19, 71(1984)), more preferably by Crippen's fragmentation method (J. Chem. Inf. Comput. Sci., 27, 21(1987)). In case a compound shows different log P values depending on the measuring method or the calculation method, the Crippen's fragmentation method is preferably used for judging whether the compound is within a range of the present invention.

[Physical Properties of Compound for Reducing Optical Anisotropy]

An optical anisotropy reducing compound may or may not including an aromatic group. The optical anisotropy reducing compound preferably has a molecular weight of 150 to 3,000, more preferably 170 to 2,000 and particularly preferably 200 to 1,000. Such compound may have, within such range of the molecular weight, a specified monomer structure, or an oligomer structure or a polymer structure formed by a bonding of a plurality of such monomer unit.

The optical anisotropy reducing compound is preferably a liquid at 25° C. or a solid having a melting point of 25 to 250° C., and more preferably a liquid at 25° C. or a solid having a melting point of 25 to 200° C. Also the optical anisotropy reducing compound preferably does not evaporate in the course of casting and drying a dope solution for preparing the cellulose acylate film.

An amount of addition of the optical anisotropy reducing compound is preferably 0.01 to 30 wt % of the cellulose acylate, more preferably 1 to 25 wt %, and particularly preferably 5 to 20 wt %.

The optical anisotropy reducing compound may be employed singly or in a mixture of two or more kinds in an arbitrary ratio.

The optical anisotropy reducing compound may be added any time in the process of preparation of a dope solution, or at the end of such process.

The optical anisotropy reducing compound has an average content, in a portion from at least a surface of the cellulose acylate film to a position of 10% of the total film thickness, of 80 to 99% of an average content of such compound in a central portion of the cellulose acylate film. An amount of the compound of the invention can be determined by measuring amounts of the compound in a surficial portion and a central portion for example by a method utilizing an infrared absorption spectrum, as described in JPA No. 8-57879.

In the following, specific examples of the optical anisotropy reducing compound, advantageously employed in the present invention, will be shown but the present invention is not limited to such examples.

The log P values described in the present invention are determined by Crippen's fragmentation method (J. Chem. Inf. Comput. Sci., 27, 21(1987)).

The optical anisotropy reducing compound can be, for example, a compound represented by a following formula (13):

Formula (13)

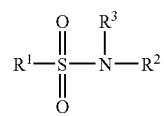

In the formula (13), $R^1$ represents an alkyl group or an aryl group; and $R^2$ and $R^3$ each independently represents a hydrogen atom or a substituted or non-substituted alkyl group or aryl group. It is particularly preferable that $R^1$, $R^2$ and $R^3$ have 10 or more carbon atoms in total. The alkyl group or the aryl group may have at least one substituent. And preferred examples of the substituent include a fluorine atom, an alkyl group, an aryl group, an alkoxy group, a sulfon group and a sulfonamide group; and more preferred examples of the substituent include an alkyl group, an aryl group, an alkoxy group, a sulfon group and a sulfonamide group. Also the alkyl group may be linear, branched or cyclic, and preferably has 1 to 25 carbon atoms, more preferably 6 to 25 carbon atoms and particularly preferably 6 to 20 carbon atoms (such as methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl or didecyl). Also an aryl group preferably has 6 to 30 carbon atoms, and particularly preferably 6 to 24 carbon atoms (such as phenyl, biphenyl, terphenyl, naphthyl, binaphthyl or triphenylphenyl). Preferred examples of the compound represented by the formula (13) are shown in the following, but the present invention is not limited to such examples.

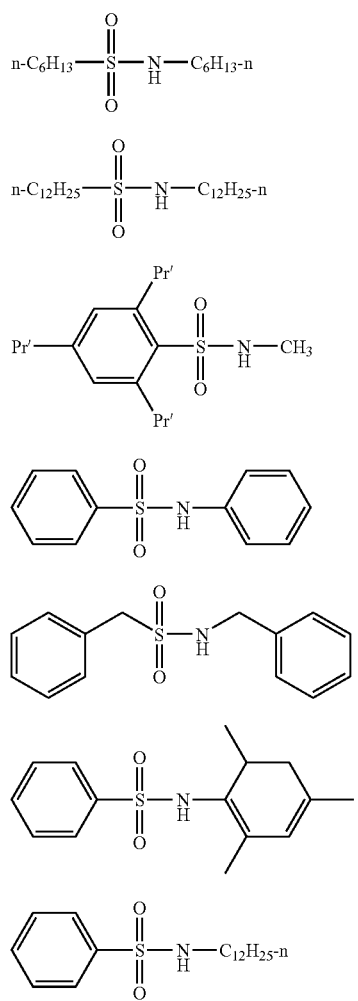

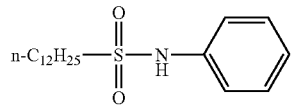

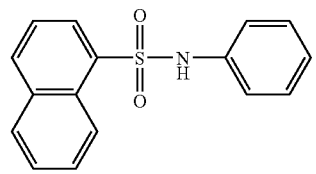

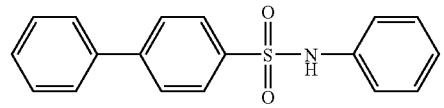

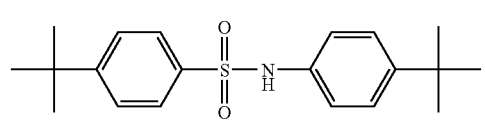

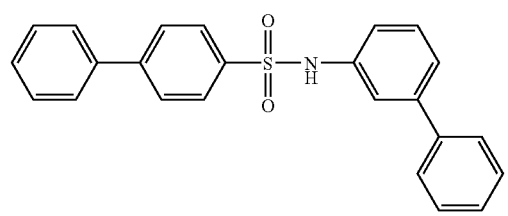

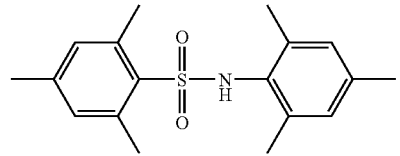

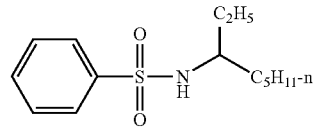

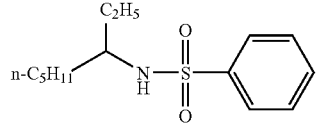

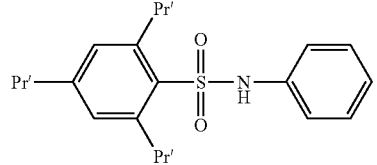

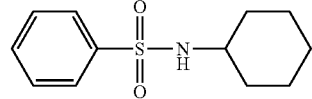

-continued
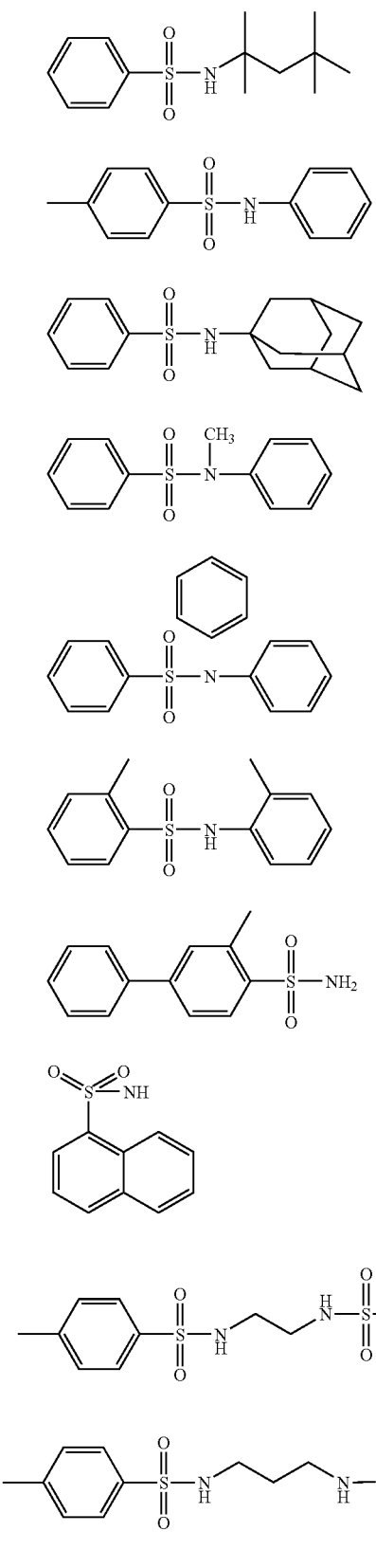
A-18
A-19
A-20
A-21
A-22
A-23
A-24
A-25
A-26
A-27
-continued
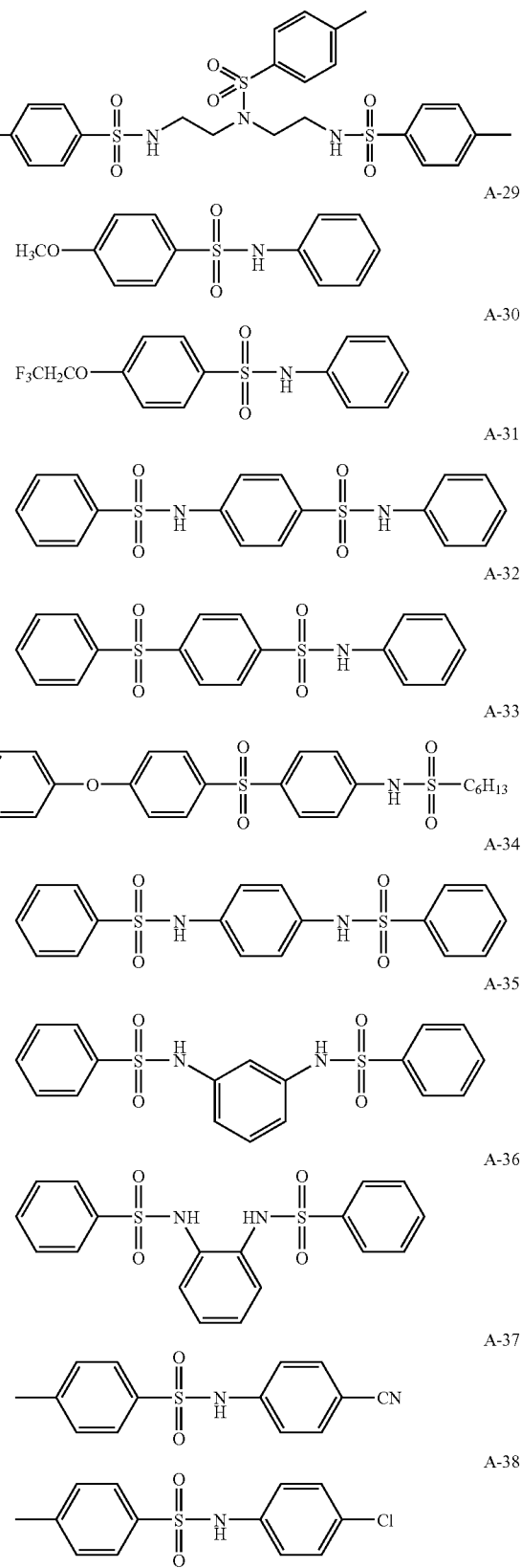
A-28
A-29
A-30
A-31
A-32
A-33
A-34
A-35
A-36
A-37
A-38

-continued

A-39 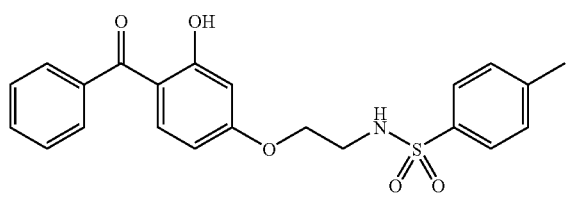

A-40 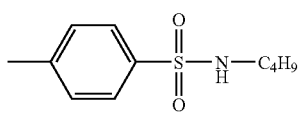

A-41 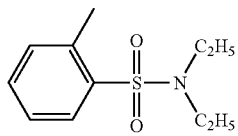

A-42 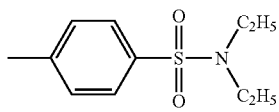

A-43 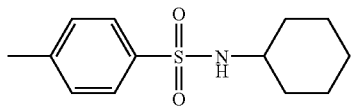

A-44 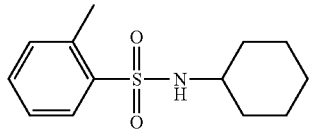

A-45 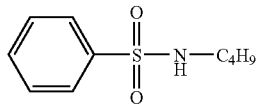

A-46 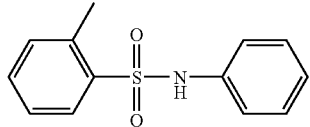

A-47 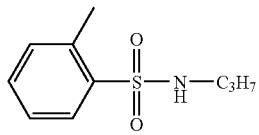

A-48 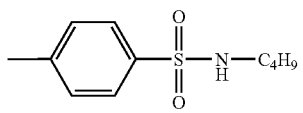

A-49 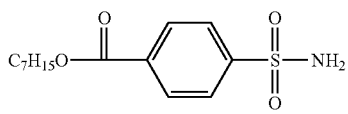

A-50 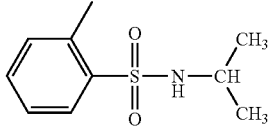

A-51 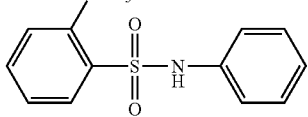

Also as the optical anisotropy reducing compound there is also preferred a compound represented by a following formula (18) or (19):

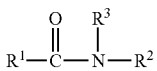

Formula (18)

In the formula (18), $R^1$ represents an alkyl group or an aryl group; and $R^2$ and $R^3$ each independently represents a hydrogen atom, an alkyl group or an aryl group.

Formula (19)

In the formula (19), $R^4$, $R^5$ and $R^6$ each independently represents an alkyl group or an aryl group.

The aforementioned alkyl or aryl group may have a substituent, and preferred examples of such substituent include a halogen atom (such as chlorine, bromine, fluorine or iodine), an alkyl group, an aryl group, an alkoxy group, an aryloxy group, an acyl group, an alkoxycarbonyl group, an aryloxycarbonyl group, an acyloxy group, a sulfonylamino group, a hydroxyl group, a cyano group, an amino group and an acylamino group, more preferred examples include a halogen atom, an alkyl group, an aryl group, an alkoxy group, an aryloxy group, a sulfonylamino group and an acylamino group; and much more preferred examples include an alkyl group, an aryl group, a sulfonylamino group or an acylamino group.

Preferred examples of the compound represented by the formula (18) or (19) are shown in the following, but the present invention is not limited to the examples.

FA-1 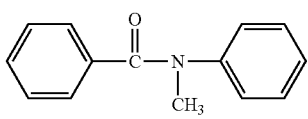

FA-2 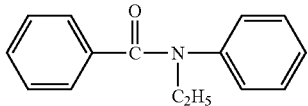

FA-3
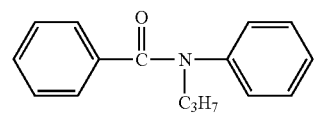
FA-4
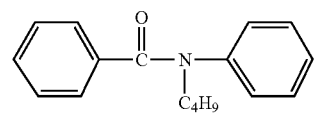
FA-5
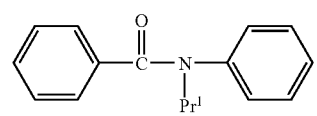
FA-6
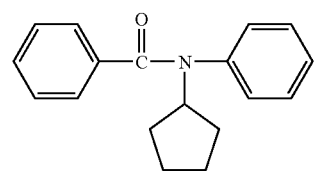
FA-7
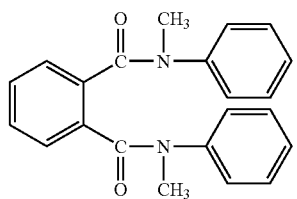
FA-8
FA-9
FA-10
FA-11
FA-12
FA-13
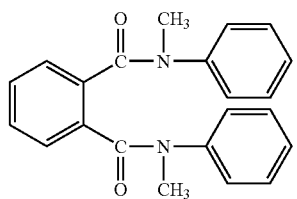
FA-14
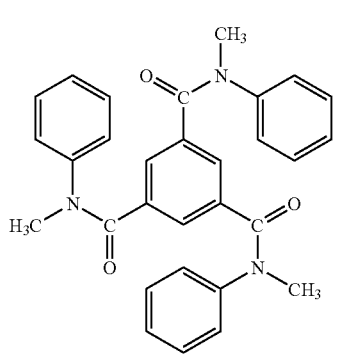
FA-15
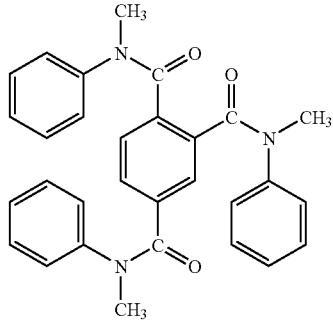
FA-16
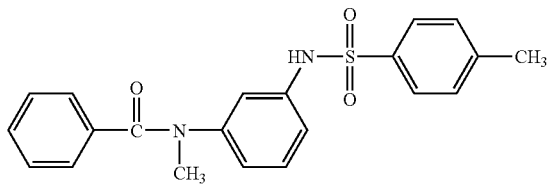
FA-17
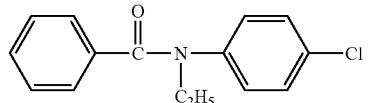
FA-18
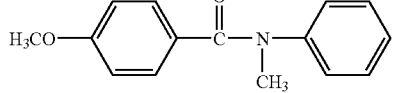
FA-19
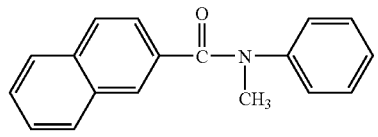

FA-20
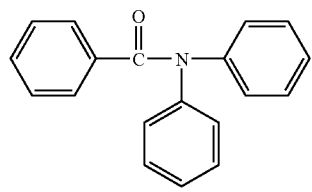
FA-21
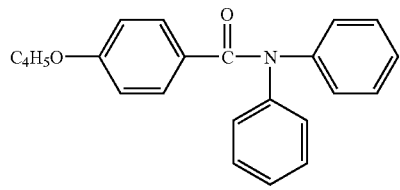
FA-22
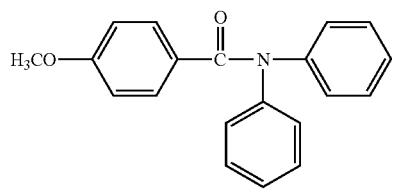
FA-23
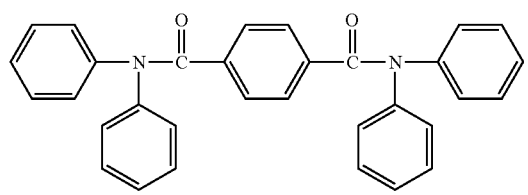
FA-24
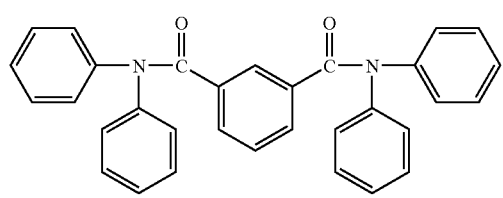
FA-25
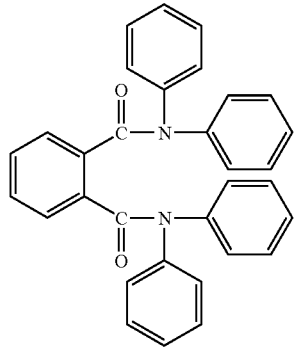
FA-26
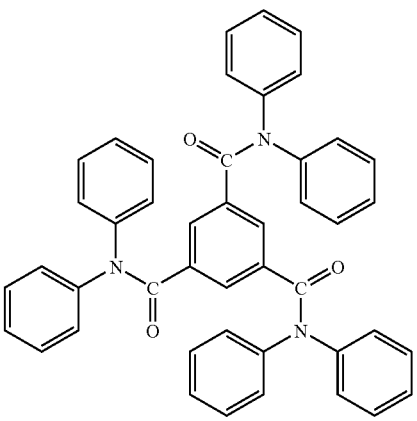
FA-27
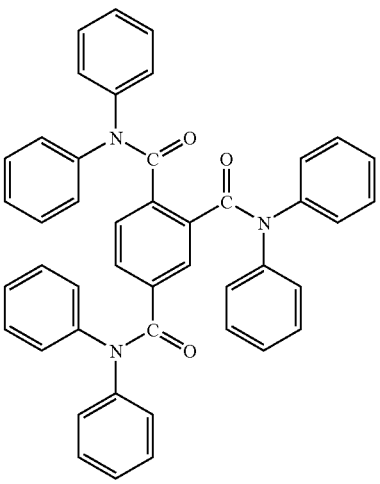
FA-28
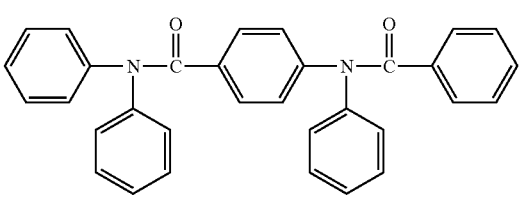
FB-1
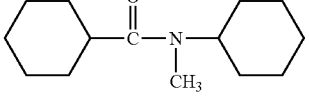
FB-2
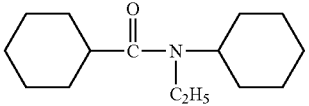
FB-3
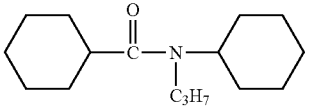
FB-4
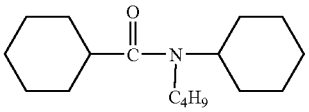

-continued
FB-5
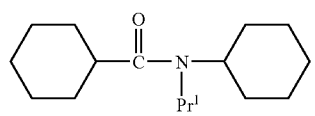
FB-6
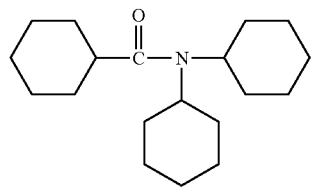
FB-7
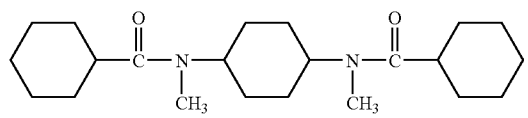
FB-8
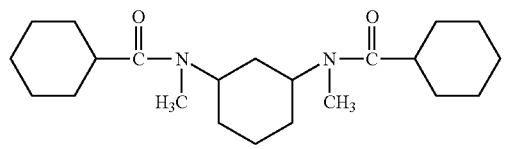
FB-9
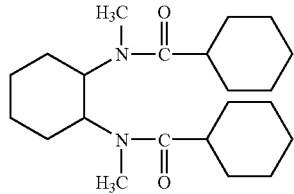
FB-10
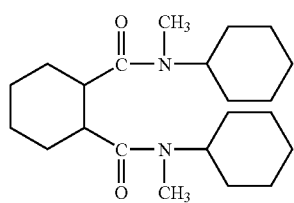
FB-11
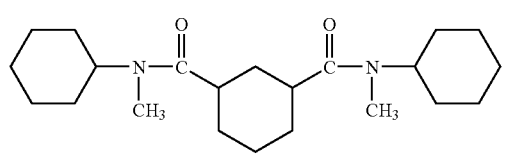
FB-12
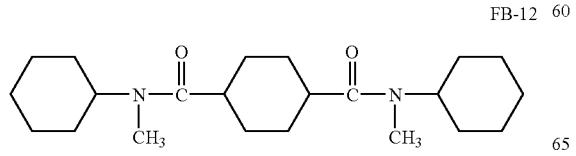
-continued
FB-13
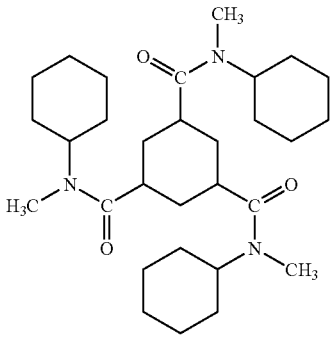
FB-14
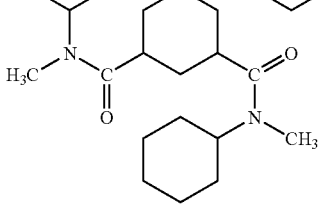
FB-15
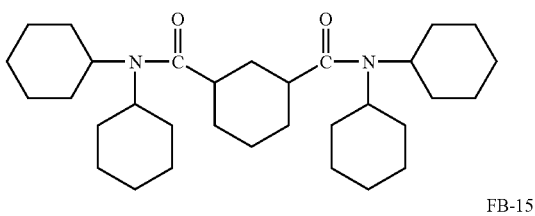
FB-16
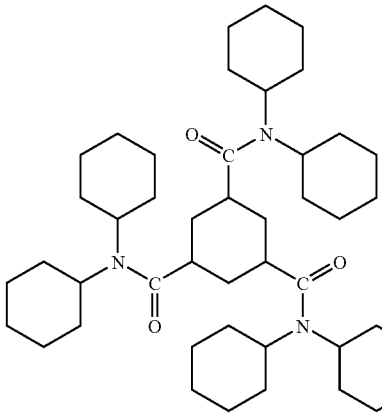
FB-17
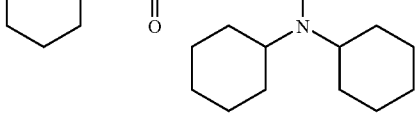
FB-18
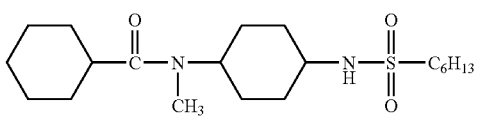
FB-19
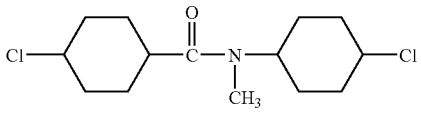

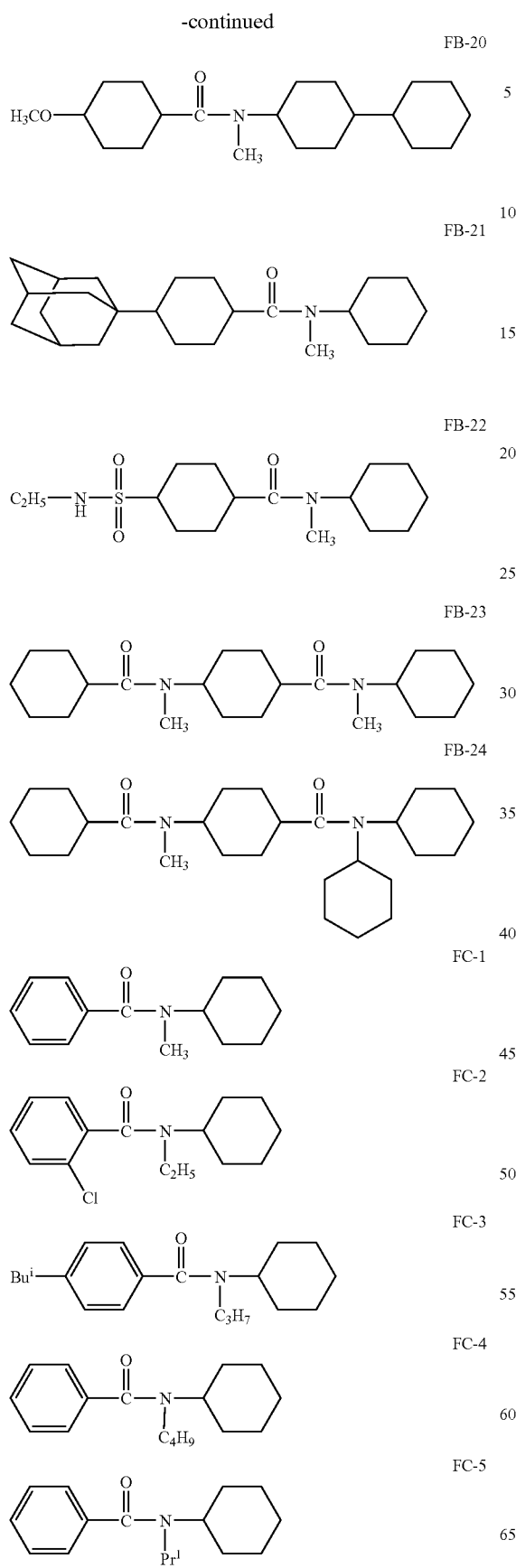
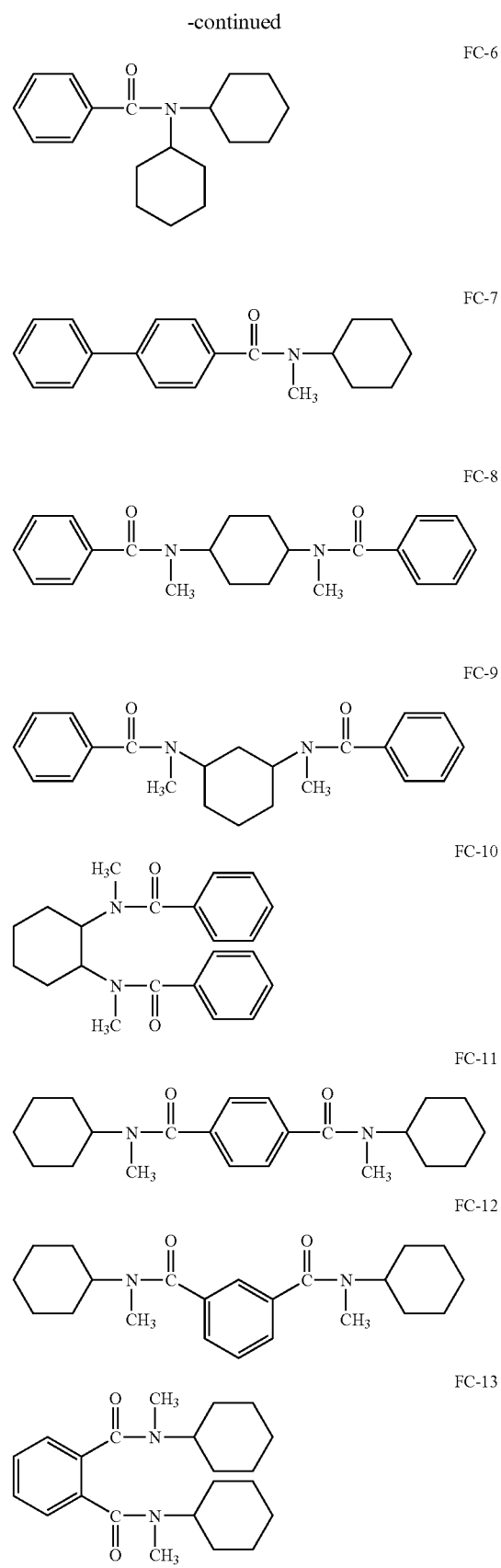

-continued
FC-14
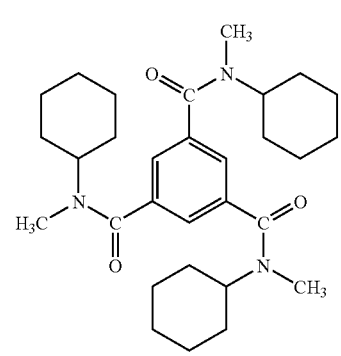
FC-15
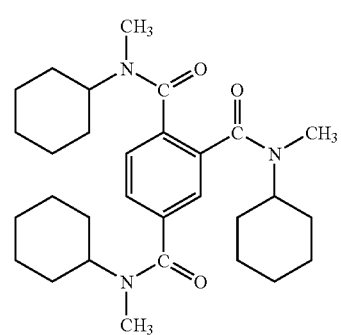
FC-16
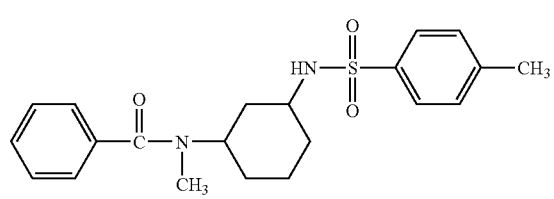
FC-17
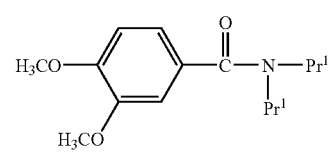
FC-18
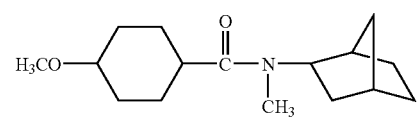
FC-19
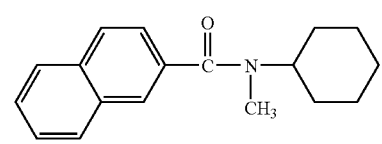
FC-20
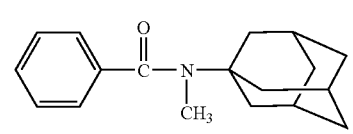
FC-21
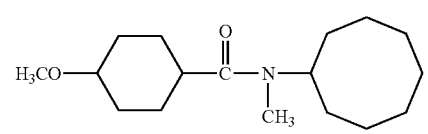
-continued
FC-22
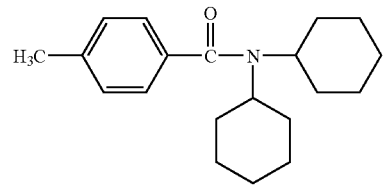
FC-23
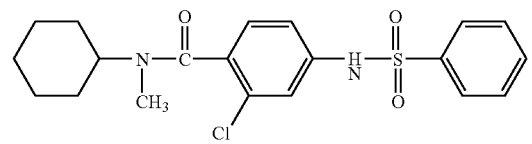
FC-24
FC-25
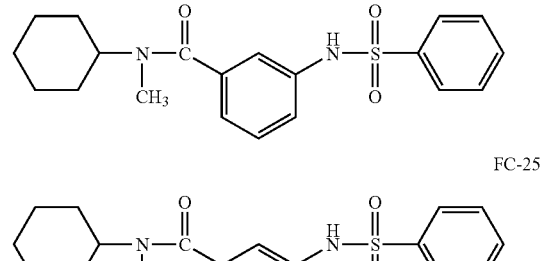
FD-1
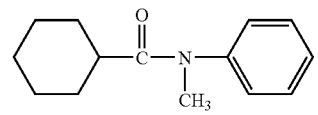
FD-2
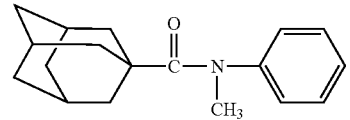
FD-3
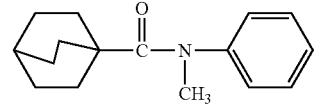
FD-4
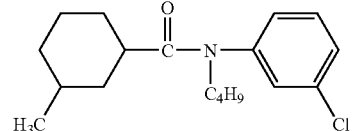
FD-5
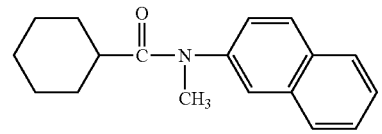

-continued
FD-6
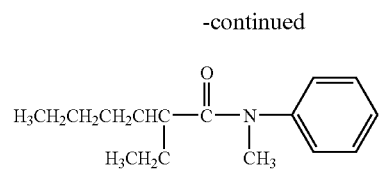
FD-7
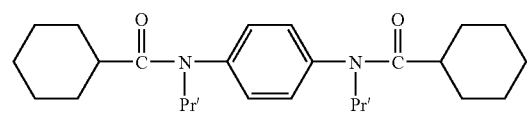
FD-8
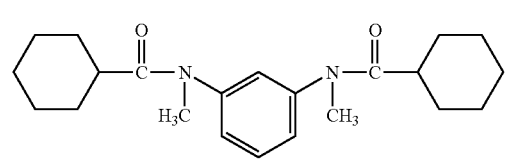
FD-9
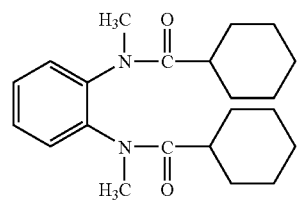
FD-10
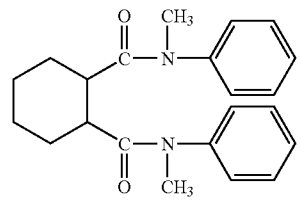
FD-11
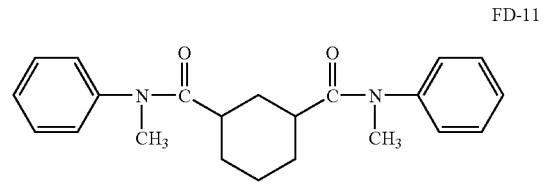
FD-12
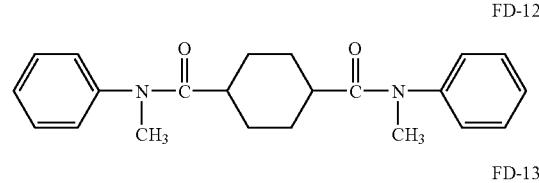
FD-13
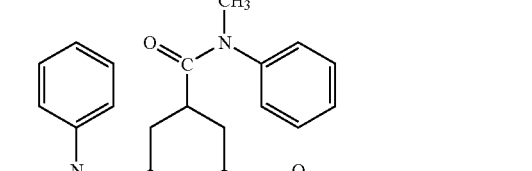
-continued
FD-14
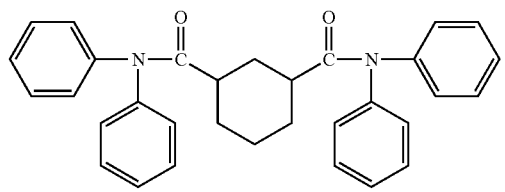
FD-15
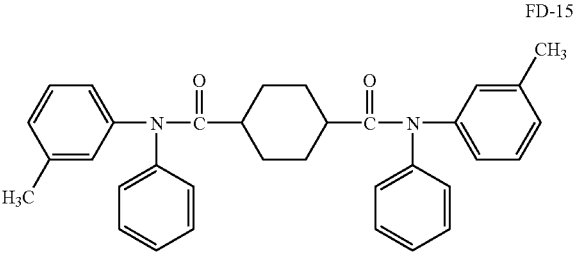
FD-16
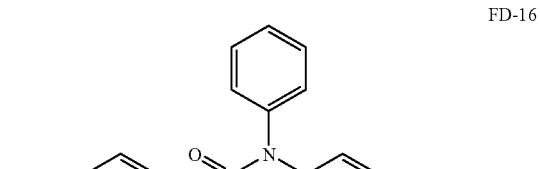
FD-17
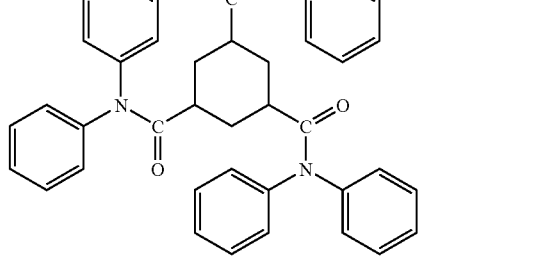
FD-18
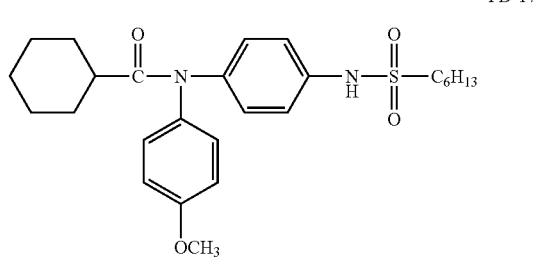
FD-19
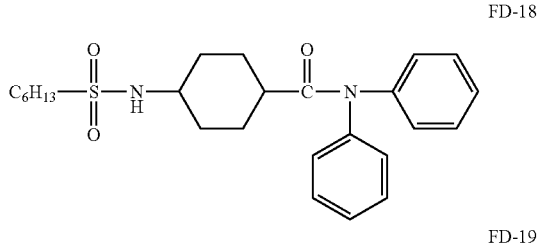

-continued

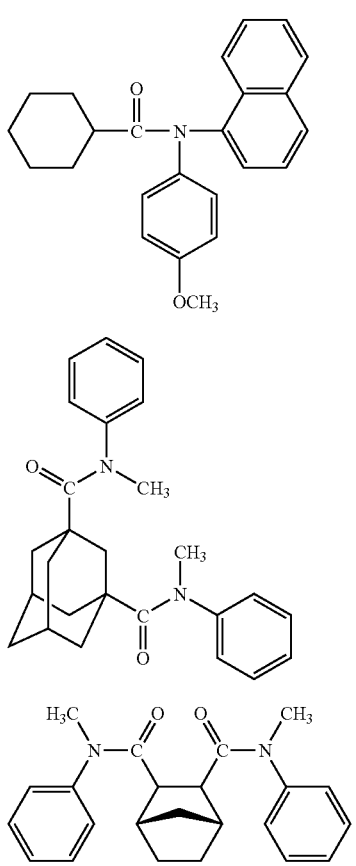

[Wavelength Dispersion Regulating Agent]

A compound for reducing a wavelength dispersion of the cellulose acylate film (hereinafter also called a wavelength dispersion regulating agent) will be explained in the following. For improving the wavelength dispersion of Rth of the cellulose acylate film of the invention, it is preferable to add at least a compound capable of reducing a wavelength dispersion $\Delta Rth=|Rth(400)-Rth(700)|$ of the Rth, as represented by a following formula (iv) within a range of satisfying relations (v) and (vi):

$$\Delta R_{th}=|R_{th}(400)-R_{th}(700)| \quad \text{(iv)}$$

$$(\Delta R_{th}(B)-\Delta R_{th}(0))/B \leq -2.0 \quad \text{(v)}$$

$$0.01 \leq B \leq 30 \quad \text{(vi)}$$

The relations (v) and (vi) are preferably:

$$(\Delta R_{th}(B)-\Delta R_{th}(0))/B \leq -3.0 \quad \text{(v)}$$

$$0.01 \leq B \leq 25 \quad \text{(vi)}$$

and further preferably:

$$(\Delta R_{th}(B)-\Delta R_{th}(0))/B \leq -4.0 \quad \text{(v)}$$

$$0.01 \leq B \leq 20. \quad \text{(vi)}$$

The aforementioned wavelength dispersion regulating agent regulates the wavelength dispersion or Re and Rth of the cellulose acylate film by including at least a compound having an absorption within an ultraviolet region of 200 to 400 nm and capable of reducing |Re(400)−Re(700)| and |Rth(400)−Rth(700)| in an amount of 0.01 to 30 wt. % with respect to a solid of cellulose acylate. An amount of addition of 0.01 to 30 wt. % allows to regulate the wavelength dispersion of Re and Rth of the cellulose acylate film.

The Re and Rth of a cellulose acylate film generally have wavelength dispersion characteristics larger in a longer wavelength side than in a shorter wavelength side. It is therefore required to smooth the wavelength dispersion by increasing relatively smaller Re and Rth of the shorter wavelength side. On the other hand, in a compound having an absorption within an ultraviolet region of 200 to 400 nm, the optical absorbance has wavelength dispersion characteristics larger in a longer wavelength side than in a shorter wavelength side. Thus, in case such compound itself is isotropically dispersed inside the cellulose acylate film, the birefringence of the compound itself, or the wavelength dispersion of Re and Rth, is estimated larger at the shorter wavelength side as in the wavelength dispersion of the optical absorbance.

It is thus possible to regulate the wavelength dispersion of Re and Rth of the cellulose acylate film by employing a compound which has an absorption within an ultraviolet region of 200 to 400 nm and which is expected to have the wavelength dispersion of Re and Rth of the compound itself larger at the shorter wavelength side. For this purpose, the wavelength dispersion regulating compound is required to be sufficiently uniformly dissolved in cellulose acylate. Such compound preferably has an ultraviolet absorption range of 200 to 400 nm, more preferably 220 to 395 nm, and further preferably 240 to 390 nm.

Also in a recent liquid crystal display for use in a television, a notebook personal computer or a mobile terminal, in order to increase the luminance with a lower electric power, optical members to be employed in the liquid crystal display are required to have an excellent transmittance. In this regard, in case of adding a compound having an absorption within an ultraviolet region of 200 to 400 nm and capable of reducing |Re(400)−Re(700)| and |Rth(400)−Rth(700)| to the cellulose acylate film, there is required an excellent spectral transmittance. The cellulose acylate film of the invention preferably has a spectral transmittance of 45 to 95% at a wavelength of 380 nm and a spectral transmittance of 10% or less at a wavelength of 350 nm.

The wavelength dispersion regulating agent, advantageously employed in the present invention, preferably has a molecular weight of 250 to 1,000 in consideration of volatility, more preferably 260 to 800, further preferably 270 to 800, and particularly preferably 300 to 800. Within such molecular weight range, it may have a specified monomer structure, or an oligomer structure or a polymer structure formed by a bonding of plurality of such monomer unit.

The wavelength dispersion regulating agent preferably does not evaporate in the course of casting and drying a dope solution for preparing the cellulose acylate film.

(Amount of Addition of Compound)

An amount of addition of the wavelength dispersion regulating agent advantageously employed in the present invention is preferably 0.01 to 30 wt. % to the cellulose acylate, more preferably 0.1 to 20 wt. % and particularly preferably 0.2 to 10 wt. %.

(Method of Compound Addition)

Also such wavelength dispersion regulating agent may be employed singly or in a mixture of two or more kinds with an arbitrary ratio.

Also the wavelength dispersion regulating agent may be added any time in the process of preparation of a dope solution, or at the end of such process.

Specific examples of the wavelength dispersion regulating agent advantageously employed in the invention include a benzotriazole compound, a benzophenone compound, a compound containing a cyano group, an oxybenzophenone compound, a salicylate ester compound and a nickel complex salt compound, but the present invention is not limited to such examples.

In a benzotriazole compound, a compound represented by a formula (101) can be advantageously employed as a wavelength dispersion regulating agent of the invention:

$$Q^1\text{-}Q^2\text{—OH} \qquad \text{Formula (101)}$$

wherein $Q^1$ represents a nitrogen-containing aromatic heterocycle, and $Q^2$ represents an aromatic ring.

$Q^1$ represents a nitrogen-containing aromatic heterocycle, preferably a 5- to 7-membered nitrogen-containing aromatic heterocycle, more preferably a 5- to 6-membered nitrogen-containing aromatic heterocycle, such as imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purin, pyridine, pyradine, pyrimidine, pyridazine, triazine, triazaindene or tetrazaindene, and more preferably a 5-membered nitrogen-containing aromatic heterocycle, specifically preferably imidazole, pyrazole, triazole, tetrazole, thiazole, oxazole, benzotriazole, benzothiazole, benzoxazole, thiadiazole, or oxadiazole, and particularly preferably benzotriazole.

The nitrogen-containing aromatic heterocycle represented by $Q^1$ may further have a substituent, for which a substituent T to be explained later is applicable. Also in case plural substituents are present, they may be condensed to further form a ring.

The aromatic ring represented by $Q^2$ can be an aromatic hydrocarbon ring or an aromatic heterocycle. It may be a single ring, or may form a condensed ring with another ring.

The aromatic hydrocarbon ring is preferably a single or bicyclic aromatic hydrocarbon ring with 6 to 30 carbon atoms (such as a benzene ring or a naphthalene ring), more preferably an aromatic hydrocarbon ring with 6 to 20 carbon atoms, further preferably an aromatic hydrocarbon ring with 6 to 12 carbon atoms and particularly preferably a benzene ring.

The aromatic heterocycle is preferably an aromatic heterocycle containing a nitrogen atom or a sulfur atom. Specific examples of the heterocycle include thiophene, imidazole, pyrazole, pyridine, pyradine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. The aromatic heterocycle is preferably pyridine, triazine or quinoline.

The aromatic ring represented by $Q^2$ is preferably an aromatic hydrocarbon ring, more preferably a naphthalene ring or a benzene ring, and particularly preferably a benzene ring. $Q^2$ may further have a substituent, preferably a substituent T to be explained later.

A substituent T can be an alkyl group (preferably with 1 to 20 carbon atoms, more preferably 1 to 12 carbon atoms and particularly preferably 1 to 8 carbon atoms, such as methyl, ethyl, iso-propyl, tert-butyl, n-octyl, n-decyl, n-hexadecyl, cyclopropyl, cyclopentyl, or cyclohexyl), an alkenyl group (preferably with 2 to 20 carbon atoms, more preferably 2 to 12 carbon atoms and particularly preferably 2 to 8 carbon atoms, such as vinyl, allyl, 2-butenyl or 3-pentenyl), an alkinyl group (preferably with 2 to 20 carbon atoms, more preferably 2 to 12 carbon atoms and particularly preferably 2 to 8 carbon atoms, such as propalgyl or 3-pentinyl), an aryl group (preferably with 6 to 30 carbon atoms, more preferably 6 to 20 carbon atoms and particularly preferably 6 to 12 carbon atoms, such as phenyl, p-methylphenyl or naphthyl), a substituted or non-substituted amino group (preferably with 0 to 20 carbon atoms, more preferably 0 to 10 carbon atoms and particularly preferably 0 to 6 carbon atoms, such as amino, methylamino, dimethylamino, diethylamino or dibenzylamino), an alkoxy group (preferably with 1 to 20 carbon atoms, more preferably 1 to 12 carbon atoms and particularly preferably 1 to 8 carbon atoms, such as methoxy, ethoxy or butoxy), an aryloxy group (preferably with 6 to 20 carbon atoms, more preferably 6 to 16 carbon atoms and particularly preferably 6 to 12 carbon atoms, such as phenyloxy or 2-naphthyloxy), an acyl group (preferably with 1 to 20 carbon atoms, more preferably 1 to 16 carbon atoms and particularly preferably 1 to 12 carbon atoms, such as acetyl, benzoyl, formyl or pivaroyl), an alkoxycarbonyl group (preferably with 2 to 20 carbon atoms, more preferably 2 to 16 carbon atoms and particularly preferably 2 to 12 carbon atoms, such as methoxycarbonyl or ethoxycarbonyl), an aryloxycarbonyl group (preferably with 7 to 20 carbon atoms, more preferably 7 to 16 carbon atoms and particularly preferably 7 to 10 carbon atoms, such as phenyloxycarbonyl), an acyloxy group (preferably with 2 to 20 carbon atoms, more preferably 2 to 16 carbon atoms and particularly preferably 2 to 10 carbon atoms, such as acetoxy or benzoyloxy), an acylamino group (preferably with 2 to 20 carbon atoms, more preferably 2 to 16 carbon atoms and particularly preferably 2 to 10 carbon atoms, such as acetylamino or benzoylamino), an alkoxycarbonylamino group (preferably with 2 to 20 carbon atoms, more preferably 2 to 16 carbon atoms and particularly preferably 2 to 12 carbon atoms, such as methoxycarbonylamino), an aryloxycarbonylamino group (preferably with 7 to 20 carbon atoms, more preferably 7 to 16 carbon atoms and particularly preferably 7 to 12 carbon atoms, such as phenyloxylcarbonylamino), a sulfonylamino group (preferably with 1 to 20 carbon atoms, more preferably 1 to 16 carbon atoms and particularly preferably 1 to 12 carbon atoms, such as methanesulfonylamino or benzenesulfonylamino), a sulfamoyl group (preferably with 0 to 20 carbon atoms, more preferably 0 to 16 carbon atoms and particularly preferably 0 to 12 carbon atoms, such as sulfamoyl, methylsulfamoyl, dimethylsulfamoyl or phenylsulfamoyl), a carbamoyl group (preferably with 1 to 20 carbon atoms, more preferably 1 to 16 carbon atoms and particularly preferably 1 to 12 carbon atoms, such as carbamoyl, methylcarbamoyl, diethylcarbamoyl, or phenylcarbamoyl), an alkylthio group (preferably with 1 to 20 carbon atoms, more preferably 1 to 16 carbon atoms and particularly preferably 1 to 12 carbon atoms, such as methylthio or ethylthio), an arylthio group (preferably with 6 to 20 carbon atoms, more preferably 6 to 16 carbon atoms and particularly preferably 6 to 12 carbon atoms, such as phenylthio), a sulfonyl group (preferably with 1 to 20 carbon atoms, more preferably 1 to 16 carbon atoms and particularly preferably 1 to 12 carbon atoms, such as mesyl or tosyl), a sulfinyl group (preferably with 1 to 20 carbon atoms, more preferably 1 to 16 carbon atoms and particularly preferably 1 to 12 carbon atoms, such as methanesulfinyl or benzenesulfinyl), an ureido group (preferably with 1 to 20 carbon atoms, more preferably 1 to 16 carbon atoms and particularly preferably 1 to 12 carbon atoms, such as ureido, methylureido, or phenylureido), a phosphate amide group (preferably with 1 to 20 carbon atoms, more preferably 1 to 16 carbon atoms and particularly preferably 1 to 12 carbon atoms, such as diethylphosphate amide or phenylphosphate amide), a hydroxyl group, a mercapto group, a halogen atom (such as a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably with 1 to 30 carbon atoms, more preferably 1 to 12 carbon atoms, in which a hetero atom is for example a nitrogen atom, an oxygen atom, or a sulfur atom, such as imidazolyl, pyridyl, quinolyl, furyl, piperidyl, morpholino, benzoxazolyl, benzimidazolyl, or benzothiazolyl), or a silyl group (preferably with 3 to 40 carbon atoms, more preferably 3 to 30 carbon atoms and particularly preferably 3 to 24 carbon atoms, such as trimethylsilyl or triphenylsilyl). Such substituent may further be substituted. In case two or more substituents are present, they may be same or different, or, if possible, may be mutually connected to form a ring.

The compound of the formula (101) is preferably a compound represented by a formula (101-A).

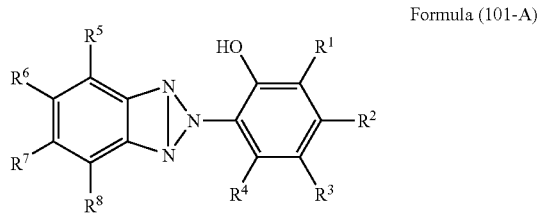

Formula (101-A)

wherein, $R^1$, $R^2$, $R^3$, $R^4$, $R^5$, $R^6$, $R^7$ and $R^8$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent, and, as the substituent, the aforementioned substituent T is applicable. Also such substituent may be substituted with another substituent, and substituents may be mutually condensed to form a cyclic structure.

$R^1$ and $R^3$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or an alkyl group with 1 to 12 carbon atoms, and particularly preferably an alkyl group with 1 to 12 carbon atoms (preferably with 4 to 12 carbon atoms).

$R^2$ and $R^4$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or an alkyl group with 1 to 12 carbon atoms, and particularly preferably a hydrogen atom or a methyl group, and most preferably a hydrogen atom.

$R^5$ and $R^8$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or an alkyl group with 1 to 12 carbon atoms, and particularly preferably a hydrogen atom or a methyl group, and most preferably a hydrogen atom.

$R^6$ and $R^7$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or a halogen atom, and particularly preferably a hydrogen atom or a chlorine atom.

Among the compounds represented by the formula (101), a compound represented by a following formula (101-B) is particularly preferable:

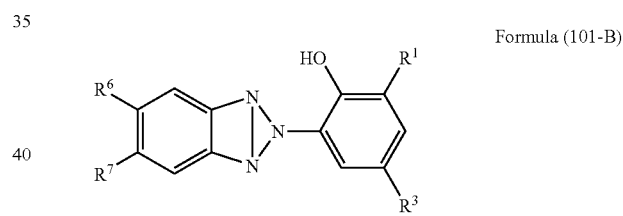

Formula (101-B)

wherein $R^1$, $R^3$, $R^6$ and $R^7$ have same meanings as those in the foregoing formula (101-A), and have same preferable ranges.

Specific examples of the compound represented by the formula (101) are shown in the following, but the present invention is not limited to these examples.

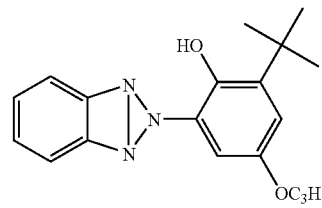

UV-1

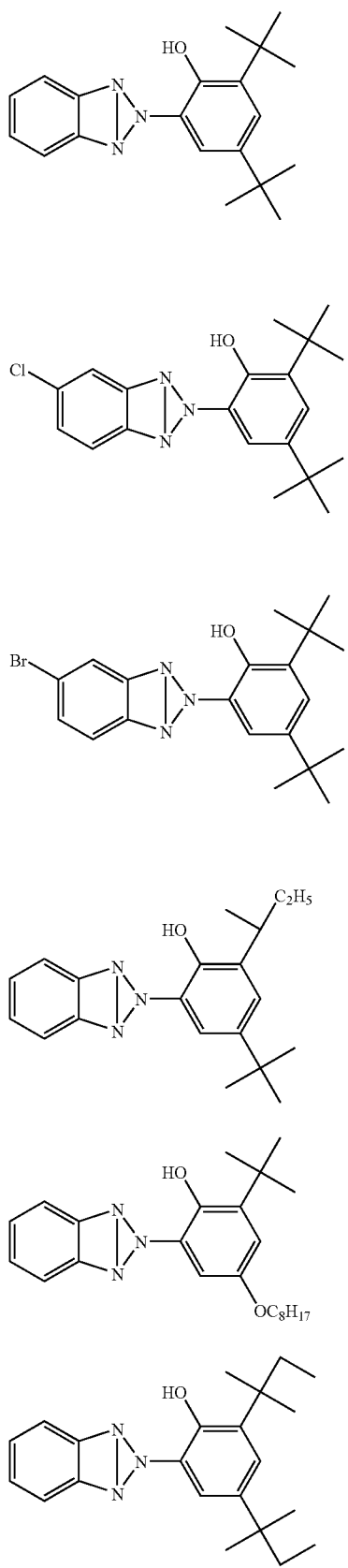
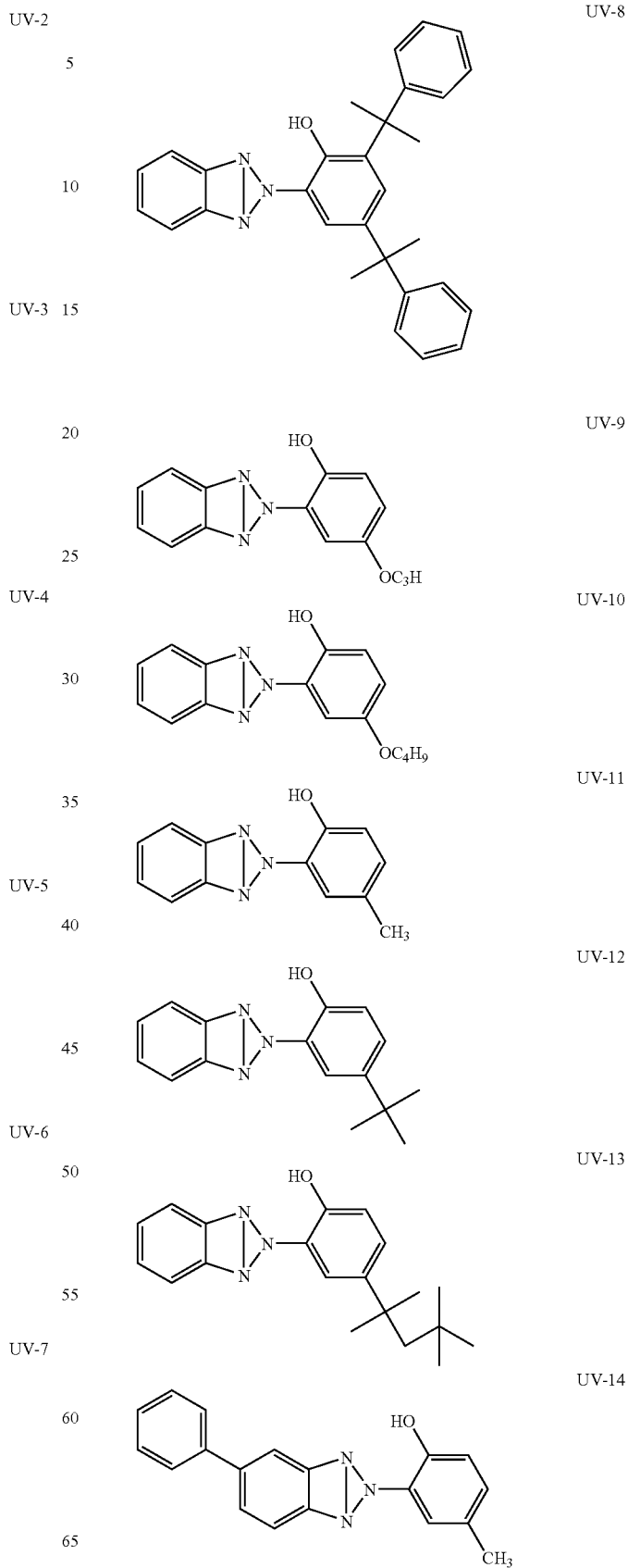

-continued

UV-15
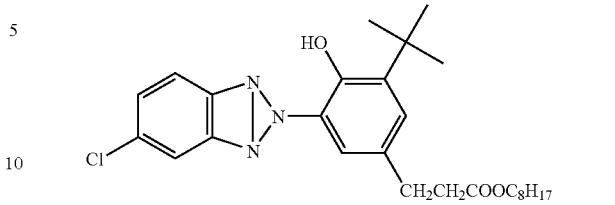

UV-16
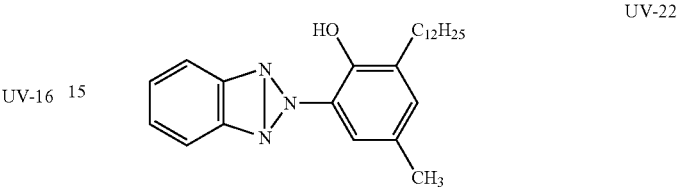

UV-17

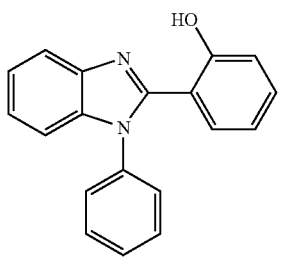

UV-18

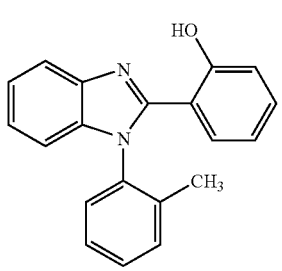

UV-19

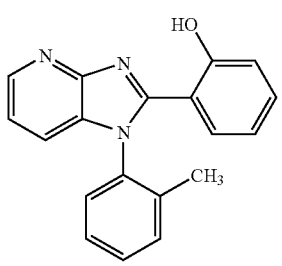

UV-20

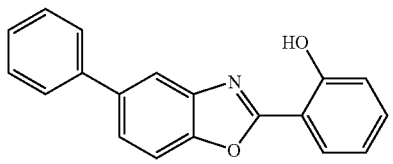

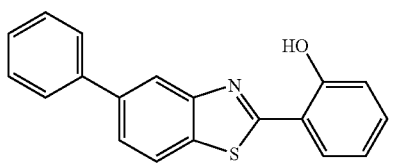

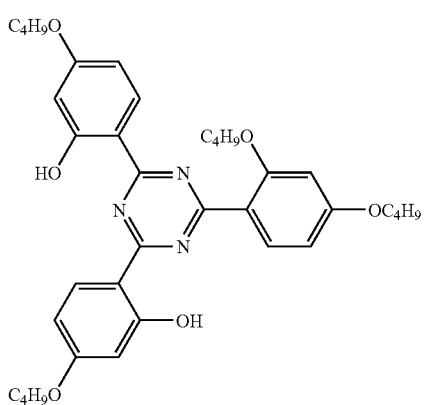

UV-21

UV-22

UV-23

It is confirmed that a cellulose acylate film prepared with the aforementioned benzotriazole compound not including that of a molecular weight of 320 or less is advantageous in a holding property.

As a wavelength dispersion regulating agent of a benzophenone type compound, a compound represented by a following formula (102) is advantageously employed:

Formula (102)

wherein $Q^1$ and $Q^2$ each independently represents an aromatic group; and X represents NR (R being a hydrogen atom or a substituent), an oxygen atom or a sulfur atom.

An aromatic cyclic group represented by $Q^1$ or $Q^2$ may be an aromatic hydrocarbon cyclic group or an aromatic heterocyclic group. Such group may be a single ring or may form a condensed ring with another ring.

An aromatic cyclic group represented by $Q^1$ or $Q^2$ is preferably a single or bicyclic aromatic hydrocarbon cyclic group with 6 to 30 carbon atoms (such as a benzene ring or a naphthalene ring), more preferably an aromatic hydrocarbon cyclic group with 6 to 20 carbon atoms, further preferably an aromatic hydrocarbon cyclic group with 6 to 12 carbon atoms and particularly preferably a group having benzene ring.

An aromatic heterocyclic group represented by $Q^1$ or $Q^2$ is preferably an aromatic heterocyclic group containing at least one of an oxygen atom, a nitrogen atom and a sulfur atom. Specific examples of the heterocycle include furan, pyrrole, thiophene, imidazole, pyrazole, pyridine, pyradine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. The aromatic heterocycle is preferably pyridine, triazine or quinoline.

An aromatic cyclic group represented by $Q^1$ or $Q^2$ is preferably an aromatic hydrocarbon cyclic group, more preferably an aromatic hydrocarbon cyclic group with 6 to 10 carbon atoms, and further preferably a substituted or non-substituted benzene ring group.

$Q^1$ and $Q^2$ each may further have a substituent, which is preferably a substituent T to be explained later, but does not include a carboxylic acid, a sulfonic acid or a quaternary ammonium salt. Also the substituents if possible may be mutually bonded to form a cyclic structure.

X represents NR (R being a hydrogen atom or a substituent to which the substituent T to be explained later is applicable), an oxygen atom or a sulfur atom, and X is preferably NR (R being preferably an acyl group or a sulfonyl group, and such substituent may be further substituted) or O, and particularly preferably O.

A substituent T can be an alkyl group (preferably with 1 to 20 carbon atoms, more preferably 1 to 12 carbon atoms and particularly preferably 1 to 8 carbon atoms, such as methyl, ethyl, iso-propyl, tert-butyl, n-octyl, n-decyl, n-hexadecyl, cyclopropyl, cyclopentyl, or cyclohexyl), an alkenyl group (preferably with 2 to 20 carbon atoms, more preferably 2 to 12 carbon atoms and particularly preferably 2 to 8 carbon atoms, such as vinyl, allyl, 2-butenyl or 3-pentenyl), an alkinyl group (preferably with 2 to 20 carbon atoms, more preferably 2 to 12 carbon atoms and particularly preferably 2 to 8 carbon atoms, such as propalgyl or 3-pentinyl), an aryl group (preferably with 6 to 30 carbon atoms, more preferably 6 to 20 carbon atoms and particularly preferably 6 to 12 carbon atoms, such as phenyl, p-methylphenyl or naphthyl), a substituted or non-substituted amino group (preferably with 0 to 20 carbon atoms, more preferably 0 to 10 carbon atoms and particularly preferably 0 to 6 carbon atoms, such as amino, methylamino, dimethylamino, diethylamino or dibenzylamino), an alkoxy group (preferably with 1 to 20 carbon atoms, more preferably 1 to 12 carbon atoms and particularly preferably 1 to 8 carbon atoms, such as methoxy, ethoxy or butoxy), an aryloxy group (preferably with 6 to 20 carbon atoms, more preferably 6 to 16 carbon atoms and particularly preferably 6 to 12 carbon atoms, such as phenyloxy or 2-naphthyloxy), an acyl group (preferably with 1 to 20 carbon atoms, more preferably 1 to 16 carbon atoms and particularly preferably 1 to 12 carbon atoms, such as acetyl, benzoyl, formyl or pivaroyl), an alkoxycarbonyl group (preferably with 2 to 20 carbon atoms, more preferably 2 to 16 carbon atoms and particularly preferably 2 to 12 carbon atoms, such as methoxycarbonyl or ethoxycarbonyl), an aryloxycarbonyl group (preferably with 7 to 20 carbon atoms, more preferably 7 to 16 carbon atoms and particularly preferably 7 to 10 carbon atoms, such as phenyloxycarbonyl), an acyloxy group (preferably with 2 to 20 carbon atoms, more preferably 2 to 16 carbon atoms and particularly preferably 2 to 10 carbon atoms, such as acetoxy or benzoyloxy), an acylamino group (preferably with 2 to 20 carbon atoms, more preferably 2 to 16 carbon atoms and particularly preferably 2 to 10 carbon atoms, such as acetylamino or benzoylamino), an alkoxycarbonylamino group (preferably with 2 to 20 carbon atoms, more preferably 2 to 16 carbon atoms and particularly preferably 2 to 12 carbon atoms, such as methoxycarbonylamino), an aryloxycarbonylamino group (preferably with 7 to 20 carbon atoms, more preferably 7 to 16 carbon atoms and particularly preferably 7 to 12 carbon atoms, such as phenyloxylcarbonylamino), a sulfonylamino group (preferably with 1 to 20 carbon atoms, more preferably 1 to 16 carbon atoms and particularly preferably 1 to 12 carbon atoms, such as methanesulfonylamino or benzenesulfonylamino), a sulfamoyl group (preferably with 0 to 20 carbon atoms, more preferably 0 to 16 carbon atoms and particularly preferably 0 to 12 carbon atoms, such as sulfamoyl, methylsulfamoyl, dimethylsulfamoyl or phenylsulfamoyl), a carbamoyl group (preferably with 1 to 20 carbon atoms, more preferably 1 to 16 carbon atoms and particularly preferably 1 to 12 carbon atoms, such as carbamoyl, methylcarbamoyl, diethylcarbamoyl, or phenylcarbamoyl), an alkylthio group (preferably with 1 to 20 carbon atoms, more preferably 1 to 16 carbon atoms and particularly preferably 1 to 12 carbon atoms, such as methylthio or ethylthio), an arylthio group (preferably with 6 to 20 carbon atoms, more preferably 6 to 16 carbon atoms and particularly preferably 6 to 12 carbon atoms, such as phenylthio), a sulfonyl group (preferably with 1 to 20 carbon atoms, more preferably 1 to 16 carbon atoms and particularly preferably 1 to 12 carbon atoms, such as mesyl or tosyl), a sulfinyl group (preferably with 1 to 20 carbon atoms, more preferably 1 to 16 carbon atoms and particularly preferably 1 to 12 carbon atoms, such as methanesulfinyl or benzenesulfinyl), an ureido group (preferably with 1 to 20 carbon atoms, more preferably 1 to 16 carbon atoms and particularly preferably 1 to 12 carbon atoms, such as ureido, methylureido, or phenylureido), a phosphate amide group (preferably with 1 to 20 carbon atoms, more preferably 1 to 16 carbon atoms and particularly preferably 1 to 12 carbon atoms, such as diethylphosphate amide or phenylphosphate amide), a hydroxyl group, a mercapto group, a halogen atom (such as a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably with 1 to 30 carbon atoms, more preferably 1 to 12 carbon atoms, in which a hetero atom is for example a nitrogen atom, an oxygen atom, or a sulfur atom, such as imidazolyl, pyridyl, quinolyl, furyl, piperidyl, morpholino, benzoxazolyl, benzimidazolyl, or benzothiazolyl), or a silyl group (preferably with 3 to 40 carbon atoms, more preferably 3 to 30 carbon atoms and particularly preferably 3 to 24 carbon atoms, such as trimethylsilyl or triphenylsilyl). Such substituent may further be substituted. In case two or more substituents are present, they may be same or different, or, if possible, may be mutually connected to form a ring.

Among the compounds represented by the formula (102), a compound represented by a formula (102-A) is preferable.

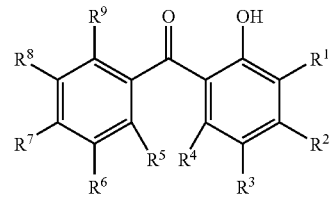

Formula (102-A)

wherein, $R^1$, $R^2$, $R^3$, $R^4$, $R^5$, $R^6$, $R^7$, $R^8$ and $R^9$ each independently represents a hydrogen atom or a substituent.

R$^1$, R$^2$, R$^3$, R$^4$, R$^5$, R$^6$, R$^7$, R$^8$ and R$^9$ each independently represents a hydrogen atom or a substituent, and, as the substituent, the aforementioned substituent T is applicable. Also such substituent may be substituted with another substituent, and substituents may be mutually condensed to form a cyclic structure.

R$^1$, R$^3$, R$^4$, R$^5$, R$^6$, R$^8$ and R$^9$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or an alkyl group with 1 to 12 carbon atoms, particularly preferably a hydrogen atom or a methyl group, and most preferably a hydrogen atom.

R$^2$ is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group with 1 to 12 carbon atoms, an amino group with 0 to 20 carbon atoms, an alkoxy group with 1 to 12 carbon atoms, an aryloxy group with 6 to 12 carbon atoms, or a hydroxyl group, further preferably an alkoxy group with 1 to 20 carbon atoms, and particularly preferably an alkoxy group with 1 to 12 carbon atoms.

R$^7$ is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group with 1 to 20 carbon atoms, an amino group with 0 to 20 carbon atoms, an alkoxy group with 1 to 12 carbon atoms, an aryloxy group with 6 to 12 carbon atoms, or a hydroxyl group, further preferably a hydrogen atom, or an alkyl group with 1 to 20 carbon atoms (preferably 1 to 12 carbon atoms, more preferably 1 to 8 carbon atoms, and further preferably a methyl group), and particularly preferably a methyl group or a hydrogen atom.

Among the compounds represented by the formula (102), a compound represented by a following formula (102-B) is particularly preferable:

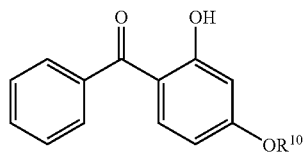

Formula (102-B)

wherein R$^{10}$ represents a hydrogen atom, a substituted or non-substituted alkyl group, a substituted or non-substituted alkenyl group, a substituted or non-substituted alkinyl group, or a substituted or non-substituted aryl group.

R$^{10}$ represents a hydrogen atom, a substituted or non-substituted alkyl group, a substituted or non-substituted alkenyl group, a substituted or non-substituted alkinyl group, or a substituted or non-substituted aryl group, and the aforementioned substituent T is applicable as the substituent.

R$^{10}$ is preferably a substituted or non-substituted alkyl group, more preferably a substituted or non-substituted with 5 to 20 carbon atoms, further preferably a substituted or non-substituted with 5 to 12 carbon atoms (such as an n-hexyl group, a 2-ethylhexyl group, an n-octyl group, an n-decyl group, an n-dodecyl group, or a benzyl group), and particularly preferably a substituted or non-substituted alkyl group with 6 to 12 carbon atoms (such as a 2-ethylhexyl group, an n-octyl group, an n-decyl group, an n-dodecyl group or a benzyl group).

The compound represented by the formula (102) can be synthesized by a known method described in JPA No. 11-12219.

In the following, specific examples of the compound represented by the formula (102) are shown, but the present invention is not limited to such examples.

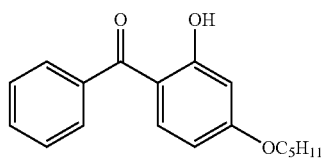
UV-101

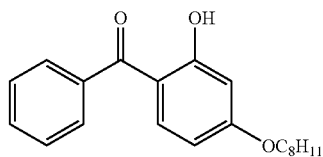
UV-102

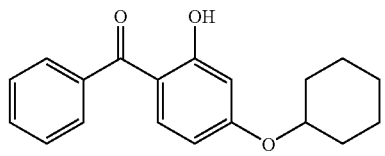
UV-103

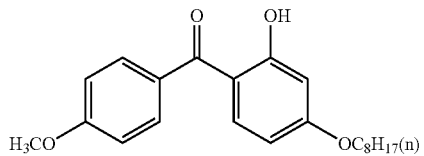
UV-104

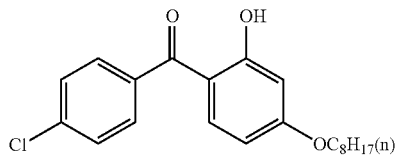
UV-105

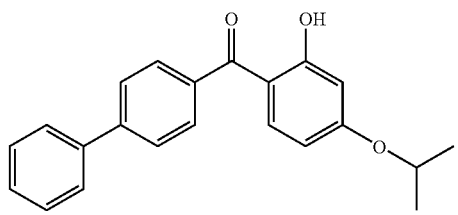
UV-106

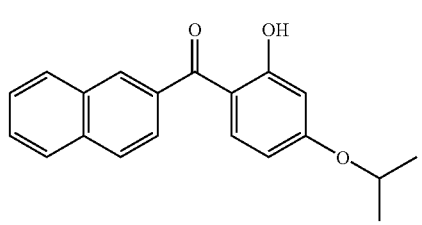
UV-107

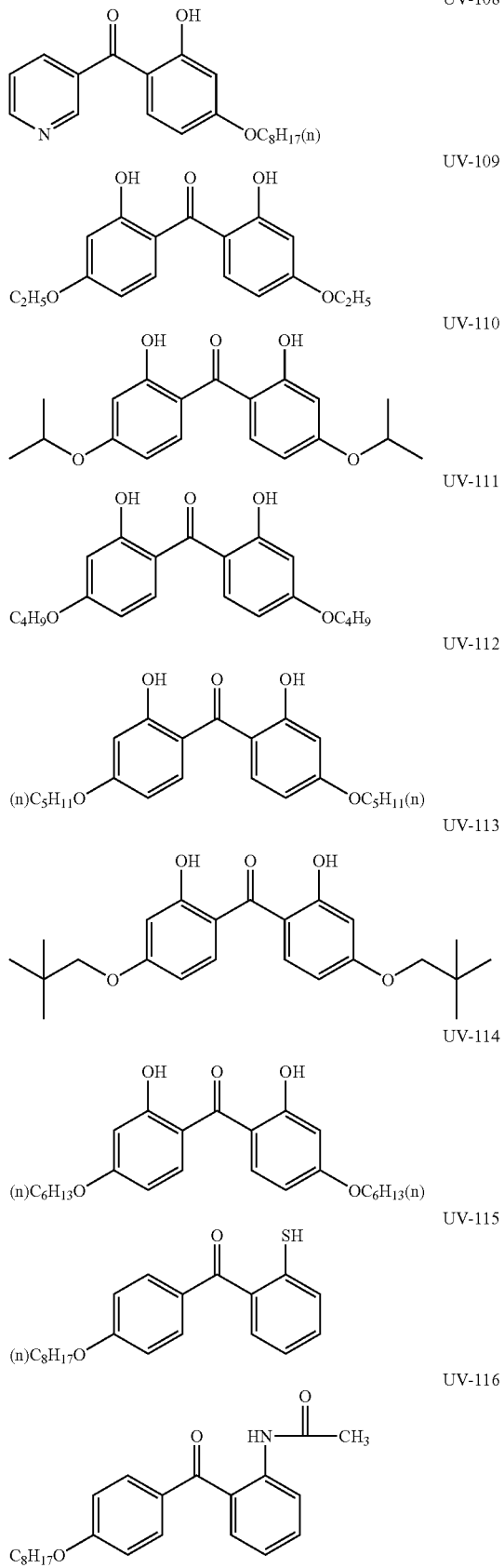
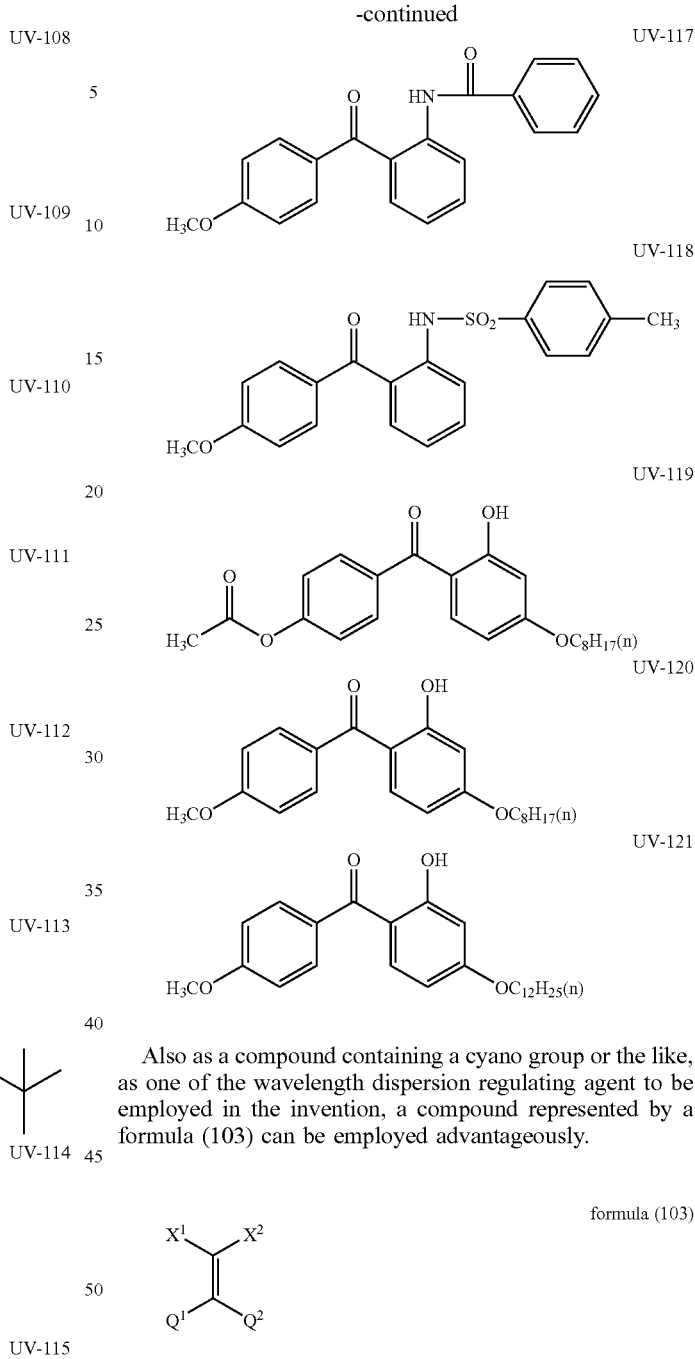

Also as a compound containing a cyano group or the like, as one of the wavelength dispersion regulating agent to be employed in the invention, a compound represented by a formula (103) can be employed advantageously.

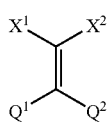

formula (103)

In the formula, $Q^1$ and $Q^2$ each independently represents an aromatic cyclic group. $X^1$ and $X^2$ each represents a hydrogen atom or a substituent, and at least either represents a cyano group, a carbonyl group, a sulfonyl group, or an aromatic heterocyclic group. An aromatic cyclic group represented by $Q^1$ or $Q^2$ may be an aromatic hydrocarbon cyclic group or an aromatic heterocyclic group. Such group may be a single ring or may form a condensed ring with another ring.

An aromatic hydrocarbon cyclic group is preferably a single or bicyclic aromatic hydrocarbon cyclic group with 6 to 30 carbon atoms (such as a benzene ring or a naphthalene ring), more preferably an aromatic hydrocarbon cyclic group with 6 to 20 carbon atoms, further preferably an aromatic hydrocarbon cyclic group with 6 to 12 carbon atoms and particularly preferably a group having benzene ring.

An aromatic heterocyclic group is preferably an aromatic heterocyclic group containing a nitrogen atom or a sulfur atom. Specific examples of the heterocycle include thiophene, imidazole, pyrazole, pyridine, pyradine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. The aromatic heterocycle is preferably pyridine, triazine or quinoline.

An aromatic cyclic group represented by $Q^1$ or $Q^2$ is preferably an aromatic hydrocarbon cyclic group, more preferably a group having a benzene ring.

$Q^1$ and $Q^2$ each may further have a substituent, which is preferably a substituent T to be explained later. A substituent T can be an alkyl group (preferably with 1 to 20 carbon atoms, more preferably 1 to 12 carbon atoms and particularly preferably 1 to 8 carbon atoms, such as methyl, ethyl, iso-propyl, tert-butyl, n-octyl, n-decyl, n-hexadecyl, cyclopropyl, cyclopentyl, or cyclohexyl), an alkenyl group (preferably with 2 to 20 carbon atoms, more preferably 2 to 12 carbon atoms and particularly preferably 2 to 8 carbon atoms, such as vinyl, allyl, 2-butenyl or 3-pentenyl), an alkinyl group (preferably with 2 to 20 carbon atoms, more preferably 2 to 12 carbon atoms and particularly preferably 2 to 8 carbon atoms, such as propalgyl or 3-pentinyl), an aryl group (preferably with 6 to 30 carbon atoms, more preferably 6 to 20 carbon atoms and particularly preferably 6 to 12 carbon atoms, such as phenyl, p-methylphenyl or naphthyl), a substituted or non-substituted amino group (preferably with 0 to 20 carbon atoms, more preferably 0 to 10 carbon atoms and particularly preferably 0 to 6 carbon atoms, such as amino, methylamino, dimethylamino, diethylamino or dibenzylamino), an alkoxy group (preferably with 1 to 20 carbon atoms, more preferably 1 to 12 carbon atoms and particularly preferably 1 to 8 carbon atoms, such as methoxy, ethoxy or butoxy), an aryloxy group (preferably with 6 to 20 carbon atoms, more preferably 6 to 16 carbon atoms and particularly preferably 6 to 12 carbon atoms, such as phenyloxy or 2-naphthyloxy), an acyl group (preferably with 1 to 20 carbon atoms, more preferably 1 to 16 carbon atoms and particularly preferably 1 to 12 carbon atoms, such as acetyl, benzoyl, formyl or pivaroyl), an alkoxycarbonyl group (preferably with 2 to 20 carbon atoms, more preferably 2 to 16 carbon atoms and particularly preferably 2 to 12 carbon atoms, such as methoxycarbonyl or ethoxycarbonyl), an aryloxycarbonyl group (preferably with 7 to 20 carbon atoms, more preferably 7 to 16 carbon atoms and particularly preferably 7 to 10 carbon atoms, such as phenyloxycarbonyl), an acyloxy group (preferably with 2 to 20 carbon atoms, more preferably 2 to 16 carbon atoms and particularly preferably 2 to 10 carbon atoms, such as acetoxy or benzoyloxy), an acylamino group (preferably with 2 to 20 carbon atoms, more preferably 2 to 16 carbon atoms and particularly preferably 2 to 10 carbon atoms, such as acetylamino or benzoylamino), an alkoxycarbonylamino group (preferably with 2 to 20 carbon atoms, more preferably 2 to 16 carbon atoms and particularly preferably 2 to 12 carbon atoms, such as methoxycarbonylamino), an aryloxycarbonylamino group (preferably with 7 to 20 carbon atoms, more preferably 7 to 16 carbon atoms and particularly preferably 7 to 12 carbon atoms, such as phenyloxylcarbonylamino), a sulfonylamino group (preferably with 1 to 20 carbon atoms, more preferably 1 to 16 carbon atoms and particularly preferably 1 to 12 carbon atoms, such as methanesulfonylamino or benzenesulfonylamino), a sulfamoyl group (preferably with 0 to 20 carbon atoms, more preferably 0 to 16 carbon atoms and particularly preferably 0 to 12 carbon atoms, such as sulfamoyl, methylsulfamoyl, dimethylsulfamoyl or phenylsulfamoyl), a carbamoyl group (preferably with 1 to 20 carbon atoms, more preferably 1 to 16 carbon atoms and particularly preferably 1 to 12 carbon atoms, such as carbamoyl, methylcarbamoyl, diethylcarbamoyl, or phenylcarbamoyl), an alkylthio group (preferably with 1 to 20 carbon atoms, more preferably 1 to 16 carbon atoms and particularly preferably 1 to 12 carbon atoms, such as methylthio or ethylthio), an arylthio group (preferably with 6 to 20 carbon atoms, more preferably 6 to 16 carbon atoms and particularly preferably 6 to 12 carbon atoms, such as phenylthio), a sulfonyl group (preferably with 1 to 20 carbon atoms, more preferably 1 to 16 carbon atoms and particularly preferably 1 to 12 carbon atoms, such as mesyl or tosyl), a sulfinyl group (preferably with 1 to 20 carbon atoms, more preferably 1 to 16 carbon atoms and particularly preferably 1 to 12 carbon atoms, such as methanesulfinyl or benzenesulfinyl), an ureido group (preferably with 1 to 20 carbon atoms, more preferably 1 to 16 carbon atoms and particularly preferably 1 to 12 carbon atoms, such as ureido, methylureido, or phenylureido), a phosphate amide group (preferably with 1 to 20 carbon atoms, more preferably 1 to 16 carbon atoms and particularly preferably 1 to 12 carbon atoms, such as diethylphosphate amide or phenylphosphate amide), a hydroxyl group, a mercapto group, a halogen atom (such as a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably with 1 to 30 carbon atoms, more preferably 1 to 12 carbon atoms, in which a hetero atom is for example a nitrogen atom, an oxygen atom, or a sulfur atom, such as imidazolyl, pyridyl, quinolyl, furyl, piperidyl, morpholino, benzoxazolyl, benzimidazolyl, or benzothiazolyl), or a silyl group (preferably with 3 to 40 carbon atoms, more preferably 3 to 30 carbon atoms and particularly preferably 3 to 24 carbon atoms, such as trimethylsilyl or triphenylsilyl). Such substituent may further be substituted. In case two or more substituents are present, they may be same or different, or, if possible, may be mutually connected to form a ring.

$X^1$ and $X^2$ each represents a hydrogen atom or a substituent, and at least either represents a cyano group, a carbonyl group, a sulfonyl group, or an aromatic heterocyclic group. The aforementioned substituent T is applicable to the substituent represented by $X^1$ and $X^2$. Also the substituent represented by $X^1$ and $X^2$ may be substituted with another substituent, and substituents may be mutually condensed to form a cyclic structure.

$X^1$ and $X^2$ each is preferably a hydrogen atom, an alkyl group, an aryl group, a cyano group, a nitro group, a carbonyl group, a sulfonyl group or an aromatic heterocyclic group, more preferably a cyano group, a carbonyl group, a sulfonyl group or an aromatic heterocyclic group, further preferably a cyano group or a carbonyl group and particularly preferably a cyano group or an alkoxycarbonyl group (—C(=O)OR (in which R is an alkyl group with 1 to 20 carbon atoms, an aryl group with 6 to 12 carbon atoms or a combination thereof)).

Among the compounds represented by the formula (103), a compound represented by a formula (103-A) is preferable.

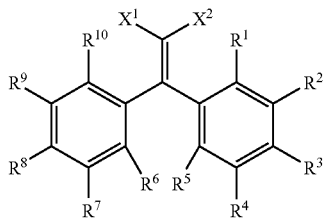

Formula (103-A)

wherein, $R^1$, $R^2$, $R^3$, $R^4$, $R^5$, $R^6$, $R^7$, $R^8$, $R^9$ and $R^{10}$ each independently represents a hydrogen atom or a substituent; $X^1$ and $X^2$ have same meanings as those in the aforementioned formula (103), and have same preferable ranges.

$R^1$, $R^2$, $R^3$, $R^4$, $R^5$, $R^6$, $R^7$, $R^8$, $R^9$ and $R^{10}$ each independently represents a hydrogen atom or a substituent, and, as the substituent, the aforementioned substituent T is applicable. Also such substituent may be substituted with another substituent, and substituents may be mutually condensed to form a cyclic structure.

$R^1$, $R^2$, $R^4$, $R^5$, $R^6$, $R^7$, $R^9$ and $R^{10}$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group, an aryl group, an alkyloxy group, an aryloxy group, or a halogen atom, further preferably a hydrogen atom or an alkyl group with 1 to 12 carbon atoms, particularly preferably a hydrogen atom or a methyl group, and most preferably a hydrogen atom.

$R^3$ and $R^8$ each is preferably a hydrogen atom, an alkyl group, an alkenyl group, an alkinyl group, an aryl group, a substituted or non-substituted amino group, an alkoxy group, an aryloxy group, a hydroxyl group or a halogen atom, more preferably a hydrogen atom, an alkyl group with 1 to 20 carbon atoms, an amino group with 0 to 20 carbon atoms, an alkoxy group with 1 to 12 carbon atoms, an aryloxy group with 6 to 12 carbon atoms, or a hydroxyl group, further preferably a hydrogen atom, an alkyl group with 1 to 12 carbon atoms or an alkoxy group with 1 to 12 carbon atoms, and particularly preferably a hydrogen atom.

Among the compounds represented by the formula (103), a compound represented by a following formula (103-B) is particularly preferable:

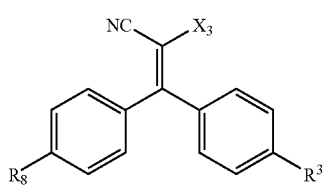

Formula (103-B)

In the formula, $R^3$ and $R^8$ have same meanings as those in the formula (103-A), and have same preferable ranges. $X^3$ represents a hydrogen atom or a substituent.

$X^3$ represents a hydrogen atom or a substituent, to which the aforementioned substituent T is applicable and which may be further substituted with another substituent if possible. $X^3$ is preferably a hydrogen atom, an alkyl group, an aryl group, a cyano group, a nitro group, a carbonyl group, a sulfonyl group or an aromatic heterocyclic group, more preferably a cyano group, a carbonyl group, a sulfonyl group or an aromatic heterocyclic group, further preferably a cyano group or a carbonyl group and particularly preferably a cyano group or an alkoxycarbonyl group (—C(=O)OR (in which R is an alkyl group with 1 to 20 carbon atoms, an aryl group with 6 to 12 carbon atoms or a combination thereof)).

Among the compounds represented by the formula (103), a compound represented by a formula (103-C) is further preferable.

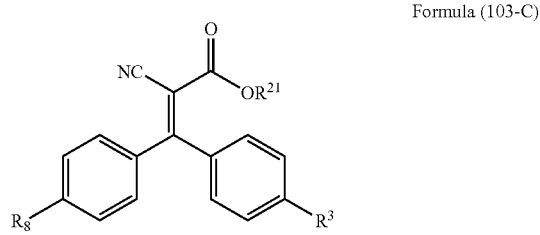

Formula (103-C)

In the formula, $R^3$ and $R^8$ have same meanings as those in the formula (103-A), and have same preferable ranges. $R^{21}$ represents an alkyl group with 1 to 20 carbon atoms.

In case $R^3$ and $R^8$ are both hydrogen atoms, $R^{21}$ is preferably an alkyl group with 2 to 12 carbon atoms, more preferably an alkyl group with 4 to 12 carbon atoms, further preferably an alkyl group with 6 to 12 carbon atoms, particularly preferably an n-octyl group, a tert-octyl group, a 2-ethylhexyl group, an n-decyl group, or an n-dodecyl group, and most preferably a 2-ethylhexyl group.

In case $R^3$ and $R^8$ are other than hydrogen atoms, $R^{21}$ is preferably such an alkyl group with 20 or less carbon atoms that the compound represented by the formula (103-C) has a molecular weight of 300 or larger.

The compound represented by the formula (103-C) can be synthesized by a method described in Journal of American Chemical Society, 63, p. 3452(1941).

In the following, specific examples of the compound represented by the formula (103-C) are shown, but the present invention is not limited to such examples.

UV-201

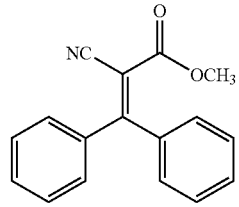

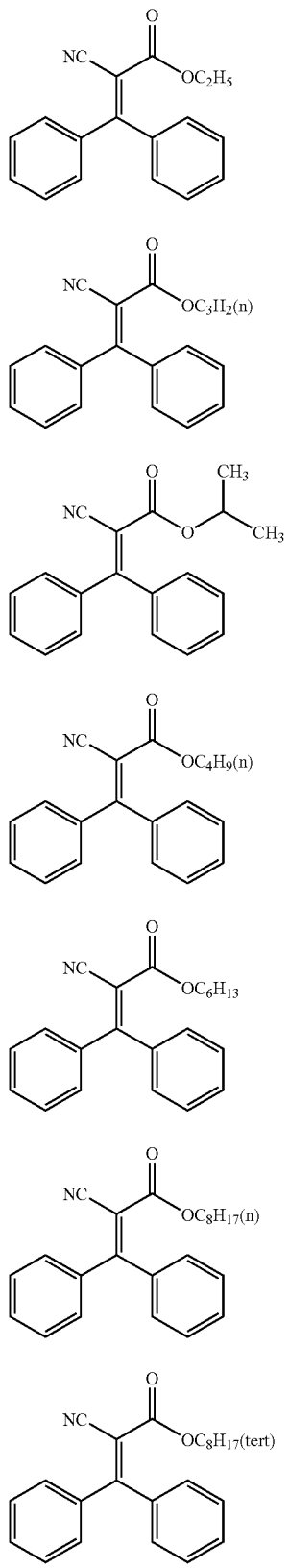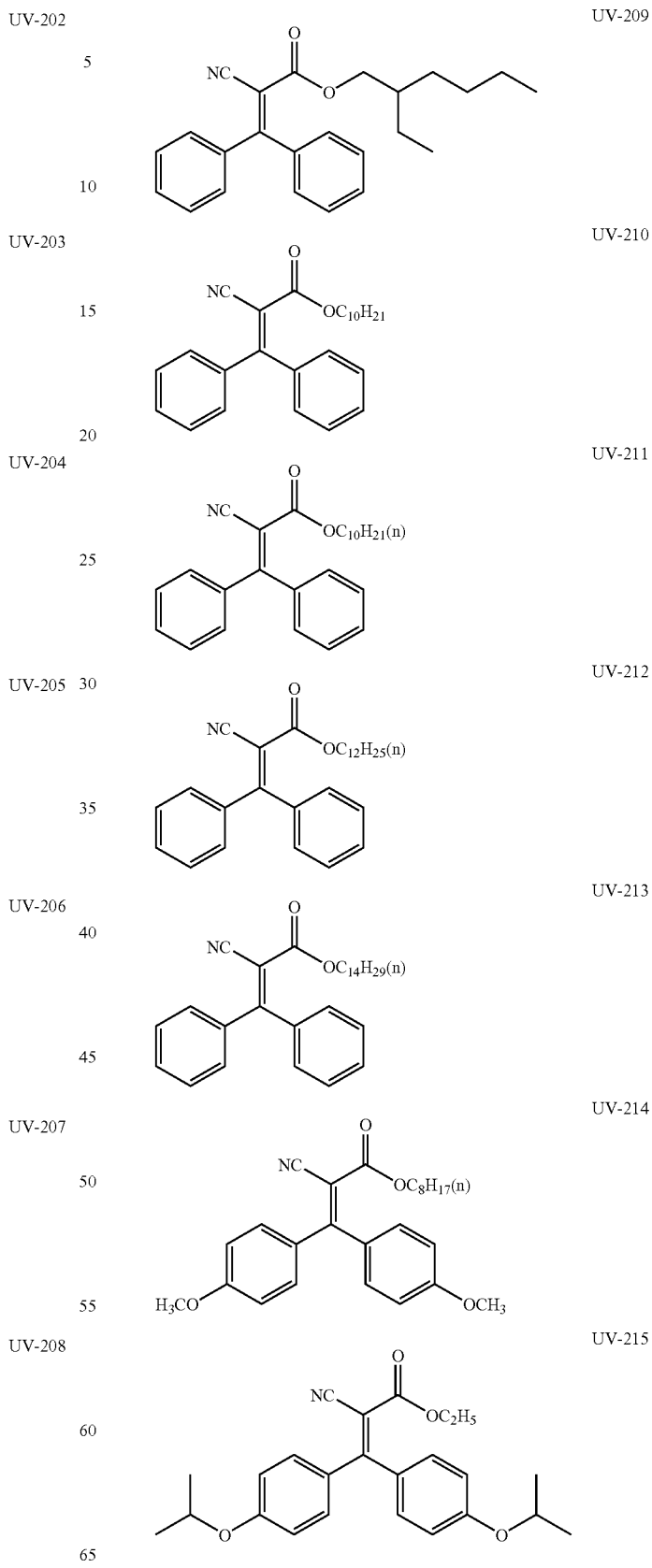

-continued
UV-216
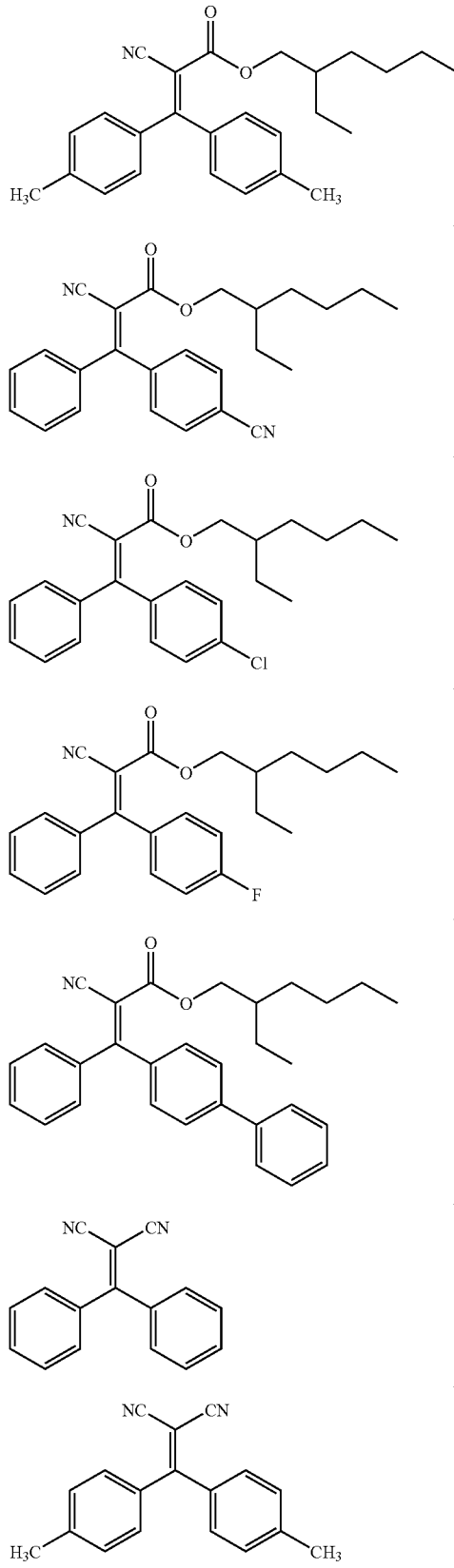
UV-217
UV-218
UV-219
UV-220
UV-221
UV-222
-continued
UV-223
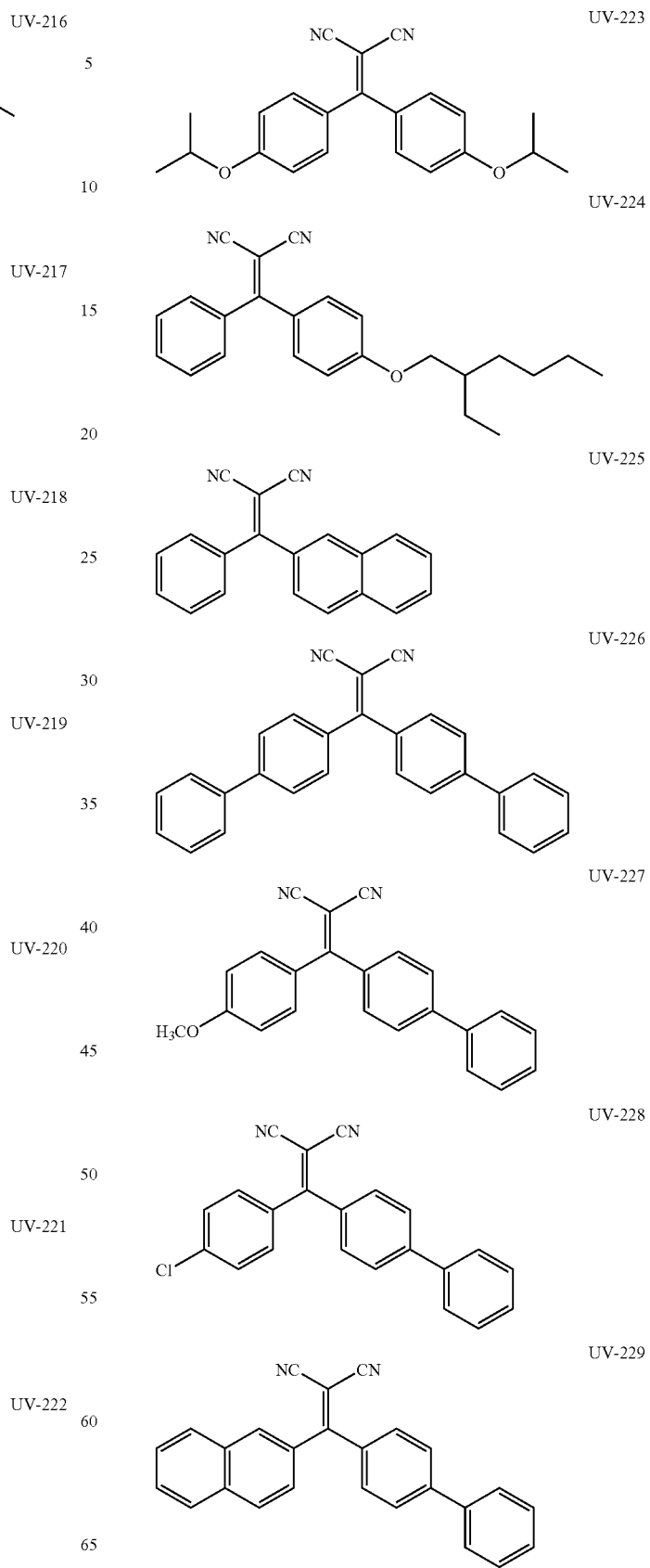
UV-224
UV-225
UV-226
UV-227
UV-228
UV-229

-continued

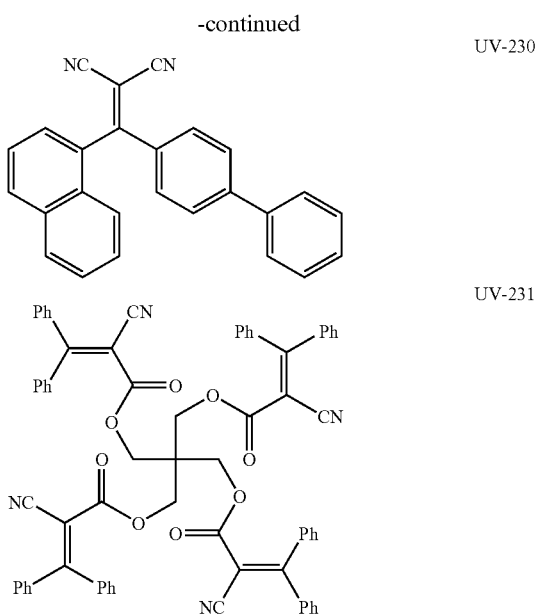

UV-230

UV-231

[Fine Particle Matting Agent]

In the cellulose acylate film of the invention, fine particles are preferably added as a matting agent. The fine particles employable in the invention can be, for example, silicon dioxide, titanium dioxide, aluminum oxide, zirconium oxide, calcium carbonate, calcium carbonate, talc, clay, calcined caolin, calcined calcium silicate, hydrated calcium silicate, aluminum silicate, magnesium silicate and calcium phosphate. Silicon-containing fine particles are preferred because the turbidity can be lowered, and silicon dioxide is particularly preferable. The fine particles of silicon dioxide preferably have an average primary particle size of 20 nm or less, and an apparent specific gravity of 70 g/L or higher. An average primary particle size as small as 5 to 16 nm is preferable in reducing a haze of the film. An apparent specific gravity is preferably 90 to 200 g/L or higher, and further preferably 100 to 200 g/L or higher. A larger apparent specific gravity is preferred as it enables to prepare a dispersion of a higher concentration, and it reduces haze and agglomeration.

Such fine particles usually form secondary particles of an average particle size of 0.1 to 3.0 μm, which are present in the film as agglomerates of the primary particles and form irregularities of 0.1 to 3.0 μm on the film surface. An average particle size of the secondary particles is preferably 0.2 to 1.5 μm, more preferably 0.4 to 1.2 μm, and most preferably 0.6 to 1.1 μm. The primary or second particle size was obtained by observing particles in the film by a scanning electron microscope and by taking a diameter of a circumscribed circle of the particle. An average particle size was obtained by an average value of 200 particles observed in different locations.

The silicon dioxide fine particles can be a commercially available product such as Aerosil R972, R972V, R974, R812, 200, 200V, 300, R202, OX50, or TT600 (foregoing manufactured by Nippon Aerosil Co.). Also fine particles or zirconium oxide can be a commercially available product, such as Aerosil R976 or R811 (foregoing manufactured by Nippon Aerosil Co.).

Among these, Aerosil 200V and R972V are particularly preferable as they are silicon dioxide fine particles having an average primary particle size of 20 nm or less and an apparent specific gravity of 70 g/L or larger, thus capable of friction coefficient while maintaining a low turbidity in the optical film.

In the invention, in order to obtain a cellulose acylate film including particles of a small secondary average particle size, there can be conceived certain methods in preparing a dispersion of the fine particles. For example, there can be employed a method of preparing in advance a fine particle dispersion by mixing a solvent and fine particles under agitation, then dissolving such fine particle dispersion under agitation in a small amount of a cellulose acylate solution prepared separately, and mixing it with a principal cellulose acylate dope. This method is preferable in that the fine particles of silicon dioxide show a satisfactory dispersibility and are not easily agglomerated again. There is also available a method of dissolving a small amount of a cellulose ester under agitation in a solvent, then dispersing fine particles therein with a disperser to obtain a liquid for adding the fine particles, and mixing such liquid with the dope solution in an in-line mixer. The present invention is not limited to such methods, and a concentration of the silicon dioxide fine particles at a dispersion thereof in a solvent or the like is preferably 5 to 30 wt %, more preferably 10 to 25 wt %, and most preferably 15 to 20 wt %. A higher dispersion concentration is preferred as it reduces a liquid turbidity to the amount of addition, and reduces haze and agglomeration. In a final cellulose acylate dope solution, an amount of addition of the matting agent is preferably 0.01 to 1.0 g/m², more preferably 0.03 to 0.3 g/m², and most preferably 0.08 to 0.16 g/m².

A solvent to be used, in case of a lower alcohol, can preferably be methyl alcohol, ethyl alcohol, propyl alcohol, isopropyl alcohol or butyl alcohol. Other solvents than the lower alcohol may also be used without restriction, but it is preferable to use a solvent that is employed at a film formation of cellulose ester.

[Plasticizer, Deterioration Preventing Agent, Releasing Agent]

The cellulose acylate film of the invention may include, in addition to the optical anisotropy reducing compound and the wavelength dispersion regulating agent mentioned above, various additives (such as a plasticizer, an anti-ultraviolet agent, an anti-deterioration agent, a releasing agent, and an infrared absorber), which may be added in the preparation steps according to the purpose and which may be a solid or an oily substance. Stated differently, these substances are not restricted by a melting point or a boiling point thereof. For example, a mixing of an ultraviolet absorber at 20° C. or lower or at 20° C. or higher, and a mixing of a plasticizer are possible as described in JPA No. 2001-151901. Also an infrared absorber is described for example in JPA No. 2001-194522. Also the addition may be executed any time in the process of preparation of a dope solution, or by adding a step of additive addition in a final adjustment step of such process. An amount of addition of each material is not particularly restricted as long as a function thereof can be exhibited. Also in case the cellulose acylate film is constituted of plural layers, a kind and an amount of the additive may be different in each layer. These are known technologies as described for example in JPA No. 2001-151902. For such technologies, there are preferably employed materials described in detail in Japan Institute of Invention and Innovation, Technical Publication (Technical Publication No. 2001-1745, p. 16-22, Mar. 15, 2001, published by Japan Institute of Invention and Innovation).

[Ratio of Addition of Compounds]

In the cellulose acylate film of the invention, a total amount of compounds having a molecular weight of 3,000 or less is preferably 5 to 45% with respect to the weight of cellulose acylate, more preferably 10 to 40% and further preferably 15 to 30%. Such compounds include an optical anisotropy reducing compound, a wavelength dispersion regulating agent, an anti-ultraviolet agent, a plasticizer, an anti-deterioration agent, fine particles, a releasing agent, an infrared absorber and the like as described above, and preferably have a molecular weight of 3,000 or less, more preferably 2,000 or less and further preferably 1,000 or less. In case a total amount of these compounds is less than 5%, properties of the cellulose acylate alone tend to be exhibited, thereby resulting in fluctuations in optical performances and physical strength in response to changes in temperature and humidity. Also a total amount of these compounds above 45% may exceeds a limit of solubility of these compounds in the cellulose acylate film, thus causing a precipitation on the film surface and leading to a white turbidity of the film (bleeding from the film).

[Organic Solvent for Cellulose Acylate Solution]

In the invention, the cellulose acylate film is preferably produced by a solvent cast method, utilizing a solution (dope) prepared by dissolving cellulose acylate in an organic solvent. A principal solvent to be employed in the invention is preferably selected from an ester, a ketone and an ether with 3 to 12 carbon atoms, and a halogenated hydrocarbon with 1 to 7 carbon atoms. The ester, ketone or ether may have a cyclic structure. A compound having two or more functional groups of ester, ketone or ether (namely —O—, —CO— or —COO—) can also be employed as a principal solvent, and another functional group such as an alcoholic hydroxyl group may be present. In a principal solvent having two or more functional groups, a number of carbon atoms of such solvent is maintained within a range defined for a compound having either of such functional groups.

For the cellulose acylate film of the invention, a halogenated hydrocarbon of chlorine type may be employed as the principal solvent, or a non-chlorine solvent may be employed as the principal solvent as described in Japan Institute of Invention and Innovation, Technical Publication No. 2001-1745, p. 12-16, and such principal solvent is not particularly restricted for the cellulose acylate film of the invention.

A solvent for the cellulose acylate solution and film of the invention, including a dissolving method, is described, as preferred embodiments, in following patent literatures: JPA Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752 and 11-60752. These patent literatures describe not only a solvent preferable for the cellulose acylate of the invention but also properties of a solution thereof and substances to be present, and constitute preferable embodiments also in the present invention.

[Manufacturing Process of Cellulose Acylate Film]

[Dissolving Step]

A solution (dope) of the cellulose acylate of the invention is not restricted in a method of dissolution, and may be prepared at a room temperature, or by a cooled dissolving method or a high-temperature dissolving method, or a combination thereof. For a step of preparation of a cellulose acylate solution of the invention, and steps of concentration and filtration of the solution associated with the dissolving step, there can be advantageously employed a manufacturing process described in detail in Japan Institute of Invention and Innovation, Technical Publication (Technical Publication No. 2001-1745, p. 22-25, Mar. 15, 2001, published by Japan Institute of Invention and Innovation).

(Transparency of Dope Solution)

The dope solution of the cellulose acylate of the invention preferably has a transparency of 85% or higher, more preferably 88% or higher and further preferably 90% or higher. In the present invention, it was confirmed that various additives were sufficiently dissolved in the dope solution of cellulose acylate. More specifically, a transparency of the dop is determined by pouring the dope solution in a glass cell of 1 cm, and measuring an absorbance at 550 nm by a spectrophotmeter (UV-3150, manufactured by Shimadzu Ltd.). The transparency of the cellulose acylate solution is calculated, by measuring the solvent only as a blank, from a ratio to the absorbance of the blank.

[Casting, Drying and Winding Steps]

In the following, a film producing method utilizing the cellulose acylate solution of the invention will be explained. For a method and a facility for producing the cellulose acylate film of the invention, there can be utilized a solution casting method and solution casting facility employed in the prior manufacture of the cellulose triacetate film. A dope (cellulose acylate solution) prepared in a dissolver (pot) is stored in a storage pot for debubbling and is used for a final preparation. The dope is supplied, from a dope exit, for example through a pressurized constant-rate gear pump capable of a high precision feeding by a resolution to a pressurized die, then is uniformly cast through a slit of the pressurized die onto a metal substrate running endlessly in a casting area, and is peeled off from the metal substrate at a peeling point after an approximate turn of the metal substrate, in a state of a semi-dried dope film (also called a web). The obtained web is pinched on both edges with clips, and dried by a transportation in a tenter under a maintaining of a width to obtain a film, which is mechanically conveyed by rolls of a drying and, upon completion of drying, wound into a roll of a predetermined length by a winder. A combination of the tenter and the rolls of the drying is variable according to the purpose. In the solution casting method to be employed for a functional protective film for an optical member of an electronic display or for a silver halide-based photographic material, which are principal applications of the cellulose acylate film of the invention, a coating is often added, to the solution casting, for the purpose of surface treatments such as forming an undercoat layer, an antistatic layer, an antihalation layer or a protective layer. Such technologies are described in detail in Japan Institute of Invention and Innovation, Technical Publication (Technical Publication No. 2001-1745, p. 25-30, Mar. 15, 2001, published by Japan Institute of Invention and Innovation) in classifications of casting (including co-casting), metal substrate, drying, peeling and the like and can be employed advantageously in the invention.

The cellulose acylate film preferably has a thickness of 10 to 120 µm, more preferably 20 to 100 µm and further preferably 30 to 90 µm.

Figure 2:
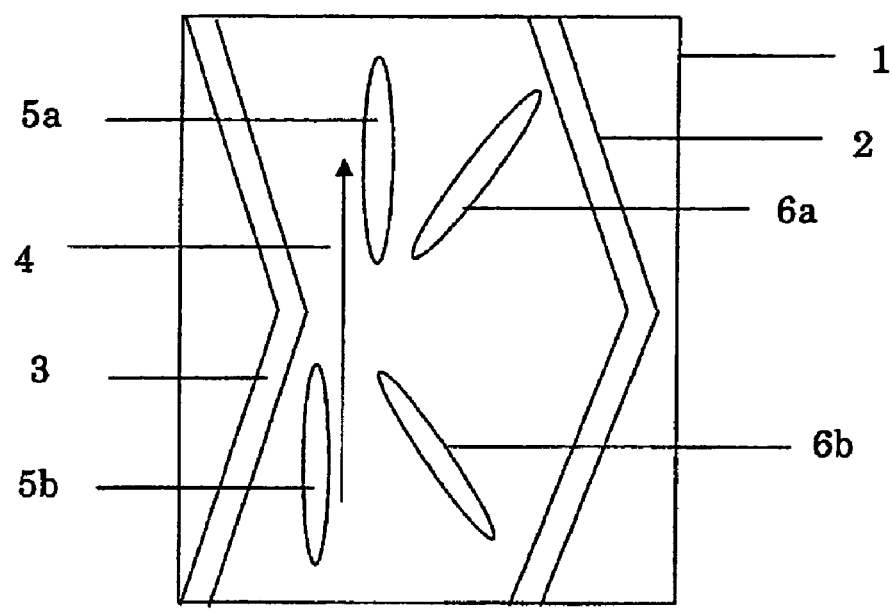
FIG. 2 is a schematic view showing an example of a pixel area of a liquid crystal display of the present invention.
Figure 3:
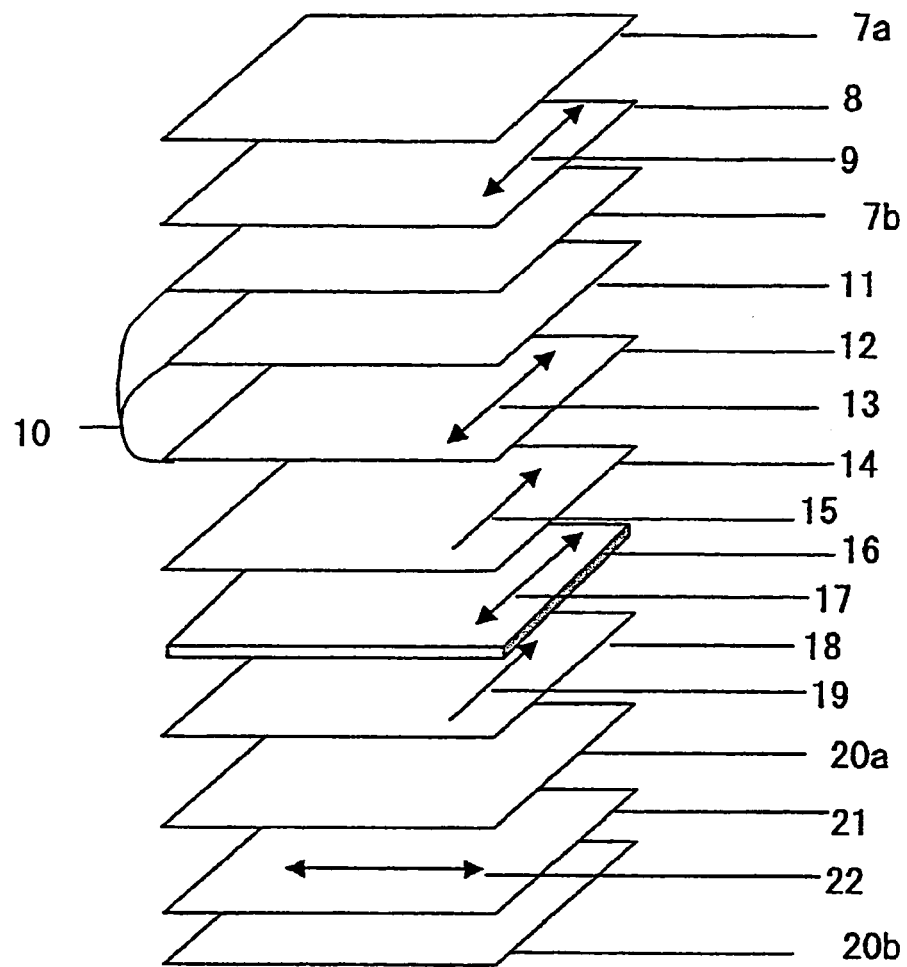
FIG. 3 is a schematic view showing an example of a liquid crystal display of the present invention.

In the following, an embodiment of the liquid crystal display of the invention will be explained in detail, with reference to the accompanying drawings, in which FIG. 2 is a schematic view showing an example of pixel areas of the liquid crystal display of the invention, and FIG. 3 is a schematic view of an embodiment of the liquid crystal display of the invention.

[Liquid Crystal Display]

A liquid crystal display shown in FIG. 3 is provided with a first polarizing film 8, a retardation film 10 of the invention, a first substrate 14, a liquid crystal layer 16, a second substrate 18, and a second polarizing film 22. The first polarizing film 8 and the second polarizing film 22 are respectively sandwiched between protective films 7a, 7b and protective films 20a, 20b.

The retardation film 10 consists of a first retardation area 11, which is a transparent substrate having the protective film 7b in contact with the first polarizing film 8, and a second retardation area 12 which is an optically anisotropic layer.

In the liquid crystal display shown in FIG. 3, a liquid crystal cell is constituted of the first substrate 14, the second substrate 18, and the liquid crystal layer 16 sandwiched therebetween. In the liquid crystal layer, a product $\Delta n \cdot d$ of a thickness d (μm) thereof and a refractive index anisotropy $\Delta n$ is optimally within a range of 0.2 to 0.4 μm in an IPS type not having a twisted structure in a transmission mode. Within such range, a high white luminance and a low black luminance can be obtained, and, thus, the display can give a high brightness and a high contrast. On surfaces of the substrates 14, 18 in contact with the liquid crystal layer 16, there are formed alignment layers (not shown in FIG. 3) to align the liquid crystal molecules substantially parallel to the substrate surface and to control the alignment direction of the liquid crystal molecules in a state with no or little voltage application by a rubbing direction 15, 19 applied onto the alignment layers. Also on the internal surface of the substrate 14 or 18, electrodes (not shown in FIG. 3) are formed for applying a voltage to the liquid crystal molecules.

FIG. 2 schematically shows an alignment of the liquid crystal molecules within a pixel area of the liquid crystal layer 16. FIG. 2 is a schematic view showing an alignment of the liquid crystal molecules within a very small area approximately corresponding to a pixel area of the liquid crystal layer 16, together with a rubbing direction 4 of the alignment layers formed on the internal surfaces of the substrates 14 and 18, and electrodes 2, 3 formed on the internal surfaces of the substrates 14 and 18 for applying a voltage to the liquid crystal molecules. In case of an active drive utilizing a nematic liquid crystal having a positive dielectric anisotropy as a field effect liquid crystal, the liquid crystal molecules are aligned in directions 5a, 5b in a state with no or little voltage application, in which a black state is obtained. When a voltage is applied between the electrodes 2 and 3, the alignment of the liquid crystal molecules is shifted to directions 6a, 6b according to the voltage. A white state is usually obtained in this state.

Referring again to FIG. 3, a transmission axis 9 of the first polarizing film 8 and a transmission axis 22 of the second polarizing film 21 are positioned mutually orthogonally. The retardation film 10 of the invention is constituted of two areas, namely a first retardation area 11 which is a transparent substrate, and a second retardation area 12 which is an optically anisotropic layer. A slow axis 13 of the second retardation area 12 is parallel to the transmission axis 9 of the first polarizing film 8 and a slow axis 17 of the liquid crystal molecules in the liquid crystal layer 16 in a black state, and the second retardation area 12 is positioned closer to the liquid crystal layer 16 than the first retardation area 11. The optical characteristics preferred for the two areas (transparent substrate and optically anisotropic layer) constituting the retardation film of the invention are as explained in the foregoing.

FIG. 3 shows a liquid crystal display of a configuration in which the fist polarizing film 8 is sandwiched between two protective films 7a and 7b, but the protective film 7b may be absent. In a configuration without the protective film 7b, the first retardation area 11, constituted by the transparent substrate of the retardation film of the invention, serves also as a protective film for the polarizing film 8. In the liquid crystal display shown in FIG. 3, also the second polarizing film 21 is sandwiched by two protective films 20a, 20b. The protective film 20a, closer to the liquid crystal layer 16, preferably has a retardation Rth in the direction of thickness of 20 nm or less. Examples of the second polarizing film and of the protective films 20a, 20b thereof are same as explained in the foregoing.

FIG. 3 shows an embodiment of the display of a transmission mode having polarizing plates in the upper and lower sides, but the present invention is applicable also to a reflective mode having only one polarizing plate, and in such case, the optimum value of $\Delta n$-d becomes about ½ of the aforementioned value because the optical path within the liquid crystal cell is doubled.

The liquid crystal display of the invention is not limited to a configuration shown in FIGS. 1 and 2 but may include other components. For example, a color filter may be provided between the liquid crystal layer and the polarizing film. Also an antireflection treatment or a hard coating may be applied on the surface of the protective film for the polarizing film. Also there may be employed a component having an electroconductivity. Also in a transmission type, a back light source employing a cold or hot cathode fluorescent tube, a light emitting diode, a field emission element or an electroluminescence element can be provided in the rear side. Also a reflective polarizing plate, a diffusing plate, a prism sheet or a light guide plate may be positioned between the liquid crystal layer and the back light. Furthermore, the liquid crystal display of the invention may be constructed as a reflective type, and, in such case, only one polarizing plate is required at the observed side and a reflective film is provided at the back of the liquid crystal cell or on the internal surface of the lower substrate of the liquid crystal cell. It is naturally possible to provide a front light, utilizing the aforementioned light source, in the observed side of the liquid crystal cell.

The liquid crystal display of the invention includes a direct image observation type, an image projection type and a light modulation type. The invention is particularly effective in an embodiment applied to an active matrix liquid crystal display utilizing 3- or 2-terminal semiconductor devices such as TFT or MIM. The invention is naturally effective also in an embodiment applied to a passive matrix liquid crystal display called a time-shared drive.

EXAMPLES

In the following, the present invention will be clarified further by examples and comparative examples. In the following examples, materials, amounts and proportions thereof, processes, sequence thereof and the like can be suitably modified within the concept of the present invention. Therefore, the range of the present invention should not be construed restrictively by the following examples.

Example 1

<Preparation of IPS Mode Liquid Crystal Cell No. 1>

On a glass substrate, electrodes (2, 3 in FIG. 2) were prepared with a distance of 20 μm between the adjacent electrodes as shown in FIG. 2, then a polyimide film was provided as an alignment layer and subjected to a rubbing process. The rubbing process was conducted in a direction 4 shown in FIG. 2. Also on a surface of another glass plate, a polyimide film was provided and subjected to a rubbing process to obtain an alignment layer. The two glass substrates were adhered together with the alignment layers in a mutually opposed relation, with a spacing (gap d) of the substrates of 3.9 μm, in such a manner that the rubbing directions of the two glass substrates became mutually parallel, and a nematic liquid crystal composition having a refractive index anisotropy (Δn) of 0.0769 and a positive dielectric anisotropy (Δε) of 4.5 was sealed therein. The liquid crystal layer had a d-Δn value of 300 nm.

<Preparation of Optical Compensatory Film 1>

(Preparation of First Retardation Area)

Following composition was charged in a mixing tank and agitated under heating to dissolve the components thereby preparing a cellulose acetate solution of a following formulation.

Formulation of cellulose acetate solution

| | |
|---|---|
| cellulose acetate with acetylation degree of 60.9% | 100 parts by weight |
| triphenyl phosphate (plasticizer) | 7.8 parts by weight |
| biphenyl diphenylphosphate (plasticizer) | 3.9 parts by weight |
| methylene chloride (first solvent) | 300 parts by weight |
| methanol (second solvent) | 54 parts by weight |
| 1-butanol (third solvent) | 11 parts by weight |

In another mixing tank, 16 part by weight of a following retardation enhancer agent, 80 parts by weight of methylene chloride and 20 parts by weight of methanol were charged and agitated under heating to obtain a retardation enhancer agent solution. Mixing and agitating 487 parts by weight of the cellulose acetate solution and 7 parts by weight of the retardation enhancer agent solution gave a dope.

Retardation enhancer agent

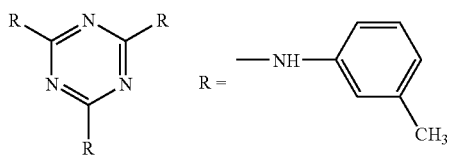

The obtained dope was cast with a band casting machine. A film on a band, upon reaching a film surface temperature of 40° C., was dried for 1 minute at 60° C. and was peeled off from the band. Then the film was dried for 10 minutes with a drying air of 140° C. to obtain a cellulose acetate film, Cellulose acetate No. 1, of a thickness of 80 μm.

Optical characteristics of the film, determined by measuring a dependence of Re on the light incident angle by an automatic birefringence meter (KOBRA-21ADH, manufactured by Oji Scientific Instruments), provided Re of 5 nm and Rth of 82 nm.

(Preparation of Second Retardation Area)

After a surface of Cellulose acetate film No. 1 was saponified, an alignment layer coating liquid of a following formulation was coated thereon by a wired bar coater with an amount of 20 ml/m². The coating was dried for 60 seconds with a warm air of 60° C. and for 120 seconds with a warm air of 100° C. to obtain a film. Then thus formed film was subjected to a rubbing process in a direction parallel to the slow axis of the film thereby forming an alignment layer.

Formulation of alignment layer coating liquid

| | |
|---|---|
| following modified polyvinyl alcohol | 10 parts by weight |
| water | 371 parts by weight |
| methanol | 119 parts by weight |
| glutar aldehyde | 0.5 parts by weight |
| following Compound B | 0.2 parts by weight |

Compound B

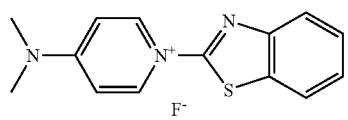

Modified polyvinyl alcohol $$-(CH_2-CH)_{86.3}-(CH_2-CH)_{12}-(CH_2-CH)_{1.7}-\overset{CH_3}{\underset{|}{|}}$$
$$\quad\quad\quad | \quad\quad\quad\quad\quad | \quad\quad\quad\quad\quad\quad |$$
$$\quad\quad\ OH \quad\quad\quad\quad OCOCH_3 \quad\ OCONHCH_2CH_2OCOC=CH_2$$

Then, on the alignment layer rubbed with a respective rubbing intensity, a coating liquid of a following formulation was coated with a wired bar so as to obtain an in-plane retardation Re of 130 nm after curing.

| | |
|---|---|
| discotic liquid crystalline compound | 1.8 g |
| ethylene oxide-denatured trimethylolpropane triacrylate (V#360, manufactured by Osaka Organic Chemicals (Ltd.),) | 0.2 g |
| photopolymerization initiator (IRGACURE 907, manufactured by Ciba-Geigy AG) | 0.06 g |
| sensitizer (KAYACURE DETX, manufactured by Nippon Kayaku Co., LTD.) | 0.02 g |
| air interface side alignment agent (following Compound A) | 0.01 g |
| methyl ethyl ketone | 3.9 g |

Discotic liquid crystalline compound

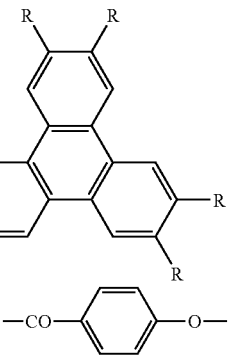

Compound A

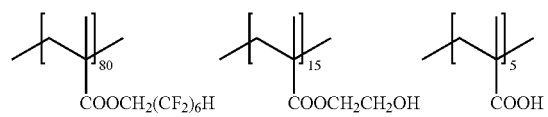

After being attached to a metal frame, the coating layer was heated in a constant-temperature bath of 125° C. for 3 minutes to align the discotic liquid crystalline compound. Then an UV irradiation was executed for 30 seconds with a high pressure mercury lamp of 120 W/cm to crosslink the discotic liquid crystalline compound. A temperature at the UV curing was maintained 100, 80, 60, 40 or 30° C. to obtain 5 retardation films. Then the films were let to cool to the room temperature to obtain optical compensatory films (100, 80, 60, 40 or 30° C.).

Optical characteristics of the discotic liquid crystal retardation layer only were obtained by measuring a dependence of Re on the light incident angle of the optical compensatory films, for each rubbing intensity and each UV curing temperature, by an automatic birefringence meter (KOBRA-21ADH, manufactured by Oji Scientific Instruments), and subtracting a contribution (Re=5 nm) of the cellulose acetate film measured in advance. Each film showed an in-plane retardation Re of 130 nm. Also the entire optical compensatory sheet showed an Re of 135 nm. The liquid crystal had a tilt angle of 90.0°, confirming that the discotic liquid crystal was aligned with its optical axis parallel to the substrate film surface. Also the slow axis was parallel to the rubbing direction of the alignment layer.

A polarizing film was prepared by adsorbing iodine on an stretched polyvinyl alcohol film. Each of the prepared optical compensatory films was adhered, with a polyvinyl alcohol adhesive, on one side of the polarizing film in such a manner that the cellulose acetate film was positioned at the polarizing film side. A transmission axis of the polarizing film was positioned parallel to the slow axis of the optical compensatory film (also the slow axis of the second retardation area). A commercially available cellulose acetate film (Fujitac TD80UF, manufactured by Fuji Photo Film Co.) was subjected to a saponification process and was adhered, with a polyvinyl alcohol adhesive, to an opposite side of the polarizing film. Then the polarizing plate was adhered on a side of the IPS mode Liquid crystal cell No. 1 prepared above, in such a manner that the slow axis of the optical compensatory film was parallel to the rubbing direction of the liquid crystal cell (namely the slow axis of the second retardation area becomes parallel to the slow axis of the liquid crystal molecules of the liquid crystal cell in a black state) and that the coating side of the discotic liquid crystal is at the side of the liquid crystal cell. Then, on the other side of the IPS mode Liquid crystal cell No. 1, a commercially available polarizing plate (HLC2-5618, manufactured by Sanritz Co.) was adhered in a crossed Nicol arrangement to obtain liquid crystal display. In the manner described above, five liquid crystal displays (Liquid crystal display 1), respectively employing the optical compensatory film cured at 100, 80, 60, 40 or 30° C., were produced.

Example 2

Liquid crystal displays were prepared in the same manner as Example 1, except that the process for producing the second retardation area is changed as follows.

(Preparation of Second Retardation Area)

After a surface of Cellulose acetate film No. 1 was saponified, an alignment layer coating liquid of a following formulation was coated thereon by a wired bar coater with an amount of 20 ml/m². The coating was dried for 60 seconds with a warm air of 60° C. and for 120 seconds with a warm air of 100° C. to obtain a film. Then thus formed film was subjected to a rubbing process in a direction parallel to the slow axis of the film thereby forming an alignment layer.

Formulation of alignment layer coating liquid

| following modified polyvinyl alcohol | 10 parts by weight |
| --- | --- |
| water | 371 parts by weight |
| methanol | 119 parts by weight |
| glutar aldehyde | 0.5 parts by weight |

Modified polyvinyl alcohol

Then, on the alignment layer rubbed with a respective rubbing intensity, a coating liquid of a following formulation was coated with a wired bar so as to obtain an in-plane retardation Re of 130 nm after curing.

| discotic liquid crystalline compound | 1.8 g |
| --- | --- |
| ethylene oxide-denatured trimethylolpropane triacrylate (V#360, manufactured by Osaka Organic Chemicals (Ltd.)) | 0.2 g |
| photopolymerization initiator (IRGACURE 907, manufactured by Ciba-Geigy AG) | 0.06 g |
| sensitizer (KAYACURE DETX, manufactured by Nippon Kayaku Co.) | 0.02 g |
| air interface side alignment agent (following Compound A) | 0.007 g |
| alignment layer interface vertical alignment agent (following Compound B) | 0.009 g |
| methyl ethyl ketone | 3.9 g |

Discotic liquid crystalline compound

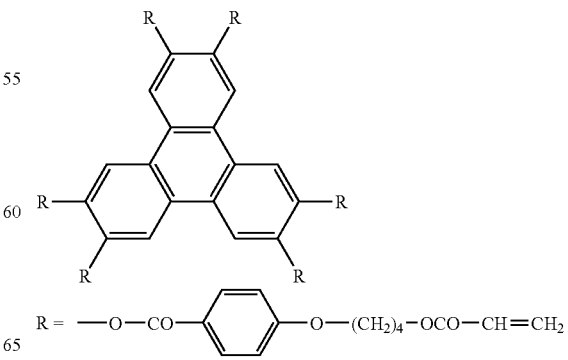

-continued

Compound A

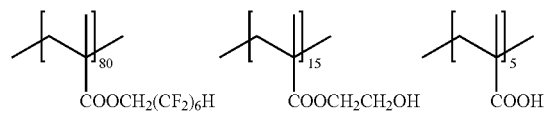

Compound B

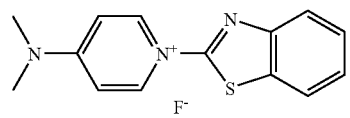

After being attached to a metal frame, the coating layer was heated in a constant-temperature bath of 125° C. for 3 minutes to align the discotic liquid crystalline compound. Then an UV irradiation was executed for 30 seconds with a high pressure mercury lamp of 120 W/cm to crosslink the discotic liquid crystalline compound. A temperature at the UV curing was maintained 100, 80, 60, 40 or 30° C. to obtain 5 retardation films. Then the films were let to cool to the room temperature to obtain optical compensatory films (100, 80, 60, 40 or 30° C.).

Optical characteristics of the discotic liquid crystal retardation layer only were obtained by measuring a dependence of Re on the light incident angle of the optical compensatory film, for each rubbing intensity and each UV curing temperature, by an automatic birefringence meter (KOBRA-21ADH, manufactured by Oji Scientific Instruments), and subtracting a contribution of the cellulose acetate film measured in advance. Each film showed an in-plane retardation Re of 130 nm. The liquid crystal had a tilt angle of 90.0°, confirming that the discotic liquid crystal was aligned with its optical axis parallel to the substrate film surface. Also the slow axis was parallel to the rubbing direction of the alignment layer.

Five liquid crystal displays, Liquid crystal display 2, respectively employing the retardation film cured at 100, 80, 60, 40 or 30° C., were produced in the same manner as in Example 1.

Example 3

Five liquid crystal displays, Liquid crystal display 3, respectively employing an optical compensatory film cured at 100, 80, 60, 40 or 30° C., were prepared in the same manner as in Example 1, except that the formulation of the alignment layer coating liquid for the second retardation area in Example 1 was changed as follows.

Formulation of alignment layer coating liquid

| | |
|---|---|
| following modified polyvinyl alcohol | 10 parts by weight |
| water | 371 parts by weight |
| methanol | 119 parts by weight |
| glutar aldehyde | 0.5 parts by weight |
| p-toluenesulfonic acid | 0.2 parts by weight |

Modified polyvinyl alcohol

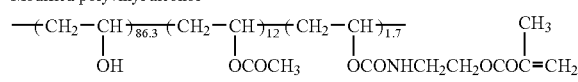

<Measurement of Extinction and Film Thickness of Prepared Retardation Film>

Measured values of extinction and film thickness of the retardation films prepared in Examples 1 to 3 are shown in Tables 1 to 3. [Measurement of Frontal Luminance]

A frontal luminances of the retardation films prepared in Examples 1 to 3 were measured with a luminance measuring instrument, in a configuration shown in FIG. 1, by placing a sample between two polarizers in a crossed Nicol arrangement and rotating the sample so as to minimize the transmitted light.

As a light source, there was employed Fuji Light Box 5000 Inverter (manufactured by Fuji Photo Film Co.) with an aperture of 3×3 cm, and, the measurement was conducted with a luminance measuring instrument SR-3 (manufactured by Topcon Ltd.) with a viewing angle of 1°. Also a frontal luminance throught a single polarizing plate only without the sample was 920 cd/m$^2$, and a frontal luminance through two polarizers only in a crossed Nicol arrangement was 0.085 cd/m$^2$.

Measurement of Light Leakage in Prepared Liquid Crystal Display>

A black luminance and a contrast of the liquid crystal displays prepared in Examples 1 to 3 were subjectively evaluated and results are shown in Tables 1 to 3. Evaluation:
AA: extremely low black luminance, or extremely high contrast
A: low black luminance, or high contrast
B: medium black luminance, or medium contrast
C: high black luminance, or low contrast

TABLE 1

(Example 1)

| UV curing temp (° C.) | Extinction | Film thickness (μm) | Frontal luminance (cdm$^{-2}$) | Black luminance | Frontal contrast |
|---|---|---|---|---|---|
| 100 | 0.00429 | 1.9 | 0.70 | A | A |
| 80 | 0.00154 | 1.5 | 0.39 | AA | A |
| 60 | 0.00241 | 1.6 | 0.44 | A | A |
| 40 | 0.00236 | 1.4 | 0.44 | A | A |
| 30 | 0.0029 | 1.4 | 0.48 | A | A |

TABLE 2

(Example 2)

| UV curing temp (° C.) | Extinction | Film thickness (μm) | Frontal luminance (cdm$^{-2}$) | Black luminance | Frontal contrast |
|---|---|---|---|---|---|
| 100 | 0.00299 | 1.9 | 0.45 | A | A |
| 80 | 0.00152 | 1.6 | 0.39 | AA | A |
| 60 | 0.0004 | 1.5 | 0.15 | AA | AA |
| 40 | 0.00306 | 1.3 | 0.45 | A | A |
| 30 | 0.00929 | 1.4 | 0.85 | C | C |

TABLE 3

(Example 3)

| UV curing temp (° C.) | Extinction | Film thickness (μm) | Frontal luminance (cdm$^{-2}$) | Black luminance | Frontal contrast |
|---|---|---|---|---|---|
| 100 | 0.0055 | 1.9 | 0.75 | C | A |
| 80 | 0.00336 | 1.7 | 0.53 | A | A |

TABLE 3-continued (Example 3)

| UV curing temp (° C.) | Extinction | Film thickness (μm) | Frontal luminance (cdm$^{-2}$) | Black luminance | Frontal contrast |
|---|---|---|---|---|---|
| 60 | 0.00241 | 1.5 | 0.43 | A | A |
| 40 | 0.00155 | 1.4 | 0.4 | AA | A |
| 30 | 0.00900 | 1.4 | 0.85 | C | C |

Example 4

(Preparation of Cellulose Acetate Solution)

Following composition was charged in a mixing tank and agitated under heating to dissolve the components. Silica particles were added after dispersion thereby preparing a cellulose acetate solution of a following formulation.

| | |
|---|---|
| cellulose acetate of average acetylation degree of 61.7 | 100.0 parts by weight |
| methylene chloride (first solvent) | 517.6 parts by weight |
| methanol (second solvent) | 77.3 parts by weight |
| silica particles of average particle size of 16 nm (Aerosil R972, manufactured by Nippon Aerosil Co.) | 0.13 part by weight |
| optical anisotropy reducing compound (A-19) | 11.7 parts by weight |
| wavelength dispersion regulating agent (UV-102) | 1.2 parts by weight |
| citrate ester | 0.01 parts by weight |

(Preparation of Cellulose Acetate Film No. 2)

The obtained cellulose acetate solution was cast with a band casting machine. A film was peeled off from the band at a residual solvent amount of about 60% and dried for 20 minutes at 135° C. to obtain a cellulose acetate film. The obtained cellulose acetate film, Cellulose acetate film No. 2, had a residual solvent amount of 0.15% and a thickness of 80 μm.

Optical characteristics of the film, determined by measuring a dependence of Re on the light incident angle by an automatic birefringence meter (KOBRA-21ADH, manufactured by Oji Scientific Instruments), provided Re of 1 nm and Rth of −2 nm.

A polarizing film was prepared by adsorbing iodine on an stretched polyvinyl alcohol film. The prepared cellulose acetate film, Cellulose acetate film No. 2, was adhered, with a polyvinyl alcohol adhesive, after a saponification, on one side of the polarizing film. Also a commercially available cellulose acetate film (Fujitac TD80UF, manufactured by Fuji Photo Film Co.) was subjected to a saponification process and was adhered, with a polyvinyl alcohol adhesive, to an opposite side of the polarizing film. Then an IPS mode liquid crystal display was prepared in the same manner as in Example 1, except that thus prepared polarizing plate was employed in place for the commercially available polarizing plate (HLC2-5618, manufactured by Sanritz Co.).

The IPS mode liquid crystal displays of Example 1 and 4, in a black state, were observed from all the directions with a polar angle of 60°. As a result, it was confirmed that the display of Example 4, in comparison with that of Example 1, showed an extremely smaller change in color, thus indicating a lower dependence of color on the viewing angle.

[Result of Evaluation]

A subjective evaluation provided a result that a display with a frontal luminance of 0.700 cd/m$^2$ gave an impression of a low black luminance and a high contrast.

It was also confirmed that a UV curing at a temperature of 40 to 80° C. provided a retardation film of a lower extinction, thus providing a liquid crystal display of a lower black luminance.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A retardation film comprising a transparent substrate and an optically anisotropic layer formed thereon by fixing a liquid crystalline compound in an aligned state, wherein the retardation film, when positioned between two polarizers in a crossed Nicol arrangement, has a frontal luminance within a range of 0.700 to 0.000 cd/m$^2$.

2. The retardation film of claim 1, wherein, when positioned between two polarizers in a crossed Nicol arrangement, a frontal luminance is within a range of 0.400 to 0.000 cd/m$^2$.

3. The retardation film of claim 1, wherein, when positioned between two polarizers in a crossed Nicol arrangement, a frontal luminance is within a range of 0.150 to 0.000 cd/m$^2$.

4. The retardation film of claim 1, wherein an in-plane retardation is within a range of 50 to 200 nm.

5. The retardation film of claim 1, wherein the liquid crystalline compound is a discotic liquid crystalline compound having a polymerizable group.

6. The retardation film of claim 5, wherein, in the optically anisotropic layer, the molecules of the discotic liquid crystalline compound are fixed in an aligned state with a mean tilt angle between the disc-faces of the molecules and the surface of the substrate falling within the range from 70 to 90°.

7. The retardation film of claim 1, wherein the optically anisotropic layer comprises at least one compound having at least one fluorine atom capable of decreasing a tilt angle of a director of the molecules of liquid crystalline compound at an air-interface side of the optically anisotropic layer.

8. A liquid crystal display comprising a first polarizing film, a retardation film of claim 1 positioned in contact with a surface of the first polarizing film, a first substrate, a liquid crystal layer formed of a liquid crystal material, and a second substrate positioned in this order, in which liquid crystal molecules of the liquid crystal material are aligned in a black state parallel to surfaces of a pair of the substrates, wherein a slow axis of the retardation film is parallel to a transmission axis of the first polarizing film and also to a slow axis of the liquid crystal molecules of the liquid crystal layer in a black state.

9. The liquid crystal display of claim 8, further comprising a second polarizing film at an outside of the second substrate.

10. The liquid crystal display of claim 9, comprising a pair of protective films positioned sandwiching the second polarizing film, wherein, among the paired protective films, a protective film closer to the liquid crystal layer has a retardation Rth in a direction of thickness within a range from 20 to −20 nm.

11. The liquid crystal display of claim 9, comprising a pair of protective films positioned sandwiching the second polarizing film, wherein, among the paired protective films, a protective film closer to the liquid crystal layer is a cellulose acylate film or a norbornene-based film.

12. The liquid crystal display of claim 9, comprising a pair of protective films positioned sandwiching the second polarizing film, wherein, among the paired protective films, a protective film closer to the liquid crystal layer is a cellulose acylate film.

13. The liquid crystal display of claim 12, wherein the cellulose acylate film is prepared by a solvent-casting process.

14. The liquid crystal display of claim 12, wherein the cellulose acylate film comprises at least one compound capable of reducing optical anisotropy of the cellulose acylate film.

15. The liquid crystal display of claim 12, wherein the cellulose acylate film comprises at least one compound capable of reducing a wavelength dispersion of the cellulose acylate film.

16. The liquid crystal display of claim 12, wherein the cellulose acylate film comprises at least one compound represented by a formula (13):

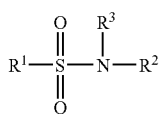

Formula (13)

where $R^1$ represents an alkyl group or an aryl group; and $R^2$ and $R^3$ each independently represents a hydrogen atom or a substituted or non-substituted alkyl group or aryl group.

17. The liquid crystal display of claim 12, wherein the cellulose acylate film comprises at least one compound represented by a formula (102-B):

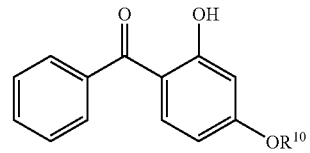

Formula (102-B)

wherein $R^{10}$ represents a hydrogen atom, or a substituted or non-substituted alkyl group, alkenyl group, alkinyl group or aryl group.

18. The retardation film of claim 1, wherein, when positioned between two polarizers in a crossed Nicol arrangement, a frontal luminance is within a range of 0.700 to 0.065.

* * * * *